US010392525B2

United States Patent
Umebayashi et al.

(10) Patent No.: US 10,392,525 B2
(45) Date of Patent: Aug. 27, 2019

(54) INK JET RECORDING METHOD

(71) Applicant: FUJIFILM CORPORATION, Minato-ku, Tokyo (JP)

(72) Inventors: Tsutomu Umebayashi, Kanagawa (JP); Ichiro Koyama, Kanagawa (JP); Shota Suzuki, Kanagawa (JP); Noriaki Sato, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 16/036,950

(22) Filed: Jul. 17, 2018

(65) Prior Publication Data

US 2018/0320017 A1 Nov. 8, 2018

Related U.S. Application Data

(63) Continuation of application No. PCT/JP2017/003853, filed on Feb. 2, 2017.

(30) Foreign Application Priority Data

Feb. 10, 2016 (JP) ................... 2016-024174

(51) Int. Cl.
*C09D 11/54* (2014.01)
*C09D 11/322* (2014.01)
(Continued)

(52) U.S. Cl.
CPC ............. *C09D 11/54* (2013.01); *B41J 2/2107* (2013.01); *B41J 11/002* (2013.01);
(Continued)

(58) Field of Classification Search
CPC ..... C09D 11/101; C09D 11/322; C09D 11/30; B41M 5/0047; B41J 11/002
(Continued)

(56) References Cited

U.S. PATENT DOCUMENTS 9,884,973 B2 * 2/2018 Okamoto ............... C09D 11/40
2009/0068418 A1 3/2009 Iwase et al.
(Continued)

FOREIGN PATENT DOCUMENTS

JP 2003-213185 A 7/2003
JP 2008-162055 A 7/2008
(Continued)

OTHER PUBLICATIONS

International Search Report issued in International Application No. PCT/JP2017/003853 dated Mar. 7, 2017.
(Continued)

*Primary Examiner* — An H Do
(74) *Attorney, Agent, or Firm* — Solaris Intellectual Property Group, PLLC

(57) ABSTRACT

An ink jet recording method has an ejection step of ejecting, onto a substrate, an ink composition A that includes water, a coloring agent, a photopolymerization initiator, and a microcapsule enclosing a polymerizable compound therein, and an ink composition B that includes water, a coloring agent, a photopolymerization initiator, and a microcapsule enclosing a polymerizable compound therein; and an irradiation step of irradiating, with light, the ink composition A and the ink composition B ejected on the substrate. An absorbance $ABS_A$ of the ink composition A and an absorbance $ABS_B$ of the ink composition B satisfy a formula (1), and a concentration $M_A$ of the microcapsule included in the ink composition A and a concentration $M_B$ of the microcapsule included in the ink composition B satisfy a formula (2).

$ABS_A < ABS_B$  Formula (1)

$M_A < M_B$  Formula (2)

10 Claims, 4 Drawing Sheets

(51) Int. Cl.
  *B41J 2/21* (2006.01)
  *C09D 11/101* (2014.01)
  *C09D 11/324* (2014.01)
  *C09D 11/40* (2014.01)
  *B41J 11/00* (2006.01)
  *B41M 5/00* (2006.01)
  *C09D 11/033* (2014.01)
  *C09D 11/037* (2014.01)
  *C09D 11/107* (2014.01)
  *C09D 11/38* (2014.01)
  *C09D 11/102* (2014.01)
  *B41M 7/00* (2006.01)

(52) U.S. Cl.
  CPC ......... *B41M 5/0023* (2013.01); *C09D 11/033* (2013.01); *C09D 11/037* (2013.01); *C09D 11/101* (2013.01); *C09D 11/102* (2013.01); *C09D 11/107* (2013.01); *C09D 11/322* (2013.01); *C09D 11/324* (2013.01); *C09D 11/38* (2013.01); *C09D 11/40* (2013.01); *B41M 7/0081* (2013.01)

(58) Field of Classification Search
  USPC .......................................... 347/95, 100–102
  See application file for complete search history.

(56) References Cited

U.S. PATENT DOCUMENTS

| | | | |
|---|---|---|---|
| 2009/0087576 A1* | 4/2009 | Umebayashi | ........ C09D 11/101 427/511 |
| 2011/0092610 A1 | 4/2011 | Habashi et al. | |
| 2013/0222479 A1 | 8/2013 | Houjou | |
| 2014/0002556 A1 | 1/2014 | Sato et al. | |
| 2014/0118451 A1* | 5/2014 | Nakane | ..................... C08F 2/50 347/102 |
| 2014/0347427 A1 | 11/2014 | Yamashita et al. | |
| 2017/0022379 A1 | 1/2017 | Loccufier et al. | |

FOREIGN PATENT DOCUMENTS

| | | |
|---|---|---|
| JP | 2009-096043 A | 5/2009 |
| JP | 2010-13506 A | 1/2010 |
| JP | 2010-138315 A | 6/2010 |
| JP | 2010-229283 A | 10/2010 |
| JP | 2011-46115 A | 3/2011 |
| JP | 2011-235567 A | 11/2011 |
| JP | 2012-188478 A | 10/2012 |
| JP | 2013-180424 A | 9/2013 |
| JP | 2014-5421 A | 1/2014 |
| JP | 2014-227523 A | 12/2014 |
| JP | 2014-237741 A | 12/2014 |
| WO | 2015/158748 A1 | 10/2015 |

OTHER PUBLICATIONS

Written Opinion of the ISA issued in International Application No. PCT/JP2017/003853 dated Mar. 7, 2017.
English language translation of the following: Office action dated Dec. 11, 2018 from the JPO in a Japanese patent application No. 2017-566904 corresponding to the instant patent application. This office action translation is submitted now in order to supplement the understanding of the cited reference which is being disclosed in the instant Information Disclosure Statement.

* cited by examiner

INK JET RECORDING METHOD

CROSS-REFERENCE TO RELATED APPLICATIONS

This application is a continuation application of International Application No. PCT/JP2017/003853, filed Feb. 2, 2017, the disclosure of which is incorporated herein by reference in its entirety. Further, this application claims priority from Japanese Patent Application No. 2016-024174, filed Feb. 10, 2016, the disclosure of which is incorporated herein by reference in its entirety.

BACKGROUND OF THE INVENTION

1. Field of the Invention

The present disclosure relates to an ink jet recording method.

2. Description of the Related Art

Examples of the system of a recording method for recording an image on a substrate include an electrophotographic system, a sublimation thermal transfer system, a melt thermal transfer system, and an ink jet system.

The recording method using the ink jet system is advantageous in that recording can be conducted with a cheap device, and the operating cost is low because an ink can be efficiently used.

An example of the recording method using the ink jet system is an ink jet recording method using an ink for ink jet printing, the ink being capable of being cured by irradiation with active energy rays such as ultraviolet rays.

An example of such an ink jet recording method that has been proposed includes a step of ejecting an ink jet ink including water, a photopolymerization initiator, and a capsule that includes a core and a polymer shell surrounding the core, in which the shell of the capsule has a cross-linked structure, and the core includes at least one chemically reactive compound that forms a reaction product by being irradiated with ultraviolet rays; and a step of irradiating the ink jet ink ejected on a substrate with ultraviolet rays (UV) to cure the ink jet ink (refer to, for example, WO2015/158748A).

Another example of an ink jet recording method that has been proposed uses an ink set in which an active ray-curable ink composition including a yellow colorant and an active ray-curable ray ink composition including a black colorant each include, as a photopolymerization initiator, a thioxanthone-based photopolymerization initiator having a plurality of functional groups in an amount of 1% to 4% by mass relative to the total amount of the ink composition, and an active ray-curable ray ink composition including a cyan colorant and an active ray-curable ray ink composition including a magenta colorant include substantially no thioxanthone-based photopolymerization initiator (refer to, for example, JP2010-138315A).

SUMMARY OF THE INVENTION

Regarding ink compositions capable of being cured by irradiation with active energy rays, light transmittances of the ink compositions vary depending on the difference in, for example, the colors and the types of coloring agents included in the ink compositions, and thus the ink compositions have different curability of irradiated portions.

In the case where two or more ink compositions having different curability are applied onto one substrate by an ink jet method and cured, one of the ink compositions is cured first, and the other composition is then cured. In this case, in the ink composition that is cured afterward, a change in the shape of droplets easily occurs, and color bleeding tends to occur. Herein, the term "color bleeding" refers to a phenomenon in which a desired color is not obtained because adjacent two color inks are mixed.

In the ink described in WO2015/158748A, curability of respective inks having different colors is not examined. Accordingly, when two or more inks are ejected, color bleeding is expected to occur.

In the ink compositions described in JP2010-138315A, the amount and the type of photopolymerization initiator included in the ink compositions are varied depending on the color to make curability uniform, thus suppressing the mixing of colors during image forming.

As in the ink compositions described in JP2010-138315A, the method for adjusting curability by increasing the amount of photopolymerization initiator is effective for ink compositions including a polymerizable compound as a medium and further including a polymerization initiator. However, this method is not effective for ink compositions including water as a medium (that is, water-based ink compositions), whose viscosities are increased by increasing the amount of polymerization initiator, resulting in a decrease in the ejection performance. Therefore, it is difficult to suppress the occurrence of color bleeding in the ink jet recording method using water-based ink compositions.

The present disclosure has been made in view of the circumstances described above. An object of the present disclosure is to provide an ink jet recording method which suppresses the occurrence of color bleeding in an image when a color image is recorded by using a plurality of water-based ink compositions.

Specific means for achieving the object includes embodiments described below.

<1> An ink jet recording method having an ejection step of ejecting, onto a substrate, an ink composition A that includes water, a coloring agent, a photopolymerization initiator, and a microcapsule enclosing at least a polymerizable compound therein, and an ink composition B that includes water, a coloring agent, a photopolymerization initiator, and a microcapsule enclosing at least a polymerizable compound therein; and an irradiation step of irradiating, with light, the ink composition A and the ink composition B ejected on the substrate. In the method, an absorbance $ABS_A$ of the ink composition A and an absorbance $ABS_B$ of the ink composition B satisfy a formula (1) below, and a concentration $M_A$ of the microcapsule included in the ink composition A and a concentration $M_B$ of the microcapsule included in the ink composition B satisfy a formula (2) below.

$$ABS_A < ABS_B \qquad \text{Formula (1)}$$

$$M_A < M_B \qquad \text{Formula (2)}$$

In the formula (1), $ABS_A$ and $ABS_B$ respectively represent an average of absorbances of the ink composition A in wavelengths of 360 to 390 nm and an average of absorbances of the ink composition B in wavelengths of 360 to 390 nm.

In the formula (2), $M_A$ and $M_B$ respectively represent, on a mass basis, a concentration of the microcapsule included in the ink composition A and a concentration of the microcapsule included the ink composition B.

<2> The ink jet recording method according to <1>, in which $ABS_A$, $ABS_B$, $M_A$, and $M_B$ satisfy a formula (3) below.

$$(1+0.1\times(ABS_B/ABS_A))\times M_A < M_B < (1+0.4\times(ABS_B/ABS_A))\times M_A \quad \text{Formula (3)}$$

<3> The ink jet recording method according to <1> or <2>, in which $M_A$ is 7% by mass or more and 14% by mass or less, and $M_B$ is 9% by mass or more and 18% by mass or less.

<4> The ink jet recording method according to any one of <1> to <3>, in which, in the irradiation step, the ink composition A and the ink composition B are irradiated with light under the same conditions.

<5> The ink jet recording method according to any one of <1> to <4>, in which the ink composition A includes a quinacridone pigment in an amount of 4.0% to 6.0% by mass relative to a total mass of the ink composition A, and the ink composition B includes carbon black in an amount of 1.5% to 2.5% by mass relative to a total mass of the ink composition B.

<6> The ink jet recording method according to any one of <1> to <5>, in which the ink composition A includes a copper phthalocyanine pigment in an amount of 1.7% to 3.1% by mass relative to a total mass of the ink composition A, and the ink composition B includes carbon black in an amount of 1.5% to 2.5% by mass relative to a total mass of the ink composition B.

<7> The ink jet recording method according to any one of <1> to <6>, in which the ink composition A includes a monoazo pigment in an amount of 3.0% to 4.4% by mass relative to a total mass of the ink composition A, and the ink composition B includes carbon black in an amount of 1.5% to 2.5% by mass relative to a total mass of the ink composition B.

<8> The ink jet recording method according to any one of <1> to <7>, in which each of the microcapsule included in the ink composition A and the microcapsule included in the ink composition B encloses a photopolymerization initiator therein.

<9> The ink jet recording method according to <8>, in which, in each of the ink composition A and the ink composition B, a content of the photopolymerization initiator enclosed in the microcapsule is 5% to 10% by mass relative to a content of the polymerizable compound enclosed in the microcapsule.

<10> The ink jet recording method according to any one of <1> to <9>, in which the photopolymerization initiator includes a bisacylphosphine oxide.

<11> The ink jet recording method according to any one of <1> to <10>, in which the same microcapsules are used for the microcapsule included in the ink composition A and the microcapsule included in the ink composition B.

According to the present disclosure, there is provided an ink jet recording method which suppresses the occurrence of color bleeding in an image when a color image is recorded by using a plurality of water-based ink compositions.

DESCRIPTION OF THE PREFERRED EMBODIMENTS

Figure 1:
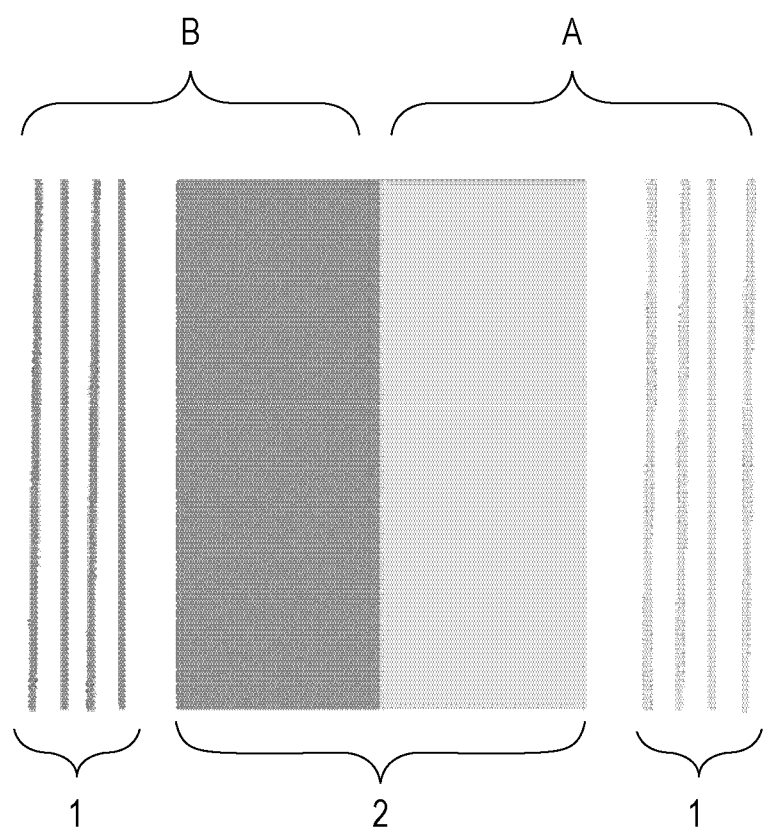
FIG. 1 is a view illustrating an image of a sample for evaluation in Examples.

Hereinafter, specific embodiments of the present invention will be described in detail. The embodiments described below do not limit the present invention.

In the present specification, a range of numerical values shown by using "to" shows a range including a numerical value described before "to" as a minimum and a numerical value described after "to" as a maximum.

In a range of numerical values described in a step-by-step manner in the present specification, an upper limit or a lower limit described in a range of numerical values may be replaced by an upper limit or a lower limit of another range of numerical values described in a step-by-step manner. In a range of numerical values described in the present specification, an upper limit or a lower limit described in a range of numerical values may be replaced by a value disclosed in Examples.

In the present specification, in the case where a plurality of substances corresponding to each component are present in a composition, the amount of the component in the composition means a total amount of the plurality of substances present in the composition unless otherwise noted.

In the present specification, the term "step" refers to not only an independent step but also a step that is not clearly distinguished from another step as long as a desired purpose of the step is achieved.

In the present specification, the term "light" covers a concept that includes active energy rays such as γ-rays, β-rays, electron beams, ultraviolet rays, visible rays, and infrared rays.

In the present specification, ultraviolet rays may be referred to as "UV (ultraviolet) light".

In the present specification, light emitted from an LED (light-emitting diode) light source may be referred to as an "LED light".

In the present specification, the term "(meth)acrylic acid" covers a concept that includes both acrylic acid and methacrylic acid, the term "(meth)acrylate" covers a concept that includes both acrylate and methacrylate, and the term "(meth)acryloyl group" covers a concept that includes both an acryloyl group and a methacryloyl group.

<<Ink Jet Recording Method>>

An ink jet recording method has an ejection step of ejecting, onto a substrate, an ink composition A that includes water, a coloring agent, a photopolymerization initiator, and a microcapsule enclosing at least a polymerizable compound therein, and an ink composition B that includes water, a coloring agent, a photopolymerization initiator, and a microcapsule enclosing at least a polymerizable compound therein; and an irradiation step of irradiating, with light, the ink composition A and the ink composition B ejected on the substrate. In the ink jet recording method, an absorbance $ABS_A$ of the ink composition A and an absorbance $ABS_B$ of the ink composition B satisfy a formula (1) below, and a concentration $M_A$ of the microcapsule included in the ink composition A and a concentration $M_B$ of the microcapsule included in the ink composition B satisfy a formula (2) below.

$$ABS_A < ABS_B \quad \text{Formula (1)}$$

$$M_A < M_B \quad \text{Formula (2)}$$

In the formula (1), $ABS_A$ and $ABS_B$ respectively represent an average of absorbances of the ink composition A in wavelengths of 360 to 390 nm and an average of absorbances of the ink composition B in wavelengths of 360 to 390 nm.

In the formula (2), $M_A$ and $M_B$ respectively represent, on a mass basis, a concentration of the microcapsule included in the ink composition A and a concentration of the microcapsule included the ink composition B.

The details of the operation mechanism in an embodiment of the present invention are not clear but are assumed to be as follows.

Light transmittances of ink compositions vary depending on the difference in, for example, the colors and the types of coloring agents included in the compositions, and thus the ink compositions have different curability of irradiated portions. In the case where ink compositions having different curability are applied onto one substrate and cured, one of the ink compositions is cured first, and the other composition is then cured. Therefore, color bleeding easily occurs when a color image is recorded. In the ink described in WO2015/158748A, curability of respective inks having different colors is not examined, and suppression of the occurrence of color bleeding is not examined. In the ink compositions described in JP2010-138315A, the amount and the type of photopolymerization initiator included in the ink compositions are varied depending on the color to make curability uniform among the ink compositions, thus suppressing the mixing of colors during image forming. However, this method is not effective for water-based ink compositions including water as a medium.

According to the ink jet recording method of the present disclosure, since the ink composition A and composition B including microcapsules have absorbances and microcapsule concentrations that satisfy the relationships of the formulae (1) and (2), respectively, the difference in curing rate between the two ink compositions is small (or there is no difference). Accordingly, a change in the shape of droplets caused by a phenomenon that one of the ink compositions is cured first, and the other ink composition is then cured is unlikely to occur. As a result, the ink jet recording method of the present disclosure presumably suppresses the occurrence of color bleeding.

<Ejection Step>

The ink jet recording method has an ejection step of ejecting, onto a substrate, an ink composition A that includes water, a coloring agent, a photopolymerization initiator, and a microcapsule enclosing at least a polymerizable compound therein, and an ink composition B that includes water, a coloring agent, a photopolymerization initiator, and a microcapsule enclosing at least a polymerizable compound therein.

Note that the water, the coloring agent, and the photopolymerization initiator may be enclosed in the microcapsule or included in the ink composition without being enclosed in the microcapsule. When the ink composition further includes a sensitizer or other additives, the sensitizer or the other components may be enclosed in the microcapsule or included in the ink composition without being enclosed in the microcapsule.

In the ink jet recording method, a desired image can be formed on a substrate by ejecting the ink composition A and the ink composition B onto the substrate.

In the ink composition A and the ink composition B used in the ink jet recording method of the present disclosure, the absorbances and the concentrations of the microcapsules satisfy the relationships of formulae (1) and (2), respectively.

Since the absorbance $ABS_A$ of the ink composition A and the absorbance $ABS_B$ of the ink composition B satisfy the formula (1) and the concentration $M_A$ of the microcapsule included in the ink composition A and the concentration $M_B$ of the microcapsule included in the ink composition B satisfy the formula (2), a curing reaction of the ink composition B, for which an amount of light used in the curing reaction is smaller than that of the ink composition A, easily proceeds, and the difference between the curing rate of the ink composition A and the curing rate of the ink composition B can be decreased. As a result, color bleeding can be suppressed.

The absorbance $ABS_A$ of the ink composition A and the absorbance $ABS_B$ of the ink composition B satisfy the formula (1) below.

$$ABS_A < ABS_B \quad \text{Formula (1)}$$

In the formula (1), $ABS_A$ and $ABS_B$ respectively represent an average of absorbances of the ink composition A in wavelengths of 360 to 390 nm and an average of absorbances of the ink composition B in wavelengths of 360 to 390 nm.

The absorbances in the wavelengths of 360 to 390 nm can be measured by the method described below.

An ink composition to be measured is diluted to 2,000 times with ultrapure water to prepare a diluted liquid. The diluted liquid is placed in a quartz cell (1 cm×1 cm), ultrapure water is placed in a reference cell, and the measurement is conducted. The measurement is conducted by using a spectrophotometer (for example, V-570 available from JASCO Corporation) under the following conditions.

Conditions

Measurement wavelength: 360 to 390 nm

Measurement interval: every 1 nm

The average of the absorbances in the wavelengths of 360 to 390 nm measured as described above is calculated by using a mathematical formula (A) below.

$$ABS(360\text{-}390) = \frac{\sum_{\lambda=360}^{31} ABS(\lambda)}{31} \quad \text{Formula (A)}$$

The fact that the $ABS_A$ of the ink composition A and the $ABS_B$ of the ink composition B satisfy the formula (1) (that is, the ink composition A has a lower absorbance than the ink composition B) means that when the same amount of light is incident on the ink composition A and the ink composition B, the amount of light used in a curing reaction of the ink composition A is larger than that of the ink composition B.

Note that, in the ink composition A and the ink composition B, the value of the absorbance substantially depends on the type and the content of the coloring agent included in the ink composition.

The concentration $M_A$ of the microcapsule included in the ink composition A and the concentration $M_B$ of the microcapsule included in the ink composition B satisfy the formula (2) below.

$$M_A < M_B \quad \text{Formula (2)}$$

In the formula (2), $M_A$ and $M_B$ respectively represent, on a mass basis, a concentration of the microcapsule included in the ink composition A and a concentration of the microcapsule included the ink composition B.

When $M_A$ and $M_B$ satisfies the formula (2), a curing reaction of the ink composition B, for which an amount of light used in the curing reaction is smaller than that of the ink composition A, easily proceeds, and the difference between the curing rate of the ink composition A and the curing rate of the ink composition B can be decreased. As a result, color bleeding can be suppressed.

In the ink composition A, $M_A$ is preferably 5% to 40% by mass. At an $M_A$ of 5% by mass or more, the strength of a film obtained by the ink composition A improves. On the other hand, at an $M_A$ of 40% by mass or less, the ink composition A has a better ejection performance. Similarly, this also applies to $M_B$ in the ink composition B.

From the viewpoint of the film strength and ejection performance, $M_A$ of the ink composition A is preferably 5% by mass or more and 20% by mass or less, more preferably 6% by mass or more and 18% by mass or less, and still more preferably 7% by mass or more and 14% by mass or less.

From the same viewpoint as above, $M_B$ of the ink composition B is preferably 7% by mass or more and 25% by mass or less, more preferably 8% by mass or more and 20% by mass or less, still more preferably 9% by mass or more and 18% by mass or less, and particularly preferably 9% by mass or more and 16% by mass or less.

Regarding the combination of $M_A$ and $M_B$, $M_A$ is preferably 7% by mass or more and 14% by mass or less, and $M_B$ is preferably 9% by mass or more and 18% by mass or less.

When the combination of $M_A$ and $M_B$ is in the range described above, the difference in curing rate between the ink composition A and the ink composition B is decreased, and color bleeding is further suppressed.

Since the ink composition A and the ink composition B include microcapsules, films can be formed by light irradiation. Specifically, with an increase in the concentrations of the microcapsules in the ink composition A and the ink composition B, the amounts of polymerizable compounds present in the ink compositions are increased, and polymerization reactions easily proceed.

Preferably, $ABS_A$, $ABS_B$, $M_A$, and $M_B$ in the ink composition A and the ink composition B satisfy a formula (3) below.

$$(1+0.1\times(ABS_B/ABS_A))\times M_A < M_B < (1+0.4\times(ABS_B/ABS_A))\times M_A \quad \text{Formula (3)}$$

The formula (3) is a formula that represents preferred microcapsule concentrations in the ink composition A having an absorbance of $ABS_A$ and the ink composition B having an absorbance of $ABS_B$ by using $M_A$ and $M_B$. When $M_B$ exceeds $(1+0.1\times(ABS_B/ABS_A))\times M_A$, color bleeding is further suppressed. On the other hand, when $M_B$ is less than $(1+0.4\times(ABS_B/ABS_A))\times M_A$, the ejection performance further improves. The coefficients represented by "0.1" and "0.4" are values that were empirically determined by experiments.

From the same viewpoint as above, $ABS_A$, $ABS_B$, $M_A$, and $M_B$ in the ink composition A and the ink composition B more preferably satisfy a formula (4) below. The formula (4) is a formula that represents particularly preferred microcapsule concentrations in the ink composition A having an absorbance of $ABS_A$ and the ink composition B having an absorbance of $ABS_B$ by using $M_A$ and $M_B$.

$$(1+0.15\times(ABS_B/ABS_A))\times M_A < M_B < (1+0.3\times(ABS_B/ABS_A))\times M_A \quad \text{Formula (4)}$$

When the formula (4) is satisfied, the formulae (3) and (2) are also satisfied. When the formula (3) is satisfied, the formula (2) is also satisfied.

The components included in the ink composition A and the ink composition B will be described in detail below. The ink composition A and the ink composition B may also be generically referred to as an "ink composition".

<Ink Composition>

The ink composition A and the ink composition B each include water, a coloring agent, a photopolymerization initiator, and a microcapsule enclosing at least a polymerizable compound therein.

The components included in the ink composition A and the components included in the ink composition B may be the same or different. However, the ink composition A and the ink composition B satisfy the formulae (1) and (2) above.

The ink composition may include another component such as a sensitizer besides the above components.

In the ink jet recording method according to the present disclosure, two ink compositions may be used, or three or more ink compositions may be used.

In the case where two ink compositions are used, two ink compositions that satisfy the relationship between the ink composition A and the ink composition B are used.

In the case where three or more ink compositions are used, among the three or more ink compositions, at least two ink compositions satisfy the relationship in which one ink composition serves as the ink composition A and the other ink composition serves as the ink composition B when two ink compositions are arbitrarily selected. In the case where three or more ink compositions are used, three or more ink compositions are preferably used such that all the ink compositions satisfy the relationship in which one ink composition serves as the ink composition A and the other ink composition serves as the ink composition B when two ink compositions are arbitrarily selected.

(Coloring Agent)

The ink composition includes at least one coloring agent. The coloring agent in the ink composition is preferably included outside the microcapsule.

The coloring agent is not particularly limited and can be freely selected from known colorants such as pigments, water-soluble dyes, and disperse dyes and used. Among these, pigments are more preferably included from the viewpoint of good weather resistance and high color reproducibility.

The pigments are not particularly limited and can be appropriately selected according to the purpose. Examples the pigments include known organic pigments and inorganic pigments, resin particles dyed with dyestuff, and commercially available pigment dispersions and surface-treated pigments (for example, dispersions obtained by dispersing pigments in water, a liquid compound, an insoluble resin, or the like serving as a dispersion medium and pigments having surfaces treated with a resin, a pigment derivative, or the like).

Examples of the organic pigments and the inorganic pigments include yellow pigments, red pigments, magenta pigments, blue pigments, cyan pigments, green pigments, orange pigments, violet pigments, brown pigments, black pigments, and white pigments.

In the case where pigment are used as the coloring agent, pigment dispersing agents may be used as required in preparation of pigment particles.

Regarding the colorants, such as pigments, and the pigment dispersing agents, paragraphs 0180 to 0200 of JP2014-040529A can be referred to if necessary.

The absorbance ABS of the ink composition is determined by the type and the content of the coloring agent.

Examples of the coloring agent in the ink composition preferably include black pigments, yellow pigments, magenta pigments, and cyan pigments, and more preferably include carbon black, quinacridone pigments, copper phthalocyanine pigments, monoazo pigments, and disazo pigments.

When the coloring agent in the ink composition is any of the above pigments, the absorbance ABS is easily adjusted.

Examples of the quinacridone pigments include C.I. Pigment Red 122, 202 (including a mixture with C.I. Pigment Violet 19), 207, and 209.

Examples of the copper phthalocyanine pigments include C.I. Pigment Blue 15, 15:1, 15:2, 15:3, 15:4, 15:6, 16, 17:1, 75, and 79.

Examples of the monoazo pigments include C.I. Pigment Yellow 1, 2, 3, 4, 5, 10, 65, 73, 74, 75, 97, 98, 111, 116, 130, 167, and 205.

Examples of the disazo pigments include C.I. Pigment Yellow 2, 13, 14, 16, 17, 55, 63, 77, 81, 83, 106, 124, 126, 127, 152, 155, 170, 172, 174, 176, 214, and 219.

The content of the coloring agent in the ink composition can be appropriately selected. The content of the coloring agent in the ink composition is preferably 0.1% to 30% by mass, more preferably 0.5% to 20% by mass, and still more preferably 1.0% to 10% by mass relative to the total mass of the ink composition.

When the ink composition A includes a quinacridone pigment as the coloring agent, the ink composition B preferably includes carbon black as the coloring agent. In this case, more preferably, the ink composition A includes the quinacridone pigment in an amount of 4.0% to 6.0% by mass relative to the total mass of the ink composition A, and the ink composition B includes the carbon black in an amount of 1.5% to 3.0% by mass relative to the total mass of the ink composition B. Still more preferably, the ink composition A includes the quinacridone pigment in an amount of 4.0% to 6.0% by mass relative to the total mass of the ink composition A, and the ink composition B includes the carbon black in an amount of 1.5% to 2.5% by mass relative to the total mass of the ink composition B.

When the ink composition A includes a copper phthalocyanine pigment as the coloring agent, the ink composition B preferably includes carbon black as the coloring agent. In this case, more preferably, the ink composition A includes the copper phthalocyanine pigment in an amount of 1.7% to 3.1% by mass relative to the total mass of the ink composition A, and the ink composition B includes the carbon black in an amount of 1.5% to 3.0% by mass relative to the total mass of the ink composition B. Still more preferably, the ink composition A includes the copper phthalocyanine pigment in an amount of 1.7% to 3.1% by mass relative to the total mass of the ink composition A, and the ink composition B includes the carbon black in an amount of 1.5% to 2.5% by mass relative to the total mass of the ink composition B.

When the ink composition A includes a monoazo pigment as the coloring agent, the ink composition B preferably includes carbon black as the coloring agent. In this case, more preferably, the ink composition A includes the monoazo pigment in an amount of 3.0% to 4.4% by mass relative to the total mass of the ink composition A, and the ink composition B includes the carbon black in an amount of 1.5% to 3.0% by mass relative to the total mass of the ink composition B. Still more preferably, the ink composition A includes the monoazo pigment in an amount of 3.0% to 4.4% by mass relative to the total mass of the ink composition A, and the ink composition B includes the carbon black in an amount of 1.5% to 2.5% by mass relative to the total mass of the ink composition B.

When the ink composition B includes carbon black as the coloring agent, the ink composition B more preferably includes the carbon black in an amount of 1.5% to 2.5% by mass relative to the total mass of the ink composition B from the viewpoint of film strength.

(Microcapsule)

The ink composition includes at least one species of microcapsule enclosing at least a polymerizable compound therein.

The microcapsule has a structure having a shell which serves as an outermost shell and a core which is a region enclosed in the shell. The core includes a polymerizable compound.

The presence of microcapsules can be confirmed by applying an ink composition that includes microcapsules onto a substrate, drying the ink composition to prepare a sample for observing the form, subsequently cutting the sample, and observing the cut surface with an electron microscope or the like.

The microcapsule more preferably has a shell that has a three-dimensional crosslinked structure including at least one bond selected from the group consisting of a urethane bond and a urea bond, and a core that is enclosed in the shell and includes a polymerizable compound and a photopolymerization initiator.

The microcapsule included in the ink composition A and the microcapsule included in the ink composition B preferably have the same composition. Regarding an example of the microcapsules having the same composition, when the microcapsule included in the ink composition A has a composition in which the core includes a polymerizable compound, the microcapsule included in the ink composition B also has a composition in which the core includes the same polymerizable compound as the polymerizable compound included in the ink composition A. Note that the expression "microcapsules having the same composition" refers to microcapsules in which components constituting the shells are the same, and the cores also include the same polymerizable compound component. However, the contents of each of the components in the shell and the core are not necessarily equal to each other.

When the microcapsule included in the ink composition A and the microcapsule included in the ink composition B have the same composition, the film strength of the ink composition is easily controlled by the concentrations of the microcapsules included in the ink composition. In addition, the production cost and the raw material cost can be reduced in the production of the ink.

From the same viewpoint as above, more preferably, the same microcapsules (specifically, microcapsules having the same composition and the same contents of components included therein) are used for the microcapsule included in the ink composition A and the microcapsule included in the ink composition B.

The concentration $M_A$ of the microcapsule in the ink composition A and the concentration $M_B$ of the microcapsule in the ink composition B are as described above.

—Core of Microcapsule—

The microcapsule has a core that is enclosed in a shell described later and that includes a polymerizable compound. The microcapsule preferably has a core that is enclosed in a shell described later and that includes a polymerizable compound and a photopolymerization initiator. The core may include another component such as a sensitizer besides the components described above.

——Enclosure Ratio——

Herein, the term "enclosure ratio (% by mass)" refers to an amount of a polymerizable compound and other components included in the core of microcapsules (that is, enclosed in microcapsules) relative to a total amount of the polymerizable compound etc. in an ink composition when the ink composition including the microcapsules is prepared, and refers to a value determined as described below. Here, a description will be made by using a polymerizable compound as an example.

——Method for Measuring Enclosure Ratio (% by Mass) of Polymerizable Compound——

The operation described below is conducted at a liquid temperature of 25° C.

A coloring agent is removed in advance from an ink composition by centrifugal separation, and the operation described below is then conducted for the ink composition from which the coloring agent has been removed (that is, a water dispersion of microcapsules).

First, a water dispersion that is a measurement target of the enclosure ratio (% by mass) of a polymerizable compound is prepared. Two samples (hereinafter, referred to as a "sample 1" and a "sample 2") having the same mass are taken from the water dispersion prepared above.

Tetrahydrofuran (THF) is added to the sample 1 in an amount 100 times a total solid content in the sample 1 on a mass basis, and mixing is conducted to prepare a diluted liquid. The resulting diluted liquid is subjected to a centrifugal separation under the conditions of 80,000 rpm (round per minute; hereinafter, the same) for 40 minutes. A supernatant liquid (hereinafter, referred to as a "supernatant liquid 1") generated by the centrifugal separation is collected. Through this operation, all the polymerizable compound included in the sample 1 is presumably extracted in the supernatant liquid 1. The mass of the polymerizable compound included in the collected supernatant liquid 1 is measured by liquid chromatography (for example, a liquid chromatography apparatus available from Waters Corporation). The determined mass of the polymerizable compound is defined as a "total amount of polymerizable compound".

The sample 2 is subjected to a centrifugal separation under the same conditions as those used in the centrifugal separation of the diluted liquid. A supernatant liquid (hereinafter, referred to as a "supernatant liquid 2") generated by the centrifugal separation is collected. Through this operation, the polymerizable compound that is not enclosed in the microcapsules (that is, free polymerizable compound) in the sample 2 is presumably extracted in the supernatant liquid 2. The mass of the polymerizable compound included in the collected supernatant liquid 2 is measured by liquid chromatography (for example, a liquid chromatography apparatus available from Waters Corporation). The determined mass of the polymerizable compound is defined as an "amount of free polymerizable compound".

The enclosure ratio (% by mass) of the polymerizable compound is determined in accordance with the formula below on the basis of the "total amount of polymerizable compound" and the "amount of free polymerizable compound".

Enclosure ratio (% by mass) of polymerizable compound=((total amount of polymerizable compound−amount of free polymerizable compound)/total amount of polymerizable compound)×100

When the ink composition includes two or more polymerizable compounds, the total amount of the two or more polymerizable compounds may be defined as a "total amount of polymerizable compounds", a total of amounts of the two or more polymerizable compounds that are in a free state may be defined as an "amount of free polymerizable compounds", and an enclosure ratio of the total of the two or more polymerizable compounds may be determined. Alternatively, an amount of any one of the polymerizable compounds may be defined as a "total amount of polymerizable compound", an amount of the one polymerizable compound that is in a free state may be defined as an "amount of free polymerizable compound", and an enclosure ratio of the one polymerizable compound may be determined.

Whether or not a component other than a polymerizable compound is enclosed in microcapsules can also be confirmed by the same method as the method for examining whether or not a polymerizable compound is enclosed.

However, regarding a compound having a molecular weight of 1,000 or more, the masses of the supernatant liquid 1 and the supernatant liquid 2 are measured by gel permeation chromatography (GPC) to respectively determine a "total amount of compound" and an "amount of free compound", and the enclosure ratio (% by mass) of the compound is determined.

In the measurement by gel permeation chromatography (GPC), HLC (registered trademark)-8020GPC (Tosoh Corporation) may be used as a measurement apparatus, three TSKgel (registered trademark) Super Multipore HZ-H columns (4.6 mm ID×15 cm, Tosoh Corporation) may be used as columns, and THF (tetrahydrofuran) may be used as an eluent. Regarding measurement conditions, the measurement can be conducted at a sample concentration of 0.45% by mass, at a flow rate of 0.35 mL/min, with an amount of sample injected of 10 μL, and at a measurement temperature of 40° C. by using a differential refractive index (RI) detector.

A calibration curve can be prepared from eight samples of "Standard sample TSK standard, polystyrene" available from Tosoh Corporation: "F-40", "F-20", "F-4", "F-1", "A-5000", "A-2500", and "A-1000" and "n-propylbenzene".

The enclosure ratio of a photopolymerization initiator can also be measured by the same method as the above method for determining the enclosure ratio of a polymerizable compound.

From the viewpoint of curing sensitivity of a film, the enclosure ratio (% by mass) of a photopolymerization initiator in the ink composition is preferably 10% by mass or more, more preferably 50% by mass or more, still more preferably 70% by mass or more, still more preferably 80% by mass or more, still more preferably 90% by mass or more, still more preferably 95% by mass or more, still more preferably 97% by mass or more, and particularly preferably 99% by mass or more.

In the case where the ink composition includes two or more photopolymerization initiators, at least one of the photopolymerization initiators preferably has an enclosure ratio in the above range.

—Polymerizable Compound—

The core of the microcapsules includes a polymerizable compound (that is, a compound having a polymerizable group). A polymerizable compound may be used alone, or two or more polymerizable compounds may be used in combination.

The core including a polymerizable compound is advantageous from the viewpoint of improving curing sensitivity of the resulting film and hardness of the film. In particular, the core including two or more polymerizable compounds and including a bifunctional or lower polymerizable compound and a trifunctional or higher polymerizable compound is preferable because the hardness of a film formed by the ink composition and adhesion between the film and a substrate can be combined.

The polymerizable group of the polymerizable compound functions as a polymerizable group of the microcapsules.

Since the microcapsules have polymerizable groups, the microcapsules adjacent to each other can be bonded to each other by irradiation with active energy rays to form a film.

The polymerizable group is not particularly limited as long as the polymerizable group is capable of causing polymerization reaction. The polymerizable group is preferably a group including an ethylenic double bond and more preferably a group having at least one of a vinyl group or a 1-methylvinyl group. From the viewpoint of polymerization reactivity and hardness of a film to be formed, the polymerizable group is particularly preferably a (meth)acryloyl group.

The polymerizable group is preferably present on surface portions of microcapsules (for example, portions that are in contact with a dispersion medium when the microcapsules are dispersed in the dispersion medium).

The polymerizable group can be confirmed by, for example, Fourier-transform infrared spectroscopy (FT-IR).

From the viewpoint of combining adhesion and strength of the resulting film, the content of the polymerizable compound included in the core of the microcapsules (total content when two or more polymerizable compounds are included) is preferably 30% to 75% by mass, more preferably 35% to 65% by mass, and still more preferably 35% to 60% by mass relative to the total solid content of the microcapsules.

In the case where the polymerizable compound incudes a bifunctional or lower polymerizable compound and a trifunctional or higher polymerizable compound, a ratio of the bifunctional or lower polymerizable compound to the total mass of the bifunctional or lower polymerizable compound and the trifunctional or higher polymerizable compound is preferably 50% to 90% by mass, more preferably 50% to 80% by mass, and still more preferably 55% to 65% by mass.

A ratio of the bifunctional or lower polymerizable compound of 50% by mass or more provides better adhesion. On the other hand, a ratio of the bifunctional or lower polymerizable compound of 90% by mass or less provides better strength of the resulting film.

The polymerizable compound included in the core of the microcapsules may be any of a polymerizable monomer, a polymerizable oligomer, and a polymerizable polymer. However, the polymerizable compound is preferably a polymerizable monomer from the viewpoint of easily moving in the microcapsules and easily being disposed at a position where a polymerizable group easily reacts with a polymerizable group of an adjacent microcapsule.

The polymerizable compound preferably has a molecular weight of 100 to 100,000, more preferably 100 to 10,000, still more preferably 100 to 4,000, still more preferably 100 to 2,000, and particularly preferably 100 to 1,000 in terms of weight-average molecular weight.

The weight-average molecular weight can be measured by gel permeation chromatography (GPC) described above.

——Polymerizable Monomer——

In the case where the polymerizable compound is a polymerizable monomer, the polymerizable monomer is advantageous from the viewpoint of improving curing sensitivity of the resulting film and hardness of the film.

In particular, the core including, as a polymerizable compound, a bifunctional or lower polymerizable monomer and a trifunctional or higher polymerizable monomer is preferable because the hardness of the film and adhesion are further improved.

The polymerizable monomer that can be included in the core of microcapsules (hereinafter, also referred to as an "enclosed polymerizable monomer") can be selected from polymerizable monomers having an ethylenically unsaturated bond capable of being subjected to radical polymerization (that is, radical-polymerizable monomers) and polymerizable monomers having a cationically polymerizable group capable of being subjected to cationic polymerization (that is, cationically polymerizable monomers).

Examples of the radical-polymerizable monomers include acrylate compounds, methacrylate compounds, styrene compounds, vinylnaphthalene compounds, N-vinyl heterocyclic compounds, unsaturated polyesters, unsaturated polyethers, unsaturated polyamides, and unsaturated urethanes.

The radical-polymerizable monomers are preferably compounds having ethylenically unsaturated groups.

The radical-polymerizable monomers may be used alone or in combination of two or more thereof.

Examples of the acrylate compounds include monofunctional acrylate compounds such as 2-hydroxyethyl acrylate, butoxyethyl acrylate, carbitol acrylate, cyclohexyl acrylate, tetrahydrofurfuryl acrylate, benzyl acrylate, tridecyl acrylate, 2-phenoxyethyl acrylate (PEA), bis(4-acryloxy polyethoxy phenyl)propane, oligoester acrylate, epoxy acrylate, isobornyl acrylate (IBOA), dicyclopentenyl acrylate, dicyclopentenyl oxyethyl acrylate, dicyclopentanyl acrylate, cyclic trimethylolpropane formal acrylate, 2-(2-ethoxyethoxy)ethyl acrylate, 2-(2-vinyloxyethoxy)ethyl acrylate, octyl acrylate, decyl acrylate, isodecyl acrylate, lauryl acrylate, 3,3,5-trimethylcyclohexyl acrylate, 4-t-butylcyclohexyl acrylate, isoamyl acrylate, stearyl acrylate, isoamyl acrylate, isostearyl acrylate, 2-ethylhexyl diglycol acrylate, 2-hydroxybutyl acrylate, 2-acryloyloxyethylhydrophthalic acid, ethoxydiethylene glycol acrylate, methoxydiethylene glycol acrylate, methoxypolyethylene glycol acrylate, methoxypropylene glycol acrylate, 2-hydroxy-3-phenoxypropyl acrylate, vinyl ether acrylate, 2-acryloyloxyethyl succinic acid, 2-acryloyl oxyphthalic acid, 2-acryloxyethyl-2-hydroxyethylphthalic acid, lactone-modified acrylate, acryloylmorpholine, acrylamide, and substituted acrylamides such as N-methylol acrylamide and diacetone acrylamide;

bifunctional acrylate compounds such as polyethylene glycol diacrylate, polypropylene glycol diacrylate, polytetramethylene glycol diacrylate, 1,3-butylene glycol diacrylate, 1,4-butanediol diacrylate, 1,6-hexanediol diacrylate (HDDA), 1,9-nonanediol diacrylate (NDDA), 1, 10-decanediol diacrylate (DDDA), 3-methylpentanediol diacrylate (3MPDDA), neopentyl glycol diacrylate, tricyclodecane dimethanol diacrylate, bisphenol A ethylene oxide (EO) adduct diacrylate, bisphenol A propylene oxide (PO) adduct diacrylate, ethoxylated bisphenol A diacrylate, hydroxylated neopentyl glycol diacrylate, propoxylated neopentyl glycol diacrylate, alkoxylated dimethyloltricyclodecane diacrylate, polytetramethylene glycol diacrylate, alkoxylated cyclohexanone dimethanol diacrylate, alkoxylated hexanediol diacrylate, dioxane glycol diacrylate, cyclohexanone dimethanol diacrylate, diethylene glycol diacrylate, neopentyl glycol diacrylate, tetraethylene glycol diacrylate, dipropylene glycol diacrylate, tripropylene glycol diacrylate (TPGDA), and neopentyl glycol propylene oxide adduct diacrylate;

trifunctional or higher acrylate compounds such as trimethylolpropane triacrylate, pentaerythritol triacrylate, dipentaerythritol tetraacrylate, ethoxylated isocyanuric acid triacrylate, ε-caprolactone-modified tris-(2-acryloxyethyl) isocyanurate, ditrimethylolpropane tetraacrylate, dipentaerythritol pentaacrylate, dipentaerythritol hexaacrylate, ethoxylated trimethylolpropane triacrylate, propoxylated trimethylolpropane triacrylate, caprolactone-modified trimethylolpropane triacrylate, pentaerythritol tetraacrylate, pentaerythritol ethoxytetraacrylate, glyceryl propoxy triacrylate, ethoxylated dipentaerythritol hexaacrylate, caprolactam-modified dipentaerythritol hexaacrylate, propoxylated glycerol triacrylate, ethoxylated trimethylolpropane triacrylate, and propoxylated trimethylolpropane triacrylate.

Examples of the methacrylate compounds include monofunctional methacrylate compounds such as methyl methacrylate, n-butyl methacrylate, allyl methacrylate, glycidyl methacrylate, benzyl methacrylate, dimethylaminomethyl methacrylate, methoxy polyethylene glycol methacrylate, methoxy triethylene glycol methacrylate, hydroxyethyl methacrylate, phenoxyethyl methacrylate, and cyclohexyl methacrylate.

bifunctional methacrylate compounds such as polyethylene glycol dimethacrylate, polypropylene glycol dimethacrylate, 2,2-bis(4-methacryloxy polyethoxyphenyl)propane, and tetraethylene glycol dimethacrylate;

Examples of the styrene compounds include styrene, p-methylstyrene, p-methoxystyrene, β-methylstyrene, p-methyl-β-methyl styrene, α-methyl styrene, and p-methoxy-β-methylstyrene.

Examples of the vinylnaphthalene compounds include 1-vinylnaphthalene, methyl-1-vinylnaphthalene, p-methyl-1-vinylnaphthalene, 4-methyl-1-vinylnaphthalene, and 4-methoxy-1-vinylnaphthalene.

Examples of the N-vinyl heterocyclic compounds include N-vinylcarbazole, N-vinylpyrrolidone, N-vinylethylacetamide, N-vinylpyrrole, N-vinylphenothiazine, N-vinylacetanilide, N-vinylethylacetamide, N-vinyl succinimide, N-vinylphthalimide, N-vinylcaprolactam, and N-vinylimidazole.

Examples of other radical-polymerizable monomers include allylglycidyl ether, diallyl phthalate, triallyl trimellitate, and N-vinylamides such as N-vinylformamide.

Of these radical-polymerizable monomers, the bifunctional or lower polymerizable monomer is preferably at least one selected from the group consisting of 1,6-hexanediol diacrylate (HDDA), 1,9-nonanediol diacrylate (NDDA), 1,10-decanediol diacrylate (DDDA), 3-methylpentanediol diacrylate (3MPDDA), neopentyl glycol diacrylate, tricyclodecane dimethanol diacrylate, diethylene glycol diacrylate, tetraethylene glycol diacrylate, dipropylene glycol diacrylate, tripropylene glycol diacrylate (TPGDA), cyclohexanone dimethanol diacrylate, alkoxylated hexanediol diacrylate, polyethylene glycol diacrylate, and polypropylene glycol diacrylate.

The trifunctional or higher polymerizable monomer is preferably at least one selected from the group consisting of trimethylolpropane triacrylate, pentaerythritol triacrylate, dipentaerythritol tetraacrylate, ditrimethylolpropane tetraacrylate, dipentaerythritol pentaacrylate, dipentaerythritol hexaacrylate, ethoxylated trimethylolpropane triacrylate, propoxylated trimethylolpropane triacrylate, caprolactone-modified trimethyl olpropane triacrylate, pentaerythritol tetraacrylate, pentaerythritol ethoxytetraacrylate, glyceryl propoxy triacrylate, ethoxylated dipentaerythritol hexaacrylate, caprolactam-modified dipentaerythritol hexaacrylate, propoxylated glycerol triacrylate, ethoxylated trimethylolpropane triacrylate, and propoxylated trimethylolpropane triacrylate.

The combination of a bifunctional or lower radical-polymerizable monomer and a trifunctional or higher radical-polymerizable monomer is preferably a combination of a bifunctional or lower acrylate compound and a trifunctional or higher acrylate compound, more preferably a combination of a bifunctional acrylate compound and a trifunctional or higher acrylate compound, more preferably a combination of a bifunctional acrylate compound and a trifunctional to octafunctional acrylate compound, and more preferably a combination of a bifunctional acrylate compound and a trifunctional to hexafunctional acrylate compound.

Furthermore, it is most preferable to combine, as a bifunctional acrylate compound, at least one selected from the group consisting of 1,6-hexanediol diacrylate (HDDA), 1,9-nonanediol diacrylate (NDDA), 1,10-decanediol diacrylate (DDDA), 3-methylpentanediol diacrylate (3MPDDA), neopentyl glycol diacrylate, tricyclodecane dimethanol diacrylate, diethylene glycol diacrylate, tetraethylene glycol diacrylate, dipropylene glycol diacrylate, tripropylene glycol diacrylate (TPGDA), cyclohexanone dimethanol diacrylate, polyethylene glycol diacrylate, and polypropylene glycol diacrylate, and as a trifunctional to hexafunctional acrylate compound, at least one selected from the group consisting of trimethylolpropane triacrylate, pentaerythritol triacrylate, dipentaerythritol tetraacrylate, ditrimethylolpropane tetraacrylate, dipentaerythritol pentaacrylate, dipentaerythritol hexaacrylate, ethoxylated trimethylolpropane triacrylate, propoxylated trimethylolpropane triacrylate, pentaerythritol tetraacrylate, pentaerythritol ethoxytetraacrylate, glyceryl propoxy triacrylate, ethoxylated dipentaerythritol hexaacrylate, caprolactam-modified dipentaerythritol hexaacrylate, propoxylated glycerol triacrylate, ethoxylated trimethylolpropane triacrylate, and propoxylated trimethylolpropane triacrylate.

Examples of the cationically polymerizable monomers include epoxy compounds, vinyl ether compounds, and oxetane compounds.

The cationically polymerizable monomer is preferably at least one of an olefin, a thioether, acetal, thioxane, thiethane, aziridine, an N, O, S, or P heterocyclic ring, an aldehyde, a lactam, or a compound having a cyclic ester group.

These cationically polymerizable monomers may be used alone or in combination of two or more thereof.

Examples of the epoxy compounds include bifunctional or lower epoxy compounds such as 1,4-butanediol diglycidyl ether, 3-(bis(glycidyloxymethyl)methoxy)-1,2-propanediol, limonene oxide, 2-biphenyl glycidyl ether, 3,4-epoxycyclohexylmethyl-3',4'-epoxycyclohexane carboxylate, epichlorohydrin-bisphenol S-derived epoxides, epoxidized styrene, epichlorohydrin-bisphenol F-derived epoxides, epichlorohydrin-bisphenol A-derived epoxides, epoxidized novolac, and alicyclic polyepoxides.

Examples of alicyclic diepoxides include copolymers of an epoxide and compounds including a hydroxy group, such as a glycol, polyol, and vinyl ether. Specific examples thereof include 3,4-epoxycyclohexylmethyl-3',4'-epoxycycloethyl carbolate, bis(3,4-epoxyhexylmethyl) adipate, limonene diepoxide, and diglycidyl ester of hexahydrophthalic acid.

Examples of other epoxy compounds include trifunctional or higher epoxy compounds such as polyglycidyl esters of polybasic acids, polyglycidyl ethers of polyols, polyglycidyl ethers of polyoxyalkylene glycols, polyglycidyl esters of aromatic polyols, urethane polyepoxy compounds, and poly-epoxy polybutadiene.

Examples of the vinyl ether compounds include bifunctional or lower vinyl ether compounds such as ethyl vinyl ether, n-butyl vinyl ether, isobutyl vinyl ether, octadecyl vinyl ether, cyclohexyl vinyl ether, butanediol divinyl ether, hydroxybutyl vinyl ether, cyclohexanedimethanol monovinyl ether, phenyl vinyl ether, p-methylphenyl vinyl ether, p-methoxyphenyl vinyl ether, methyl vinyl ether, β-methyl vinyl ether, diethylene glycol divinyl ether, triethylene glycol divinyl ether, n-propyl vinyl ether, isopropyl vinyl ether, dodecyl vinyl ether, diethylene glycol monovinyl ether, cyclohexane dimethanol divinyl ether, 4-(vinyloxy)butyl benzoate, bis[4-(vinyloxy)butyl]adipate, bis[4-(vinyloxy)butyl] succinate, 4-(vinyloxymethyl)cyclohexylmethyl benzoate, bis[4-(vinyloxy)butyl]isophthalate, bis[4-(vinyloxymethyl)cyclohexylmethyl]glutarate, 4-(vinyloxy)butyl steatite, bis[4-(vinyloxy)butyl]hexadiyl dicarbamate, bis[4-(vinyloxy)methyl]cyclohexyl]methyl]terephthalate, bis[4-(vinyloxy)methyl]cyclohexyl]methyl]isophthalate, bis[4-(vinyloxy)butyl] (4-methyl-1,3-phenylene)-biscarbamate, bis[4-vinyloxy)butyl] (methylenedi-4,1-phenylene)biscarbamate, and 3-amino-1-propanol vinyl ether; and trifunctional or higher vinyl ether compounds such as tris[4-(vinyloxy)butyl]trimellitate.

Examples of the oxetane compounds include 3-ethyl-3-hydroxymethyl-1-oxetane, 1,4-bis[3-ethyl-3-oxetanylmethoxy)methyl]benzene, 3-ethyl-3-phenoxymethyl-oxetane, bis([1-ethyl(3-oxetanyl)]methyl) ether, 3-ethyl-3-[(2-ethylhexyloxy)methyl]oxetane, 3-ethyl-[(triethoxysilyl propoxy)methyl]oxetane, and 3,3-dimethyl-2-(p-methoxyphenyl)-oxetane.

Besides the radical-polymerizable monomers mentioned above, it is also possible to use radical-polymerizable and crosslinkable monomers that are commercially available or known in the art and that are described in, for example, "Crosslinking Agent Handbook", (1981, Taiseisha Ltd.) edited by Shinzo Yamashita; "UV/EB Curing Handbook (Raw Material Edition)" (1985, Kobunshi Kankokai) edited by Kiyoshi Kato; "Application and Market of UV/EB Curing Technology", p. 79, (1989, CMC Publishing Co., Ltd.) edited by RadTech Japan; and "Polyester Resin Handbook", (1988, Nikkan Kogyo Shimbun, Ltd.) written by Eiichiro Takiyama.

Besides the cationically polymerizable monomers mentioned above, it is also possible to use compounds described in J. V. Crivello et al. "Advances in Polymer Science", 62, pages 1 to 47 (1984); Lee et al. "Handbook of Epoxy Resins", McGraw Hill Book Company, New York (1967); and P. F. Bruins et al. "Epoxy Resin Technology" (1968).

Examples of known polymerizable monomers further include photo-curable polymerizable monomers used in photopolymerizable compositions described in, for example, JP1995-159983A (JP-H07-159983A), JP1995-31399B (JP-H07-31399B), JP1996-224982A (JP-H08-224982A), JP1998-863A (JP-H10-863A), JP1997-134011A (JP-H09-134011A), and JP2004-514014A. These polymerizable monomers can also be applied to the microcapsules.

The polymerizable monomers may be commercially available products on the market. Examples thereof include AH-600 (bifunctional), AT-600 (bifunctional), UA-306H (hexafunctional), UA-306T (hexafunctional), UA-306I (hexafunctional), UA-510H (decafunctional), UF-8001G (bifunctional), and DAUA-167 (bifunctional) (Kyoeisha Chemical Co., Ltd.); SR339A (PEA, monofunctional), SR506 (IBOA, monofunctional), CD262 (bifunctional), SR238 (HDDA, bifunctional), SR341 (3MPDDA, bifunctional), SR508 (bifunctional), SR306H (bifunctional), CD560 (bifunctional), SR833S (bifunctional), SR444 (trifunctional), SR454 (trifunctional), SR492 (trifunctional), SR499 (trifunctional), CD501 (trifunctional), SR502 (trifunctional), SR9020 (trifunctional), CD9021 (trifunctional), SR9035 (trifunctional), SR494 (tetrafunctional), and SR399E (pentafunctional) (SARTOMER); A-NOD-N (bifunctional NDDA), A-DOD-N (bifunctional, DDDA), A-200 (bifunctional), APG-400 (bifunctional), A-BPE-10 (bifunctional), A-BPE-20 (bifunctional), A-9300 (trifunctional), A-9300-1CL (trifunctional), A-TMPT (trifunctional), A-TMM-3L (trifunctional), A-TMMT (tetrafunctional), and AD-TMP (tetrafunctional) (Shin Nakamura Chemical Co., Ltd.); UV-7510B (trifunctional) (The Nippon Synthetic Chemical Industry Co., Ltd.); KAYARAD DCPA-30 (hexafunctional) and KAYARAD DPEA-12 (hexafunctional) (Nippon Kayaku Co., Ltd.); and LIGHT ACRYLATE NPA (bifunctional) and LIGHT ACRYLATE 3EG-A (bifunctional) (Kyoeisha Chemical Co., Ltd.).

Examples of the polymerizable monomers that can be suitably used further include commercially available products such as NPGPODA (neopentyl glycol propylene oxide adduct diacrylate), SR531, SR285, and SR256 (available from SARTOMER); A-DHP (dipentaerythritol hexaacrylate, Shin Nakamura Chemical Co., Ltd.); ARONIX (registered trademark) M-156 (Toagosei Co., Ltd.); V-CAP (BASF Corporation); and Viscoat #192 (Osaka Organic Chemical Industry Ltd.).

In the production of microcapsules, the polymerizable monomer can be included in the core of the microcapsules by dissolving the polymerizable monomer as an oil-phase component together with a component constituting the microcapsules, adding an aqueous-phase component to the oil-phase component, and conducting mixing and emulsification.

The polymerizable monomer preferably has a molecular weight of 100 to 4,000, more preferably 100 to 2,000, and still more preferably 100 to 1,000 in terms of weight-average molecular weight.

The weight-average molecular weight can be measured by gel permeation chromatography (GPC).

The content of the polymerizable monomer is preferably 0.1% to 75% by mass, more preferably 0.5% to 60% by mass, and still more preferably 1% to 50% by mass in the total solid content of the microcapsules. Within the above range, an image having good crosslinkability and good film strength is obtained.

——Polymerizable Oligomer and Polymerizable Polymer——

In the case where the polymerizable compound is a polymerizable oligomer or a polymerizable polymer, the polymerizable oligomer or the polymerizable polymer is advantageous from the viewpoint of reducing the curing shrinkage of the resulting film to suppress a decrease in adhesion between the film and a substrate.

Examples of the polymerizable oligomer and the polymerizable polymer include oligomers and polymers of acrylic resins, urethane resins, polyesters, polyethers, polycarbonates, epoxy resins, and polybutadiene.

Alternatively, for example, resins such as epoxy acrylates, aliphatic urethane acrylates, aromatic urethane acrylates, and polyester acrylates may be used.

Of these, from the viewpoint of reducing the curing shrinkage, resins having both a hard segment and a soft segment and capable of relaxing a stress during curing are preferred. In particular, at least one oligomer or a polymer selected from the group consisting of urethane resins, polyester resins, and epoxy resins are more preferred.

Examples of the polymerizable group preferably include ethylenically unsaturated groups such as a (meth)acryloyl group, a vinyl group, an allyl group, and a styryl group; and an epoxy group. From the viewpoint of polymerization reactivity, at least one group selected from the group consisting of a (meth)acryloyl group, a vinyl group, and a styryl group is more preferred, and a (meth)acryloyl group is particularly preferred.

The polymerizable oligomer and the polymerizable polymer each may have only one polymerizable group or two or more polymerizable groups.

The polymerizable groups can be introduced into a polymer or an oligomer by a polymer reaction or copolymerization.

A polymerizable group can be introduced into a polymer or an oligomer by using, for example, a reaction between a polymer or oligomer having a carboxy group in a side chain and glycidyl methacrylate, or a reaction between a polymer or oligomer having an epoxy group and an ethylenically unsaturated group-containing carboxylic acid such as methacrylic acid. These groups may be used in combination.

The polymerizable oligomer and the polymerizable polymer may be commercially available products on the market. Examples of the commercially available products include acrylic resins such as (ACA)Z200M, (ACA)Z230AA, (ACA)Z251, and (ACA)Z254F (all of which are available from DAICEL-ALLNEX LTD.) and HITALOID 7975D (Hitachi Chemical Company, Ltd.);

Examples thereof further include urethane resins such as EBECRYL (registered trademark) 8402, EBECRYL (registered trademark) 8405, EBECRYL (registered trademark) 9270, EBECRYL (registered trademark) 8311, EBECRYL (registered trademark) 8701, KRM8667, and KRM8528 (all of which are available from DAICEL-ALLNEX LTD.); CN964, CN9012, CN968, CN996, CN975, and CN9782 (all of which are available from SARTOMER); UV-6300B, UV-7600B, UV-7605B, UV-7620EA, and UV-7630B (all of which are available from The Nippon Synthetic Chemical Industry Co., Ltd.); U-6HA, U-15HA, U-108A, U-200PA, and UA-4200 (all of which are available from Shin Nakamura Chemical Co., Ltd.); TESRACK 2300, HITALOID 4863, TESRACK 2328, TESRACK 2350, and HITALOID 7902-1 (all of which are available from Hitachi Chemical Company, Ltd.), and 8UA-017, 8UA-239, 8UA-239H, 8UA-140, 8UA-585H, 8UA-347H, and 8UX-015A (all of which are available from Taisei Fine Chemical Co., Ltd.).

polyester resins such as CN294, CN2254, CN2260, CN2271E, CN2300, CN2301, CN2302, CN2303, and CN2304 (all of which are available from SARTOMER), EBECRYL (registered trademark) 436, EBECRYL (registered trademark) 438, EBECRYL (registered trademark) 446, EBECRYL (registered trademark) 524, EBECRYL (registered trademark) 525, EBECRYL (registered trademark) 811, and EBECRYL (registered trademark) 812 (all of which are available from DAICEL-ALLNEX LTD.);

polyether resins such as BLEMMER (registered trademark) ADE-400A and BLEMMER (registered trademark) ADP-400 (all of which are available from NOF Corporation);

polycarbonate resins such as polycarbonate diol diacrylate (Ube Industries, Ltd.);

epoxy resins such as EBECRYL (registered trademark) 3708 (DAICEL-ALLNEX LTD.), CN120, CN120B60, CN120B80, and CN120E50 (all of which are available from SARTOMER), and HITALOID 7851 (Hitachi Chemical Company, Ltd.); and polybutadiene resins such as CN301, CN303, and CN307 (all of which are available from SARTOMER).

—Photopolymerization Initiator—

The core of the microcapsules preferably includes at least one photopolymerization initiator. That is, the microcapsules preferably enclose at least one photopolymerization initiator therein.

Incorporation of the photopolymerization initiator in the core enhances the sensitivity to active energy rays and thus provides an image having good film strength.

In addition, when the microcapsules enclose a photopolymerization initiator therein, it is possible to use a photopolymerization initiator that has been difficult to use due to its low dispersibility or low solubility in water though the photopolymerization initiator has high sensitivity. Therefore, a water-based ink composition having a higher sensitivity than existing water-based ink compositions can be realized when microcapsules are used in an ink composition. In addition, when the microcapsules enclose a photopolymerization initiator therein, the flexibility of selecting the photopolymerization initiator used is increased, and the flexibility of selecting the light source is also increased. Accordingly, curing sensitivity can be improved compared with that in existing ink compositions.

From the same viewpoint as above, microcapsules included in the ink composition A and the ink composition B each preferably enclose a photopolymerization initiator therein.

The photopolymerization initiator that can be included in the cores of the microcapsules (hereinafter, also referred to as an "enclosed photopolymerization initiator") can be appropriately selected from known photopolymerization initiators.

The photopolymerization initiators are compounds that absorb light (that is, active energy rays) to generate radicals or cations, which are polymerization-initiating species.

The photopolymerization initiator may be a known compound. Preferred examples of the photopolymerization initiator include (a) carbonyl compounds such as aromatic ketones, (b) acylphosphine oxide compounds, (c) aromatic onium salt compounds, (d) organic peroxides, (e) thio compounds, (f) hexaaryl biimidazole compounds, (g) ketoxime ester compounds, (h) borate compounds, (i) azinium compounds, (j) metallocene compounds, (k) active ester compounds, (l) compounds having a carbon-halogen bond, and (m) alkylamine compounds.

The core may include, as a photopolymerization initiator, one of the above compounds (a) to (m) alone or two or more of the compounds (a) to (m) in combination.

Preferred examples of the (a) carbonyl compounds, the (b) acylphosphine oxide compounds, and the (e) thio compounds include compounds having a benzophenone skeleton or a thioxanthone skeleton described in "RADIATION CURING IN POLYMER SCIENCE AND TECHNOLOGY", J. P. FOUASSIER, J. F. RABEK (1993), pp. 77 to 117.

More preferred examples thereof include α-thiobenzophenone compounds described in JP1972-6416B (JP-S47-6416B), benzoin ether compounds described in JP1972-3981B (JP-547-3981B), α-substituted benzoin compounds described in JP1972-22326B (JP-S47-22326B), benzoin derivatives described in JP1972-23664B (JP-547-23664B), aroyl phosphonates described in JP1982-30704A (JP-S57-30704A), dialkoxy benzophenones described in JP1985-26483B (JP-560-26483B), benzoin ethers described in JP1985-26403B (JP-560-26403B) and JP1987-81345A (JP-562-81345A), α-aminobenzophenones described in JP1989-34242B (JP-H01-34242B), US4318791A, and EP0284561A, p-di(dimethylaminobenzoyl)benzene described in JP1990-211452A (JP-H02-211452A), thio-substituted aromatic ketones described in JP1986-194062A (JP-S61-194062A), acylphosphine sulfides described in JP1990-9597B (JP-H02-9597B), acylphosphines described in JP1990-9596B (JP-H02-9596B), thioxanthones described in JP1988-61950B (JP-S63-61950B), coumarins described in JP1984-42864B (JP-S59-42864B), and compounds described in WO2015/158745A.

Furthermore, the photopolymerization initiators described in JP2008-105379A or JP2009-114290A are also preferred.

Examples of commercially available products of the photopolymerization initiator include IRGACURE (registered trademark) 184, 369, 500, 651, 819, 907, 1000, 1300, 1700, and 1870, DAROCUR (registered trademark) 1173, 2959, and 4265, ITX, and LUCIRIN (registered trademark) TPO [all of which are available from BASF Corporation], ESACURE (registered trademark) KT037, KT046, KIP150, and EDB [all of which are available from Lamberti], H-Nu (registered trademark) 470 and 470X [all of which are available from Spectra Group Limited, Inc.], Omnipol 9210 [available from IGM Resins], and SpeedCure7040 [available from LAMBSON LIMITED].

Of these photopolymerization initiators, at least one compound selected from the group consisting of the (a) carbonyl compounds and the (b) acylphosphine oxide compounds is more preferred as the photopolymerization initiator from the viewpoint of sensitivity to UV light. Specific examples thereof include bis(2,4,6-trimethylbenzoyl)-phenylphosphine oxide (for example, IRGACURE (registered trademark) 819 available from BASF Corporation), 2-(dimethylamino)-1-(4-morpholinophenyl)-2-benzyl-1-butanone (for example, IRGACURE (registered trademark) 369 available from BASF Corporation), 2-methyl-1-(4-methylthiophenyl)-2-morpholinopropan-1-one (for example, IRGACURE (registered trademark) 907 available from BASF Corporation), 1-hydroxy-cyclohexyl-phenyl-ketone (for example, IRGACURE (registered trademark) 184 available from BASF Corporation), 2-hydroxy-2-methyl-1-phenyl-propan-1-one (for example, IRGACURE (registered trademark) 1173 available from BASF Corporation), and 2,4,6-trimethylbenzoyl-diphenyl-phosphine oxide (for example, DAROCUR (registered trademark) TPO and LUCIRIN (registered trademark) TPO (both of which are available from BASF Corporation).

Of these, from the viewpoint of suitability to LED light, the photopolymerization initiator is preferably an (b) acylphosphine oxide compound and more preferably a monoacylphosphine oxide compound (particularly preferably, 2,4,6-trimethylbenzoyl-diphenyl-phosphine oxide) or a bisacylphosphine oxide compound (particularly preferably, bis(2,4,6-trimethylbenzoyl)-phenylphosphine oxide).

In the production of microcapsules, the photopolymerization initiator can be included in the core of the microcapsules by dissolving the photopolymerization initiator as an oil-phase component together with a component constituting the microcapsules, adding an aqueous-phase component to the oil-phase component, and conducting mixing and emulsification.

The content of the photopolymerization initiator is preferably 0.1% to 25% by mass, more preferably 0.5% to 20% by mass, and still more preferably 0.5% to 15% by mass relative to the total solid content of the microcapsules.

Regarding a ratio of the content of a photopolymerization initiator and the content of the above-described polymerizable compound in the core when the core of the microcapsules includes the photopolymerization initiator, the content of the photopolymerization initiator is preferably 0.5% to 25% by mass relative to the content of the polymerizable compound.

When the content of the photopolymerization initiator in the core is 0.5% by mass or more relative to the content of the polymerizable compound, the film strength of the ink composition further improves. On the other hand, when the content of the photopolymerization initiator in the core is 25% by mass or less relative to the content of the polymerizable compound, the ejection performance of the ink composition further improves.

From the same viewpoint as above, the content of the photopolymerization initiator in the core is more preferably 1% to 20% by mass and still more preferably 5% to 10% by mass relative to the content of the polymerizable compound.

In particular, the contents of the photopolymerization initiators enclosed in the microcapsules included in the ink composition A and the ink composition B are each preferably within the above range.

—Sensitizer—

The core of the microcapsules may include at least one sensitizer.

Incorporation of the sensitizer in the core of the microcapsules can further accelerate decomposition of the photopolymerization initiator by irradiation with active energy rays.

The sensitizer is a substance that absorbs particular active energy rays to be in an electronically excited state. The sensitizer in the electronically excited state comes in contact with the photopolymerization initiator to cause actions such as electron transfer, energy transfer, and generation of heat. This accelerates a chemical change in the photopolymerization initiator, that is, decomposition, generation of a radical, an acid, or a base, and the like.

Examples of the sensitizer include benzophenone, thioxanthone, isopropylthioxanthone, anthraquinone, 3-acylcoumarin derivatives, terphenyl, styryl ketone, 3-(aroylmethylene)thiazoline, camphorquinone, eosin, rhodamine, and erythrosine.

In addition, the compound represented by the general formula (i) described in JP2010-24276A and the compound represented by the general formula (I) described in JP1994-107718A (JP-H06-107718A) can also be suitably used as the sensitizer.

Furthermore, the compounds described in WO2015/158745A, specifically, for example, tertiary aliphatic amines (e.g., methyldiethanolamine, dimethylethanolamine, triethanolamine, triethylamine, and N-methylmorpholine); aromatic amines (e.g., amyl para-dimethylaminobenzoate, 2-butoxyethyl 4-(dimethylamino)benzoate, 2-(dimethylamino)ethyl benzoate, ethyl 4-(dimethylamino)benzoate, and 2-ethylhexyl 4-(dimethyl amino)benzoate; and (meth)acrylated amines [e.g., dialkylaminoalkyl (meth)acrylates (such as diethylaminoethyl acrylate) and N-alkylmorpholine (meth)acrylates (such as N-alkylmorpholine acrylate)] can also be suitably used.

Of these, from the viewpoint of suitability to LED light and reactivity with photopolymerization initiators, the sensitizer is preferably at least one selected from the group consisting of thioxanthone, isopropylthioxanthone, and benzophenone, more preferably at least one selected from the group consisting of thioxanthone and isopropylthioxanthone, and still more preferably isopropylthioxanthone.

When the core of the microcapsules includes a sensitizer, the content of the sensitizer is preferably 0.1% to 25% by mass, more preferably 0.5% to 20% by mass, and still more preferably 1% to 15% by mass relative to the total solid content of the microcapsules.

(Shell of Microcapsule)

The microcapsule preferably has a shell that has a three-dimensional crosslinked structure including at least one bond selected from the group consisting of a urethane bond and a urea bond (hereinafter, also simply referred to as a "shell").

In the present specification, the term "three-dimensional crosslinked structure" refers to a three-dimensional mesh structure formed by crosslinking.

The three-dimensional crosslinked structure of the shell of the microcapsules contributes to an improvement in dispersion stability and redispersibility when the microcapsules are used in an ink composition.

The term "redispersibility" refers to a property that when a water-based liquid (such as water, an aqueous solution, or a water dispersion) is supplied to a solidified product formed by vaporization of water in an ink composition, particles (here, microcapsules) in the solidified product are thereby again dispersed in the water-based liquid. An example of the solidified product is a solidified product of an ink composition, the solidified product being formed on a coating head or an ink jet head.

Whether or not the shell of the microcapsules has the three-dimensional crosslinked structure is confirmed as follows. The operation described below is conducted at a liquid temperature of 25° C.

First, a coloring agent is removed from an ink composition by centrifugal separation, and the operation described below is then conducted for the ink composition from which the coloring agent has been removed (that is, a water dispersion of microcapsules).

A sample is taken from the water dispersion. Tetrahydrofuran (THF) is added to the prepared sample in an amount 100 times a total solid content in the sample on a mass basis, and mixing is conducted to prepare a diluted liquid. The resulting diluted liquid is subjected to a centrifugal separation under the conditions of 80,000 rpm for 40 minutes. After the centrifugal separation, whether a residue is present or not is confirmed by visual observation. If a residue is present, the residue is dispersed again in water to prepare a redispersion. The particle size distribution of the resulting redispersion is measured by a light scattering method using a wet particle size distribution measuring apparatus (LA-960 available from HORIBA, Ltd.).

In the case where the particle size distribution can be confirmed by the operation described above, the shell of the microcapsules is determined to have a three-dimensional crosslinked structure.

The three-dimensional crosslinked structure of the shell of the microcapsules can be formed by, for example, a reaction between a trifunctional or higher isocyanate compound or a bifunctional isocyanate compound and water or a compound having two or more active hydrogen groups.

In particular, when a raw material used in the production of the microcapsules includes at least one compound having three or more reactive groups (isocyanate groups or active hydrogen groups), the crosslinking reaction three-dimensionally proceeds more effectively, and thus a three-dimensional mesh structure is more effectively formed.

The three-dimensional crosslinked structure in the microcapsules is preferably a product formed by a reaction between a trifunctional or higher isocyanate compound and water.

The three-dimensional crosslinked structure of the shell preferably includes a structure (1) below.

The three-dimensional crosslinked structure may include a plurality of structures (1) below. The structures (1) may be the same structure or different structures.

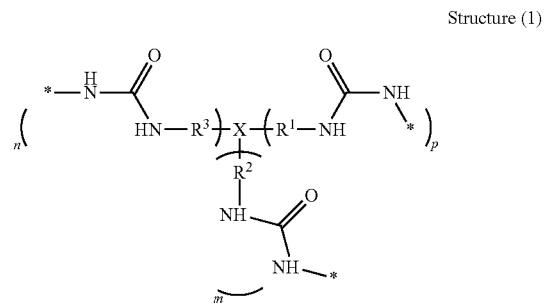

Structure (1)

In the structure (1), X represents an organic group having a valence of (p+m+n) and formed by linking at least two selected from the group consisting of a hydrocarbon group which may have a ring structure, —NH—, >N—, —C(=O)—, —O—, and —S—.

In the structure (1), $R^1$, $R^2$, and $R^3$ each independently represent a hydrocarbon group which has 5 to 15 carbon atoms and which may have a ring structure.

In the structure (1), each * represents a binding site, p, m, and n are each 0 or more, and p+m+n is 3 or more.

The total of the molecular weight of X, $R^1$, $R^2$, and $R^3$ is preferably less than 2,000, preferably less than 1,500, and more preferably less than 1,000. When the total of the molecular weight of X, $R^1$, $R^2$, and $R^3$ is less than 2,000, the enclosure ratio of a compound enclosed in the core can be increased.

The hydrocarbon group in the organic group represented by X is preferably a linear or branched hydrocarbon group having 1 to 15 carbon atoms and more preferably a linear or branched hydrocarbon group having 1 to 10 carbon atoms.

Examples of the ring structures which may be included in the hydrocarbon group in the organic group represented by X and in the hydrocarbon groups represented by $R^1$, $R^2$, and $R^3$ include alicyclic structures and aromatic ring structures.

Examples of the alicyclic structures include a cyclohexane ring structure, a bicyclohexane ring structure, a bicyclodecane ring structure, an isobornene ring structure, a dicyclopentane ring structure, an adamantane ring structure, and a tricyclodecane ring structure.

Examples of the aromatic ring structures include a benzene ring structure, a naphthalene ring structure, and a biphenyl ring structure.

In the structure (1), p is 0 or more, preferably 1 to 10, more preferably 1 to 8, still more preferably 1 to 6, and particularly preferably 1 to 3.

In the structure (1), m is 0 or more, preferably 1 to 10, more preferably 1 to 8, still more preferably 1 to 6, and particularly preferably 1 to 3.

In the structure (1), n is 0 or more, preferably 1 to 10, more preferably 1 to 8, still more preferably 1 to 6, and particularly preferably 1 to 3.

In the structure (1), p+m+n is preferably an integer of 3 to 10, more preferably an integer of 3 to 8, and still more preferably an integer of 3 to 6.
The organic group represented by X and having a valence of (p+m+n) is preferably a group represented by any one of (X-1) to (X-12) below.
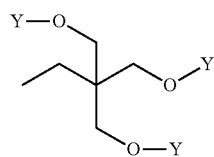
(X-1)
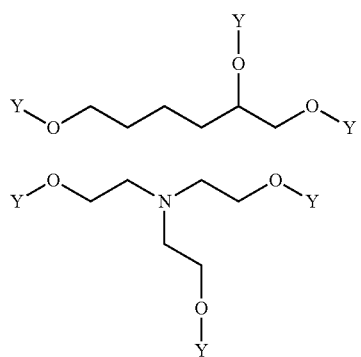
(X-2)
(X-3)
(X-4)
(X-5)
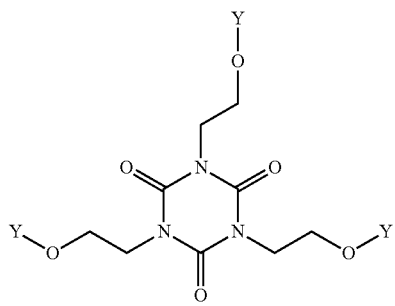
(X-6)
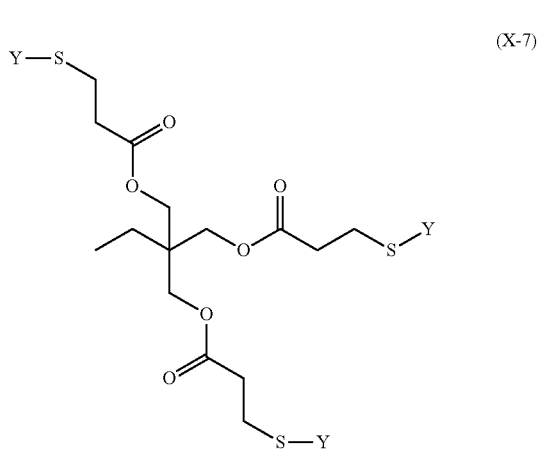
(X-7)
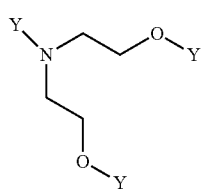
(X-8)
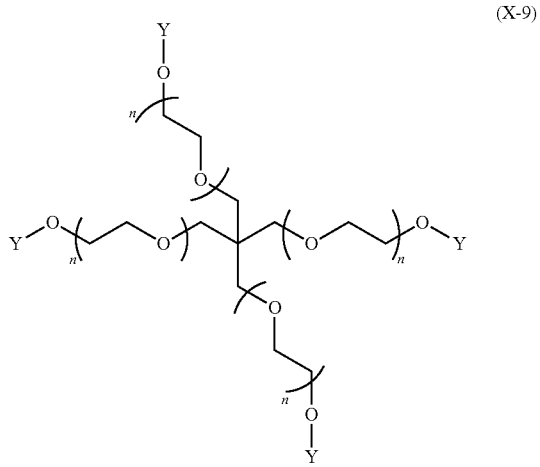
(X-9)

-continued

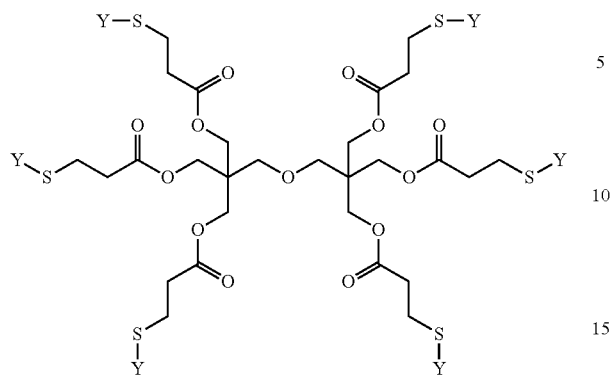
(X-10)

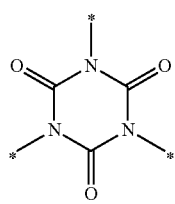
(X-11)

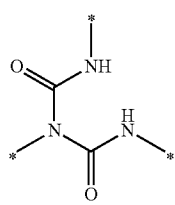
(X-12)

In the formulae (X-1) to (X-12), each n represents an integer of 1 to 200, preferably an integer of 1 to 50, more preferably an integer of 1 to 15, and particularly preferably an integer of 1 to 8.

In the formulae (X-11) and (X-12), each * represents a binding site. In the formulae (X-1) to (X-10), each Y represents (Y-1) below.

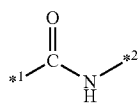
(Y-1)

In (Y-1), *$^1$ represents a binding site to S or O in (X-1) to (X-10), and *$^2$ represents a binding site to $R^1$, $R^2$, or $R^3$ in the structure (1).

In the structure (1), $R^1$, $R^2$, and $R^3$ each independently represent a hydrocarbon group which has 5 to 15 carbon atoms and which may have a ring structure.

The hydrocarbon groups in $R^1$, $R^2$, and $R^3$ each may have a substituent. Examples of the substituent include hydrophilic groups which can be included in the shell, the hydrophilic groups being described below.

Preferably, $R^1$, $R^2$, and $R^3$ are each independently a group represented by any one of (R-1) to (R-20) below. In (R-1) to (R-20), each * represents a binding site.

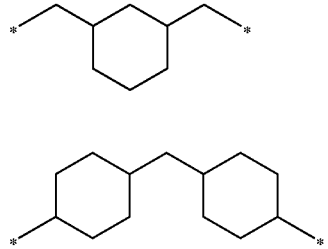
(R-1)

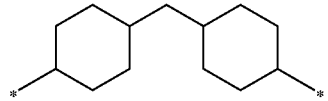
(R-2)

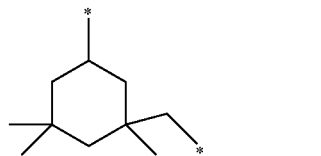
(R-3)

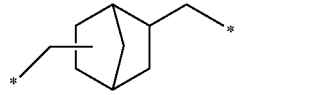
(R-4)

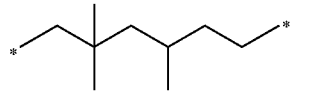
(R-5)

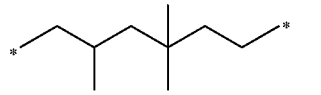
(R-6)

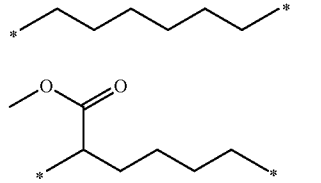
(R-7)

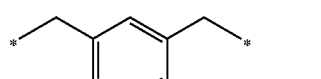
(R-8)

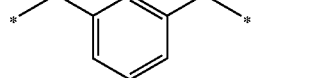
(R-9)

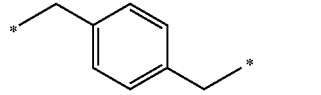
(R-10)

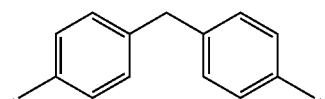
(R-11)

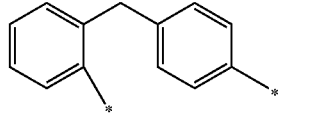
(R-12)

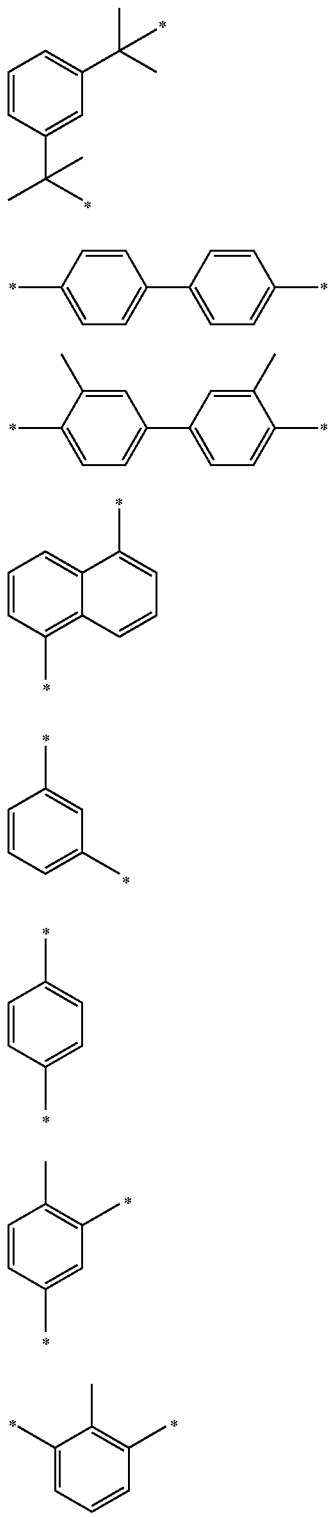

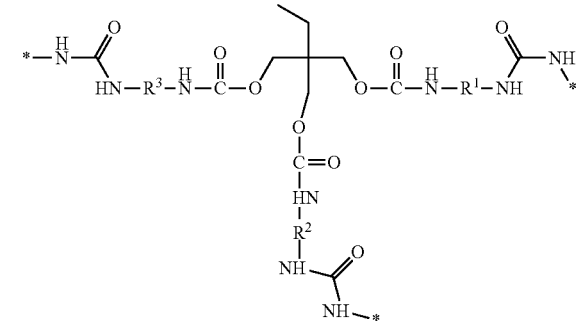

Structure (2)

In the structure (2), $R^1$, $R^2$, and $R^3$ each independently represent a hydrocarbon group which has 5 to 15 carbon atoms and which may have a ring structure.

The hydrocarbon groups represented by $R^1$, $R^2$, and $R^3$ of the structure (2) respectively have the same definitions and preferred ranges as the hydrocarbon groups represented by $R^1$, $R^2$, and $R^3$ of the structure (1).

In the structure (2), each * represents a binding site.

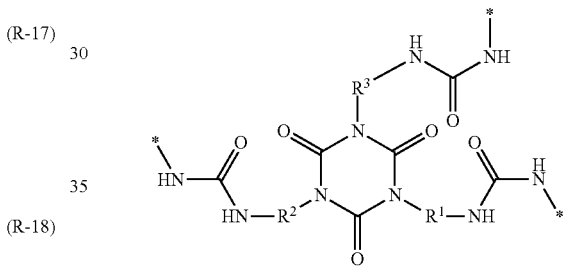

Structure (3)

In the structure (3), $R^1$, $R^2$, and $R^3$ each independently represent a hydrocarbon group which has 5 to 15 carbon atoms and which may have a ring structure.

The hydrocarbon groups represented by $R^1$, $R^2$, and $R^3$ of the structure (3) respectively have the same definitions and preferred ranges as the hydrocarbon groups represented by R', $R^2$, and $R^3$ of the structure (1).

In the structure (3), each * represents a binding site.

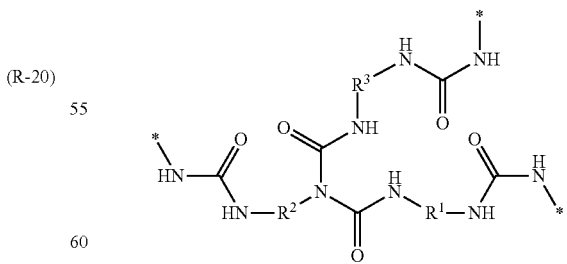

Structure (4)

The content of the structure (1) in the shell is preferably 8% to 100% by mass, more preferably 25% to 100% by mass, and still more preferably 50% to 100% by mass relative to the total mass of the shell.

The shell preferably includes, as the structure (1), at least one structure of a structure (2), a structure (3), or a structure (4) below.

In the structure (4), $R^1$, $R^2$, and $R^3$ each independently represent a hydrocarbon group which has 5 to 15 carbon atoms and which may have a ring structure.

The hydrocarbon groups represented by $R^1$, $R^2$, and $R^3$ of the structure (4) respectively have the same definitions and preferred ranges as the hydrocarbon groups represented by R', $R^2$, and $R^3$ of the structure (1).

In the structure (4), each * represents a binding site.

Specific examples of the structures (1) to (4) include structures shown in Table 1 below.

TABLE 1

| | Structure (1) | | | | | | Corresponding |
|---|---|---|---|---|---|---|---|
| X | $R^1$ | $R^2$ | $R^3$ | p | n | m | structure |
| X-1 | R-1 | R-1 | R-1 | 1 | 1 | 1 | Structure (2) |
| X-1 | R-7 | R-7 | R-7 | 1 | 1 | 1 | Structure (2) |
| X-11 | R-1 | R-1 | R-1 | 1 | 1 | 1 | Structure (3) |
| X-11 | R-7 | R-7 | R-7 | 1 | 1 | 1 | Structure (3) |
| X-12 | R-7 | R-7 | R-7 | 1 | 1 | 1 | Structure (4) |

The three-dimensional crosslinked structure of the shell of a microcapsules can be formed by, for example, a reaction between a trifunctional or higher isocyanate compound or a bifunctional isocyanate compound and water or a compound having two or more active hydrogen groups.

In particular, when a raw material used in the production of the microcapsules includes at least one compound having three or more reactive groups (isocyanate groups or active hydrogen groups), the crosslinking reaction three-dimensionally proceeds more effectively, and thus a three-dimensional mesh structure is more effectively formed.

The three-dimensional crosslinked structure of the shell of the microcapsules is preferably a product formed by a reaction between a trifunctional or higher isocyanate compound and water.

—Trifunctional or Higher Isocyanate Compound—

Trifunctional or higher isocyanate compounds are compounds having three or more isocyanate groups in a molecule thereof. In the present disclosure, both compounds synthesized by the methods described below and known compounds can be used as the trifunctional or higher isocyanate compound. Examples of the trifunctional or higher isocyanate compound includes trifunctional or higher aromatic isocyanate compounds and trifunctional or higher aliphatic isocyanate compounds.

Examples of the known compounds include compounds described in, for example, "Polyurethane Resin Handbook" (edited by Keiji Iwata, issued by Nikkan Kogyo Shimbun, Ltd. (1987)).

The trifunctional or higher isocyanate compound is preferably a compound having three or more isocyanate groups in a molecule thereof, and specifically, a compound represented by a formula (X) below.

$X^1$-(-NCO)$_n$      Formula (X)

In the formula (X), $X^1$ represents an n-valent organic group.

In the formula (X), n is 3 or more. n is preferably 3 to 10, more preferably 3 to 8, and still more preferably 3 to 6.

The compound represented by the formula (X) is preferably a compound represented by a formula (11) below.

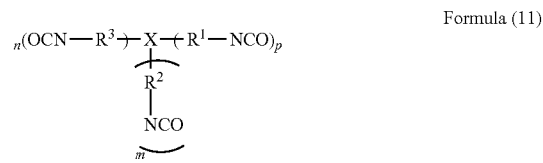

Formula (11)

In the formula (11), X, $R^1$, $R^2$, $R^3$, p, m, and n respectively have the same definitions as X, $R^1$, $R^2$, $R^3$, p, m, and n in the structure (1) described above, and preferred embodiments thereof are also the same as those in the structure (1).

The trifunctional or higher isocyanate compound is preferably a compound derived from a bifunctional isocyanate compound (compound having two isocyanate groups in a molecule thereof).

The trifunctional or higher isocyanate compound is more preferably an isocyanate compound derived from at least one selected from the group consisting of isophorone diisocyanate, hexamethylene diisocyanate, trimethylhexamethylene diisocyanate, 1,3-bis(isocyanatomethyl)cyclohexane, m-xylylene diisocyanate, and dicyclohexylmethane 4,4'-diisocyanate.

Herein, the term "derived" means that the above bifunctional isocyanate compound is used as a starting material and a structure derived from the bifunctional isocyanate compound is included.

Examples of the trifunctional or higher isocyanate compound preferably further include trifunctional or higher isocyanate compounds (adducts) obtained as adduct products (adducts) of a bifunctional or higher isocyanate compound (compound having two or more isocyanate groups in a molecule thereof) and a compound having three or more active hydrogen groups in a molecule thereof, such as a trifunctional or higher polyol, polyamine, or polythiol; trimers of a bifunctional or higher isocyanate compound (biurets or isocyanurates); and compounds having three or more isocyanate groups in a molecule thereof, such as formalin condensate of benzene isocyanate.

These trifunctional or higher isocyanate compounds may be mixtures including a plurality of compounds. The mixtures preferably include a compound represented by a formula (11A) or a formula (11B) shown below as a main component and may include other components.

——Adduct——

The adduct-type trifunctional or higher isocyanate compound is preferably a compound represented by the formula (11A) or the formula (11B) below.

Formula (11A)

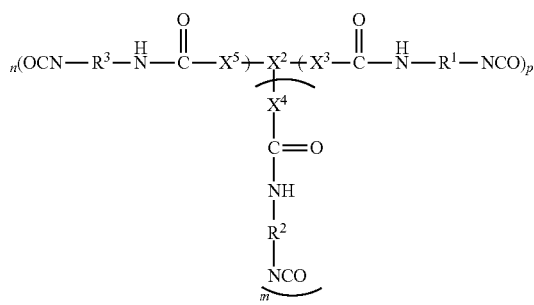

Formula (11B)

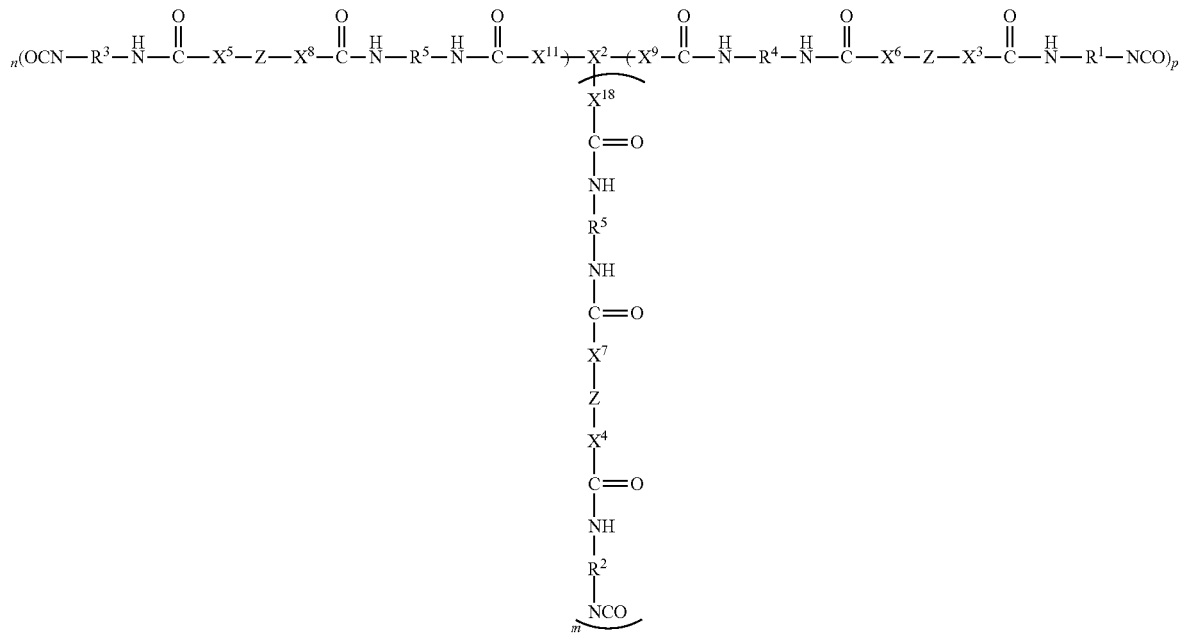

In the formulae (11A) and (11B), $X^2$ is an organic group having a valence of (p+m+n), p, m, and n are each 0 or more, and p+m+n is 3 or more.

In the formulae (11A) and (11B), $X^3$ to $X^{11}$ each independently represent O, S, or NH. In the formulae (11A) and (11B), $R^1$ to $R^6$ each independently represent a divalent organic group.

In the formulae (11A) and (11B), Z represents a divalent organic group.

In the formulae (11A) and (11B), $X^2$ is preferably an organic group having a valence of (p+m+n) and formed by linking at least two selected from the group consisting of a hydrocarbon group which may have a ring structure, —NH—, >N—, —C(=O)—, —O—, and —S—.

In the formulae (11A) and (11B), p+m+n is preferably 3 to 10, more preferably 3 to 8, and still more preferably 3 to 6.

In the formulae (11A) and (11B), $X^3$ to $X^{11}$ are each independently preferably O or S, and more preferably O.

In the formulae (11A) and (11B), $R^1$ to $R^6$ are each independently preferably a hydrocarbon group which has 5 to 15 carbon atoms and which may have a ring structure.

In the formulae (11A) and (11B), preferred embodiments of $R^1$ to $R^6$ are each independently the same as preferred embodiments of $R^1$ in the structure (1).

In the formulae (11A) and (11B), when $X^2$ is a hydrocarbon group which may have a ring structure, examples of the ring structure include alicyclic structures and aromatic ring structures.

Examples of the alicyclic structures include a cyclohexane ring structure, a bicyclohexane ring structure, a bicyclodecane ring structure, an isobornene ring structure, a dicyclopentane ring structure, an adamantane ring structure, and a tricyclodecane ring structure.

Examples of the aromatic ring structures include a benzene ring structure, a naphthalene ring structure, and a biphenyl ring structure.

In the formulae (11A) and (11B), when $R^1$ to $R^6$ are each a hydrocarbon group which has 5 to 15 carbon atoms and which may have a ring structure, examples of the ring structure include alicyclic structures and aromatic ring structures.

Examples of the alicyclic structures include a cyclohexane ring structure, a bicyclohexane ring structure, a bicyclodecane ring structure, an isobornene ring structure, a dicyclopentane ring structure, an adamantane ring structure, and a tricyclodecane ring structure.

Examples of the aromatic ring structures include a benzene ring structure, a naphthalene ring structure, and a biphenyl ring structure.

In the formulae (11A) and (11B), the organic group represented by $X^2$ and having a valence of (p+m+n) is preferably a group represented by any one of (X2-1) to (X2-10) below.

(X2-1)

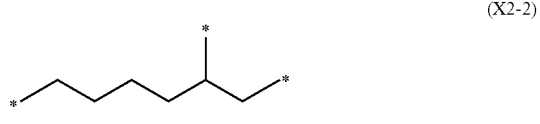
(X2-2)

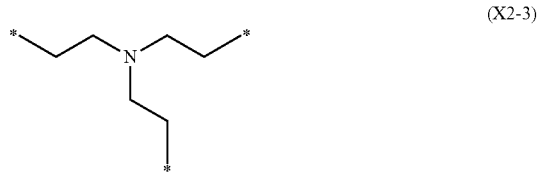
(X2-3)

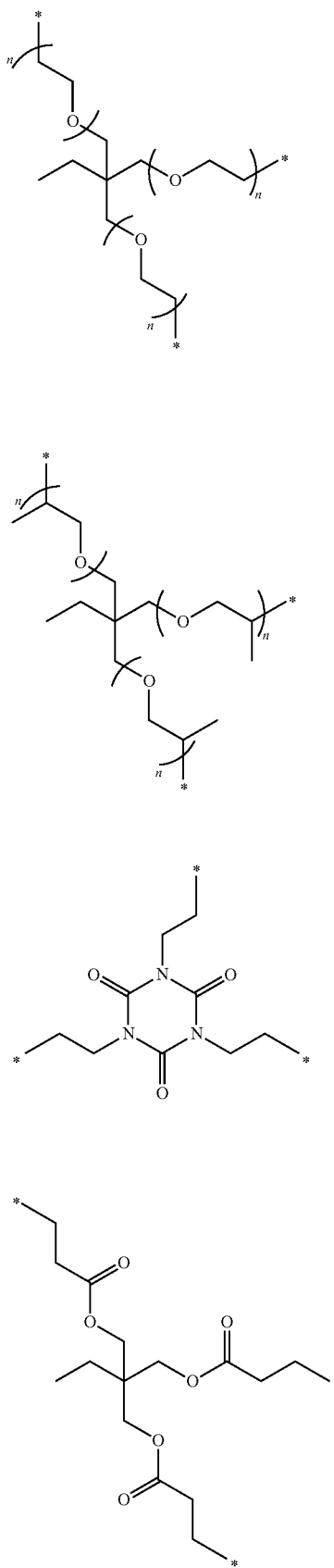

(X2-4)
(X2-5)
(X2-6)
(X2-7)

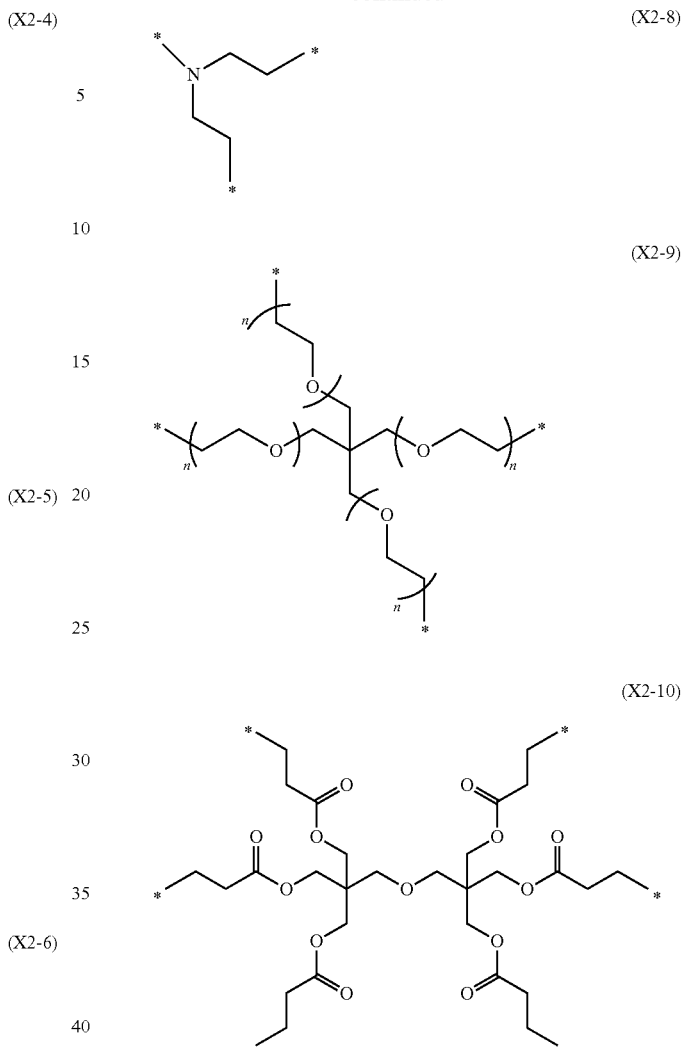

(X2-8)
(X2-9)
(X2-10)

In the formulae (X2-1) to (X2-10), each n represents an integer of 1 to 200, preferably an integer of 1 to 50, more preferably an integer of 1 to 15, and particularly preferably an integer of 1 to 8.

In the formulae (X2-1) to (X2-10), each * represents a binding site.

In the formula (11B), the divalent organic group represented by Z is preferably a hydrocarbon group, a group having a polyoxyalkylene structure, a group having a polycaprolactone structure, a group having a polycarbonate structure, or a group having a polyester structure.

The hydrocarbon group in Z may be a straight-chain hydrocarbon group, a branched-chain hydrocarbon group, or a cyclic hydrocarbon group.

The number of carbons of the hydrocarbon group in Z is preferably 2 to 30.

In the formulae (11A) and (11B), $R^1$ to $R^6$ are each independently preferably a group represented by any one of the groups (R-1) to (R-20).

In the formulae (11A) and (11B), $R^1$ to $R^6$ are each independently preferably a group represented by any one of the groups (R-1) to (R-20).

In the formulae (11A) and (11B), $R^1$ to $R^6$ are each independently preferably any one of the group (R-3) derived from isophorone diisocyanate (IPDI), the group (R-7) derived from hexamethylene diisocyanate (HDI), the group (R-5) derived from trimethylhexamethylene diisocyanate (TMHDI), the group (R-9) derived from m-xylylene diisocyanate (XDI), the group (R-1) derived from 1,3-bis(isocyanatomethyl)cyclohexane, and the group (R-2) derived from dicyclohexylmethane 4,4'-diisocyanate.

The compound represented by the general formula (11A) is preferably a compound represented by a formula (11A-1) below.

Formula (11A-1)

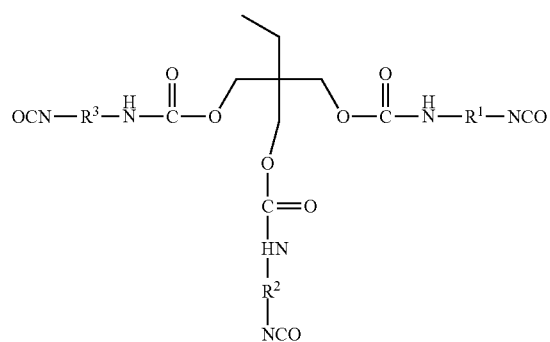

In the formula (11A-1), $R^1$, $R^2$, and $R^3$ respectively have the same definitions as R', $R^2$, and $R^3$ in the formula (11A) and preferred embodiments thereof are also the same as those in the formula (11A).

The adduct-type trifunctional or higher isocyanate compound can be synthesized by allowing a compound having three or more active hydrogen groups in a molecule thereof, the compound being described below, and a bifunctional or higher isocyanate compound described below to react with each other.

In the present specification, the term "active hydrogen group" refers to a hydroxy group, a primary amino group, a secondary amino group, or a mercapto group.

The adduct-type trifunctional or higher isocyanate compound can be obtained, for example, by heating (50° C. to 100° C.) a compound having three or more active hydrogen groups in a molecule thereof and a bifunctional or higher isocyanate compound in an organic solvent under stirring or by stirring these compounds at a low temperature (0° C. to 70° C.) while adding a catalyst such as stannous octoate (synthesis scheme 1 below).

In general, regarding the number of moles (number of molecules) of a bifunctional or higher isocyanate compound that is allowed to react with a compound having three or more active hydrogen groups in a molecule thereof, the number of moles (number of molecules) of the bifunctional or higher isocyanate compound used is 0.6 times or more the number of moles of active hydrogen groups (number of equivalents of active hydrogen groups) in the compound having three or more active hydrogen groups in a molecule thereof. The number of moles of the bifunctional or higher isocyanate compound is preferably 0.6 to 5 times, more preferably 0.6 to 3 times, and still more preferably 0.8 to 2 times the number of moles of active hydrogen groups.

Synthesis Scheme 1

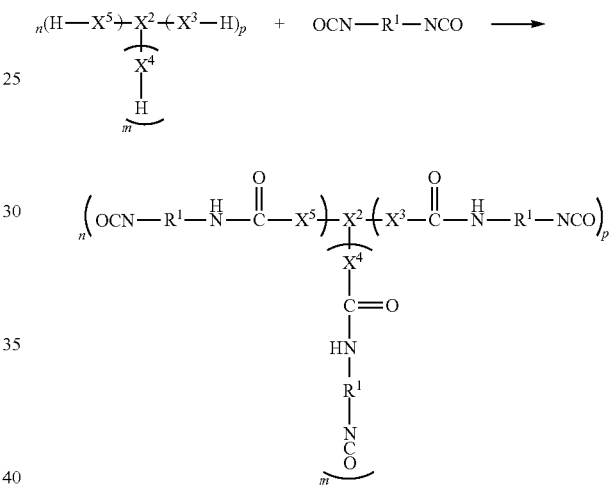

Alternatively, the adduct-type trifunctional or higher isocyanate compound can be obtained by synthesizing an adduct (prepolymer; "(PP)" in the synthesis scheme below) of a compound having two active hydrogen groups in a molecule thereof and a bifunctional or higher isocyanate compound, and then allowing this prepolymer to react with a compound having three or more active hydrogen groups in a molecule thereof (synthesis scheme 2 below).

Synthesis Scheme 2

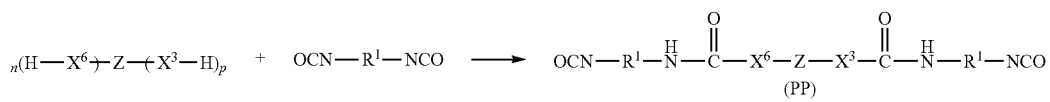

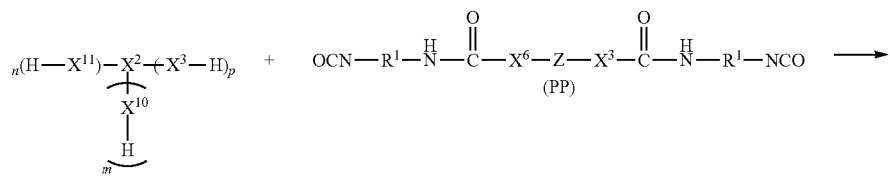

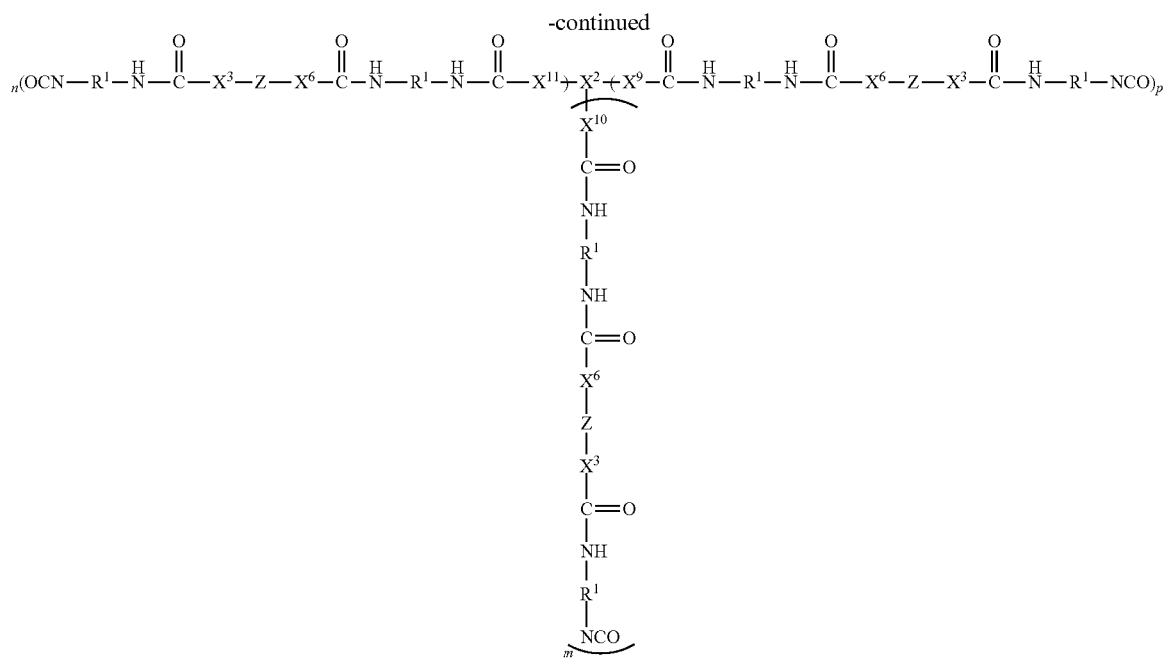

Examples of the bifunctional or higher isocyanate compounds include bifunctional or higher aromatic isocyanate compounds and bifunctional or higher aliphatic isocyanate compounds.

Specific examples of the bifunctional or higher isocyanate compounds include isophorone diisocyanate (IPDI), m-phenylene diisocyanate, p-phenylene diisocyanate, 2,6-tolylene diisocyanate, 2,4-tolylene diisocyanate (TDI), naphthalene-1,4-diisocyanate, diphenylmethane-4,4'-diisocyanate (MDI), 3,3'-dimethoxy-biphenyl diisocyanate, 3,3'-dimethyldiphenylmethane-4,4'-diisocyanate, m-xylylene diisocyanate (XDI), p-xylylene diisocyanate, 4-chloroxylylene-1,3-diisocyanate, 2-methylxylylene-1,3-diisocyanate, 4,4'-diphenylpropane diisocyanate, 4,4'-diphenylhexafluoropropane diisocyanate, trimethylene diisocyanate, hexamethylene diisocyanate (HDI), propylene-1,2-diisocyanate, butylene-1,2-diisocyanate, cyclohexylene-1,2-diisocyanate, cyclohexylene-1,3-diisocyanate, cyclohexylene-1,4-diisocyanate, dicyclohexylmethane-4,4'-diisocyanate, 1,4-bis(isocyanatomethyl)cyclohexane, 1,3-bis(isocyanatomethyl)cyclohexane (HXDI), norbornene diisocyanate (NBDI), trimethylhexamethylene diisocyanate (TMHDI), lysine diisocyanate, and 1,3-bis(2-isocyanato-2-propyl)benzene.

Of these bifunctional or higher isocyanate compounds, compounds having structures represented by (I-1) to (I-24) below are preferred.

(I-1)

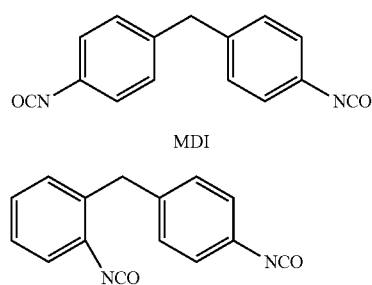

MDI (I-2)

-continued (I-3)

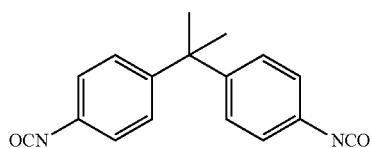

(I-4)

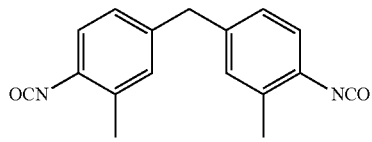

(I-5)

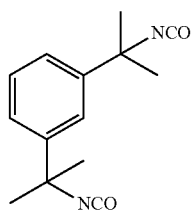

(I-6)

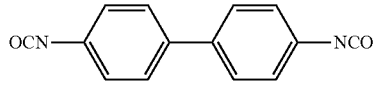

(I-7)

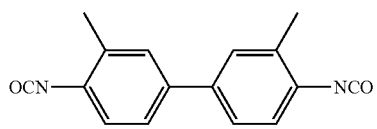

(I-8)

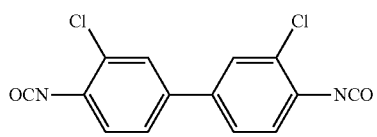

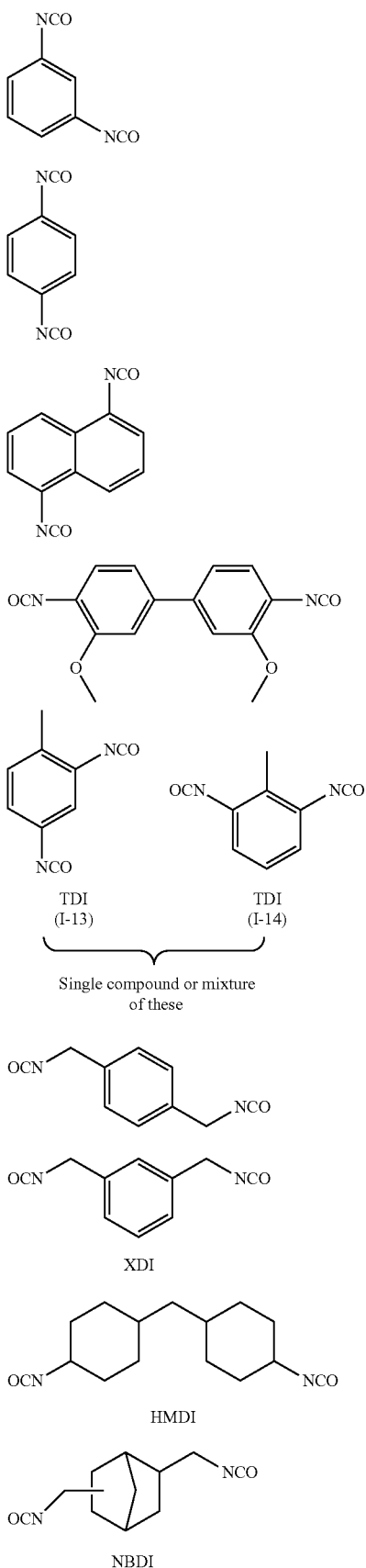
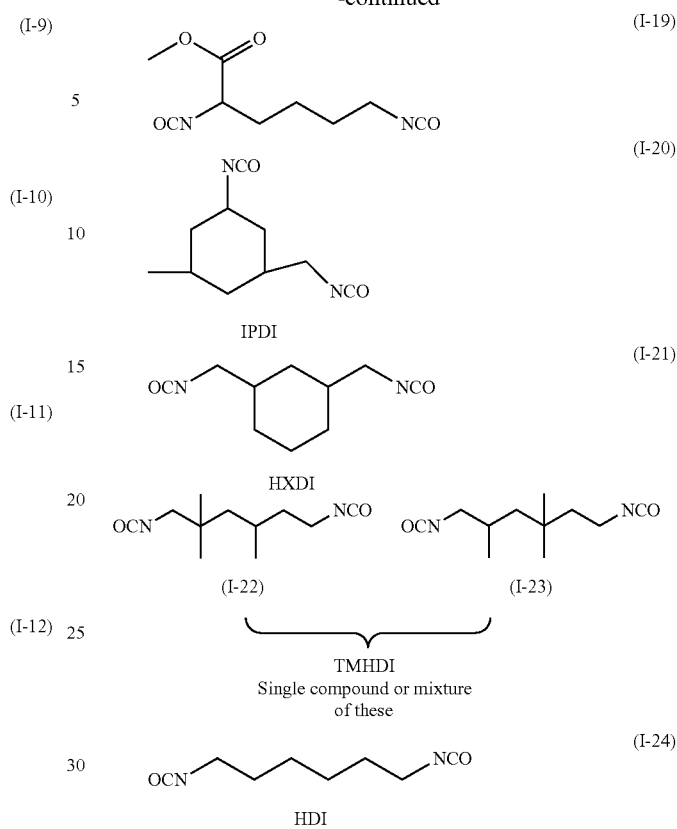

Of these bifunctional or higher isocyanate compounds, at least one selected from the group consisting of isophorone diisocyanate (IPDI), hexamethylene diisocyanate (HDI), trimethylhexamethylene diisocyanate (TMHDI), 1,3-bis (isocyanatomethyl)cyclohexane (HXDI), m-xylylene diisocyanate (XDI), and dicyclohexylmethane-4,4'-diisocyanate (HMDI) is preferred.

Furthermore, bifunctional isocyanate compounds derived from the above compounds can also be used as the bifunctional or higher isocyanate compounds. Examples thereof include DURANATE (registered trademark) D101, D201, and A101 (available from Asahi Kasei Corporation).

The compounds having three or more active hydrogen groups in a molecule thereof are compounds having, in a molecule thereof, three or more groups which are each independently selected from the group consisting of a hydroxy group, a primary amino group, a secondary amino group, and a mercapto group. Examples thereof include compounds having structures represented by (H-1) to (H-13) below. Each n in compounds (H-4), (H-5), and (H-11) represents, for example, an integer selected from 1 to 100.

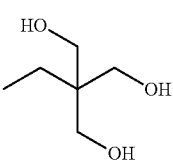

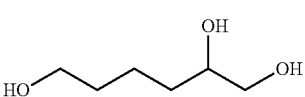

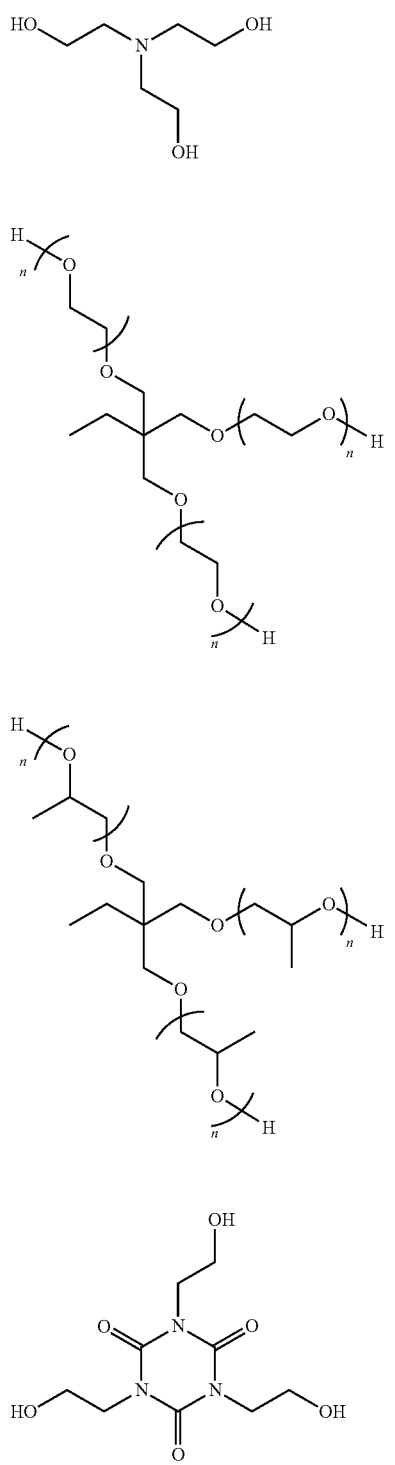
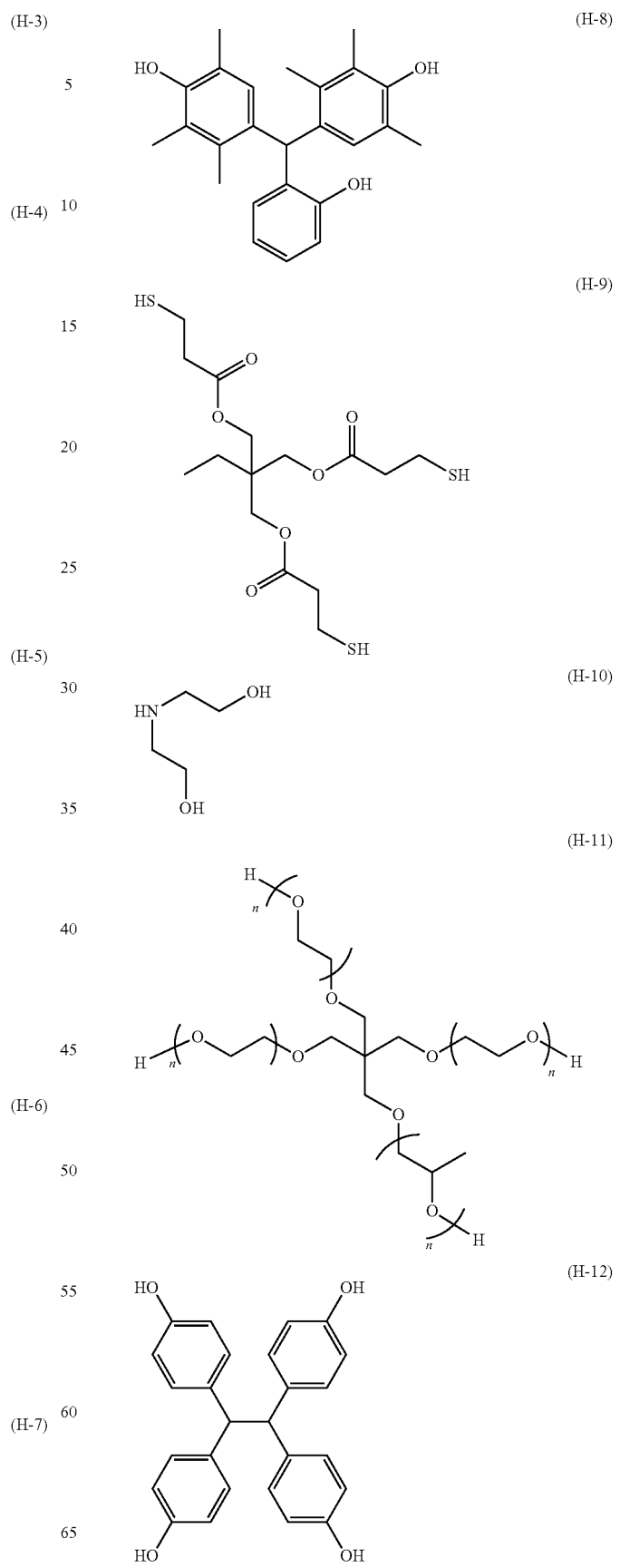

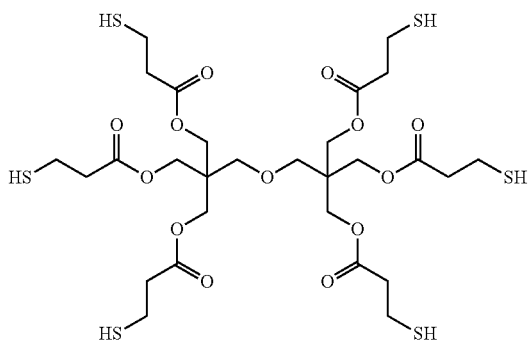

(H-13)

The adduct-type trifunctional or higher isocyanate compound may be commercially available products on the market.

Examples of the commercially available products include TAKENATE (registered trademark) D-102, D-103, D-103H, D-103M2, P49-75S, D-110, D-120N, D-140N, and D-160N (available from Mitsui Chemicals, Inc.), DESMODUR (registered trademark) L75 and UL57SP (available from Sumika Bayer Urethane Co., Ltd.), CORONATE (registered trademark) HL, HX, and L (available from Nippon Polyurethane Industry Co., Ltd.), and P301-75E (available from Asahi Kasei Corporation).

Of these adduct-type trifunctional or higher isocyanate compounds, at least one selected from the group consisting of D-110, D-120N, D-140N, and D-160N (available from Mitsui Chemicals, Inc.) is more preferred.

——Biuret or Isocyanurate——

The isocyanurate-type trifunctional or higher isocyanate compound is preferably a compound represented by a formula (11C) below.

The biuret-type trifunctional or higher isocyanate compound is preferably a compound represented by a formula (11D) below.

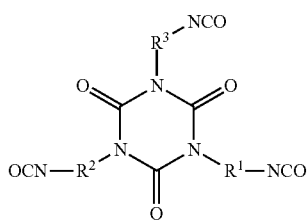

Formula (11C)

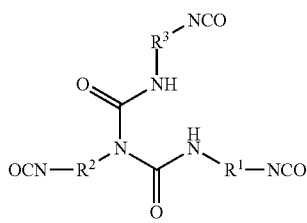

Formula (11D)

In the formulae (11C) and (11D), $R^1$, $R^2$, and $R^3$ each independently represent a divalent organic group.

In the formulae (11C) and (11D), $R^1$, $R^2$, and $R^3$ are each independently preferably a substituted or unsubstituted alkylene group having 1 to 20 carbon atoms, a substituted or unsubstituted cycloalkylene group having 1 to 20 carbon atoms, or a substituted or unsubstituted arylene group having 1 to 20 carbon atoms.

In the formulae (11C) and (11D), $R^1$, $R^2$, and $R^3$ are each independently particularly preferably a group selected from the group consisting of the groups represented by (R-1) to (R-20) described above.

In the formulae (11C) and (11D), $R^1$ to $R^3$ are each independently more preferably any one of the group (R-3) derived from isophorone diisocyanate (IPDI), the group (R-7) derived from hexamethylene diisocyanate (HDI), the group (R-5) derived from trimethylhexamethylene diisocyanate (TMHDI), the group (R-9) derived from m-xylylene diisocyanate (XDI), the group (R-1) derived from 1,3-bis(isocyanatomethyl)cyclohexane, and the group (R-2) derived from dicyclohexylmethane 4,4'-diisocyanate.

The biuret-type trifunctional or higher isocyanate compound may be commercially available products on the market. Examples of the commercially available products include TAKENATE (registered trademark) D-165N and NP1100 (available from Mitsui Chemicals, Inc.), DESMODUR (registered trademark) N3200 (available from Sumika Bayer Urethane Co., Ltd.), and DURANATE (registered trademark) 24A-100 (available from Asahi Kasei Corporation).

The isocyanurate-type trifunctional or higher isocyanate compound may be commercially available products on the market. Examples of the commercially available products include TAKENATE (registered trademark) D-127, D-170N, D-170HN, D-172N, and D-177N (available from Mitsui Chemicals, Inc.), SUMIDUR N3300 and DESMODUR (registered trademark) N3600, N3900, and Z4470BA (available from Sumika Bayer Urethane Co., Ltd.), CORONATE (registered trademark) HX and HK (available from Nippon Polyurethane Industry Co., Ltd.), and DURANATE (registered trademark) TPA-100, TKA-100, TSA-100, TSS-100, TLA-100, and TSE-100 (available from Asahi Kasei Corporation).

Of these biuret-type and isocyanurate-type trifunctional or higher isocyanate compounds, DURANATE (registered trademark) 24A-100 (available from Asahi Kasei Corporation), D-120N and D-127 (available from Mitsui Chemicals, Inc.), and TKA-100, TSS-100, and TSE-100 (available from Asahi Kasei Corporation) are more preferred.

(Water or Compound Having Two or More Active Hydrogen Group)

The shell of the microcapsules can be formed by allowing the trifunctional or higher isocyanate compound described above and water or a compound having two or more active hydrogen groups to react with each other.

In general, water can be used as the compound that is allowed to react with the trifunctional or higher isocyanate compound. The trifunctional or higher isocyanate compound reacts with water to thereby form a three-dimensional cross-linked structure having a urea bond.

Besides water, the compound that is allowed to react with the trifunctional or higher isocyanate compound may be a compound having two or more active hydrogen groups. Examples of the compound having two or more active hydrogen groups include compounds having a hydroxy group (—OH), an amino group (—NH), or a thiol group (—SH) in a molecule thereof. Specifically, polyfunctional alcohols, polyfunctional phenols, polyfunctional amines having a hydrogen atom on a nitrogen atom thereof, polyfunctional thiols, and the like can be used.

The trifunctional or higher isocyanate compound reacts with a polyfunctional alcohol or a polyfunctional phenol to thereby form a three-dimensional crosslinked structure having a urethane bond.

The trifunctional or higher isocyanate compound reacts with a polyfunctional amine having a hydrogen atom on a nitrogen atom thereof to thereby form a three-dimensional crosslinked structure having a urea bond.

Specific examples of the polyfunctional alcohols include propylene glycol, glycerine, trimethylolpropane, and 4,4',4"-trihydroxytriphenylmethane.

Specific examples of the polyfunctional amines include diethylenetriamine, tetraethylenepentamine, and lysine.

Specific examples of the polyfunctional thiol include 1,3-propanedithiol and 1,2-ethanedithiol.

Specific examples of the polyfunctional phenols include bisphenol A.

These compounds may be used alone or in combination of two or more thereof.

Note that the compounds having two or more active hydrogen groups cover the above-described compounds having three or more active hydrogen groups in a molecule thereof.

—Hydrophilic Group That Can Be Included in Shell—

The shell of the microcapsules preferably has at least one hydrophilic group.

The shell having a hydrophilic group has further improved dispersibility in an aqueous medium. Therefore, in the case where the microcapsules are used in ink applications, the ejection performance and dispersion stability of the ink composition can be further improved.

In addition, when the microcapsules include a shell having a hydrophilic group, the microcapsules have improved hydrophilic properties and good redispersibility.

In the shell, the hydrophilic group is present as a part of a three-dimensional crosslinked structure.

Herein, the expression "a hydrophilic group is present as a part of a three-dimensional crosslinked structure" means that a hydrophilic group is covalently bonded to a part of a three-dimensional crosslinked structure, the part being other than the hydrophilic group".

The covalent bond between the hydrophilic group and the part of the three-dimensional crosslinked structure, the part being other than the hydrophilic group, is preferably an urethane bond or a urea bond, and more preferably a urea bond.

Examples of the hydrophilic group that can be present in the shell include anionic groups and nonionic groups. Specific examples thereof include a carboxylic acid group, salts of a carboxylic acid group, a phosphonic acid group, salts of a phosphonic acid group, a phosphoric acid ester group, salts of a phosphoric acid ester group, a phosphoric acid group, salts of a phosphoric acid group, a sulfonic acid group, salts of a sulfonic acid group, a sulfuric acid group, salts of a sulfuric acid group, groups having a polyether structure (such as polyethylene oxide or polypropylene oxide), groups having a betaine structure, an ammonium group, a sulfonium group, and a phosphonium group. In the present specification, the "hydrophilic group" is discriminated from the above-described active hydrogen groups (a hydroxy group, a primary amino group, a secondary amino group, and a mercapto group). The salts of a carboxylic acid group, the salts of a sulfonic acid group, the salts of a sulfuric acid group, the salts of a phosphonic acid group, and the salts of a phosphoric acid group may be salts formed by neutralization in the process of producing the microcapsules. The shell of the microcapsules may have only one hydrophilic group or two or more hydrophilic groups.

The hydrophilic group that can be introduced into the shell is preferably at least one selected from the group consisting of groups having a polyether structure, a carboxylic acid group, and salts of a carboxylic acid group.

A method for introducing a hydrophilic group into the shell of microcapsules will be described.

A hydrophilic group can be introduced into the shell by allowing the trifunctional or higher isocyanate compound described above, water or a compound having two or more active hydrogen groups, and a compound having a hydrophilic group to react with each other.

Alternatively, a hydrophilic group can be introduced into the shell of microcapsules by allowing a bifunctional or higher isocyanate compound and a compound having a hydrophilic group to react with each other to thereby produce an isocyanate compound in which the hydrophilic group is introduced, subsequently allowing this "isocyanate compound in which the hydrophilic group is introduced" and a compound having two or more active hydrogen groups to react with each other to thereby produce a trifunctional or higher isocyanate compound in which the hydrophilic group is introduced, and subsequently allowing this "trifunctional or higher isocyanate compound in which the hydrophilic group is introduced" and water or a compound having two or more active hydrogen groups to react with each other.

—Compound Having Hydrophilic Group—

Examples of the compound having a hydrophilic group include amino acids such as α-amino acids (specifically, lysine, alanine, arginine, asparagine, aspartic acid, cysteine, glutamine, glutamic acid, glycine, histidine, isoleucine, leucine, methionine, phenylalanine, proline, serine, threonine, tryptophane, tyrosine, and valine). Specific examples of the compound having a hydrophilic group further include compounds shown below in addition to α-amino acids.

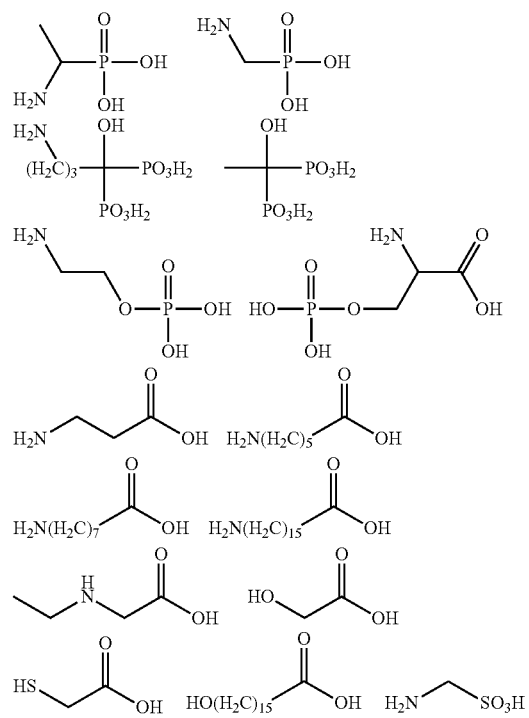

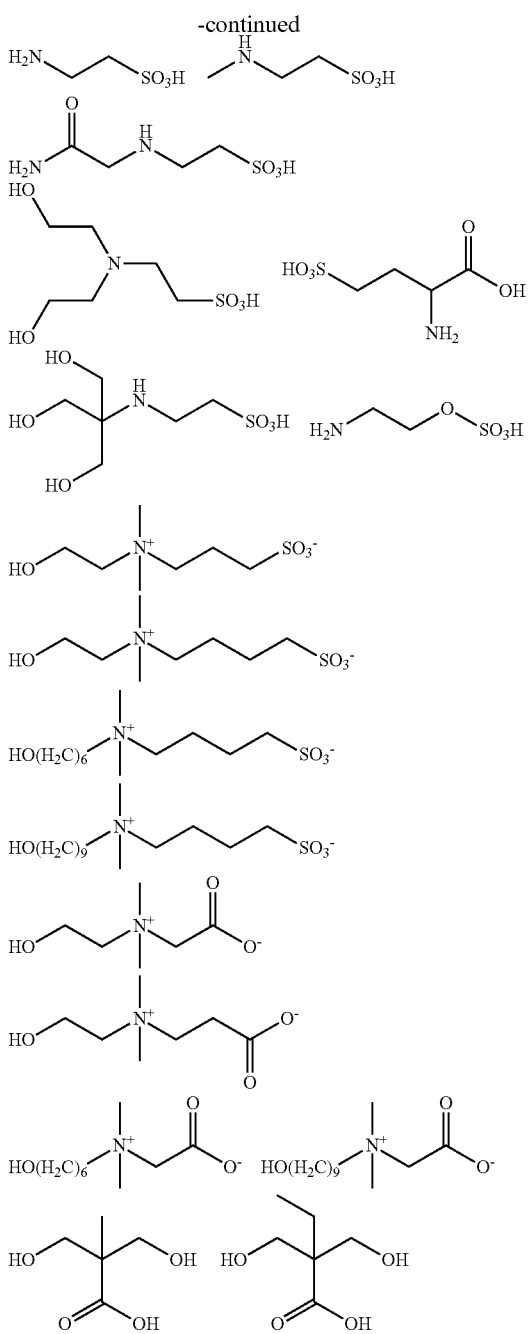

In the case where a compound having an anionic group is used as the compound having a hydrophilic group, at least some of anionic groups of the compound may be neutralized by using an inorganic base such as sodium hydroxide or potassium hydroxide; an organic base such as triethylamine; or the like.

Of the compounds having a hydrophilic group, compounds having a nonionic groups are preferably compounds having a polyether structure, and more preferably compounds having a polyoxyalkylene chain.

Specific examples of the compounds having a polyoxyalkylene chain include polyethylene oxide, polypropylene oxide, polytetramethylene oxide, polystyrene oxide, polycyclohexylene oxide, polyethylene oxide-polypropylene oxide-block copolymers, and polyethylene oxide-polypropylene oxide random copolymers.

Of these compounds having a polyoxyalkylene chain, polyethylene oxide, polypropylene oxide, and polyethylene oxide-polypropylene oxide-block copolymers are preferred, and polyethylene oxide is more preferred.

Preferred examples of the compounds having a polyether structure include monoether derivatives of polyethylene oxide (examples of the monoether include monomethyl ether and monoethyl ether) and monoester derivatives of polyethylene oxide (examples of the monoester include monoacetate and mono(meth)acrylate).

——Isocyanate Compound in Which Hydrophilic Group Is Introduced——

As described above, an isocyanate compound in which a hydrophilic group is introduced can also be used for introducing a hydrophilic group into the shell.

The isocyanate compound in which a hydrophilic group is introduced is preferably a reaction product between a compound having a hydrophilic group and isophorone diisocyanate (IPDI), hexamethylene diisocyanate (HDI), trimethylhexamethylene diisocyanate (TMHDI), 1,3-bis(isocyanatomethyl)cyclohexane (HXDI), m-xylylene diisocyanate (XDI), or dicyclohexylmethane-4,4'-diisocyanate (HMDI).

When a group having a polyether structure is introduced into the shell, an adduct of trimethylolpropane (TMP), m-xylylene diisocyanate (XDI), and polyethylene glycol monomethyl ether (for example, TAKENATE D-116N available from Mitsui Chemicals, Inc.) is preferably used as the isocyanate compound in which a hydrophilic group is introduced.

When a carboxy group or a salt thereof is introduced into the shell, a reaction product between 2,2-bis(hydroxymethyl) propionic acid (DMPA) or a salt thereof and isophorone diisocyanate (IPDI) (that is, an isocyanate compound including a carboxy group or a salt thereof) is preferably used as the isocyanate compound in which a hydrophilic group is introduced.

The salt of a carboxy group is preferably a sodium salt, a potassium salt, a triethylamine salt, or a dimethylethanolamine salt and more preferably a sodium salt or a triethylamine salt.

When a compound having a hydrophilic group is used for introducing a hydrophilic group into the shell, the addition amount of the compound having a hydrophilic group is preferably 0.1% to 50% by mass, more preferably 0.1% to 45% by mass, still more preferably 0.1% to 40% by mass, still more preferably 1% to 35% by mass, and still more preferably 3% to 30% by mass relative to the total solid content of the microcapsules.

——Polymerizable Group That Can Be Included in Shell——

Since the core includes a polymerizable compound (that is, compound having a polymerizable group), the microcapsules have a polymerizable group. In addition to the polymerizable group of the polymerizable compound included in the core, the shell of the microcapsules may have a polymerizable group.

In the case where the shell of the microcapsules has a polymerizable group, adjacent microcapsules are bonded to each other by irradiation with active energy rays, and thus an image having a higher film strength can be formed.

A method for introducing a polymerizable group into the shell of microcapsules will be described.

Examples of the method for introducing a polymerizable group into the shell of microcapsules include a method including, in the formation of a three-dimensional cross-linked structure having at least one bond selected from the group consisting of a urethane bond and a urea bond, allowing the trifunctional or higher isocyanate compound, water or the compound having two or more active hydrogen groups, and a monomer for introducing a polymerizable group to react with each other;

a method including, in the production of the trifunctional or higher isocyanate compound described above, allowing the bifunctional or higher isocyanate compound and a monomer for introducing a polymerizable group to react with each other to produce an isocyanate compound in which the polymerizable group is introduced, and subsequently allowing this isocyanate compound in which the polymerizable group is introduced and water or the compound having two or more active hydrogen groups to react with each other; and a method including, in the production of a microcapsule, dissolving a monomer for introducing a polymerizable group in an oil-phase component together with a component constituting a microcapsule, mixing the resulting oil-phase component and an aqueous-phase component, and emulsifying and dispersing the resulting mixture.

Examples of the polymerizable compound used for introducing a polymerizable group into microcapsules include compounds having at least one active hydrogen group and having an ethylenically unsaturated bond on at least one terminal thereof.

The compounds having at least one active hydrogen group and having an ethylenically unsaturated bond on at least one terminal thereof can be represented by a structural formula (a) below.

  Formula (a)

In the structural formula (a), $L^1$ represents a linking group having a valence of (m+n), m and n are each independently an integer selected from 1 to 100, Lc represents a monovalent ethylenically unsaturated group, and Z represents an active hydrogen group.

$L^1$ is preferably a divalent or higher aliphatic group, a divalent or higher aromatic group, a divalent or higher heterocyclic group, —O—, —S—, —NH—, —N<, —CO—, —SO—, —SO$_2$—, or a combination thereof.

m and n are each independently preferably 1 to 50, more preferably 2 to 20, still more preferably 3 to 10, and particularly preferably 3 to 5.

Examples of the monovalent ethylenically unsaturated group represented by Lc include an allyl group, a vinyl group, an acryloyl group, and a methacryloyl group.

Z is preferably OH, SH, NH, or NH$_2$, more preferably OH or NH$_2$, and still more preferably OH.

Examples of the compounds having at least one active hydrogen group and having an ethylenically unsaturated bond on at least one terminal thereof are shown below. However, the structures of the compounds are not limited to thereto. In compounds (a-3) and (a-14), n represents, for example, an integer selected from 1 to 90.

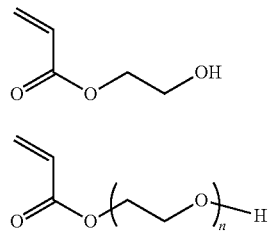

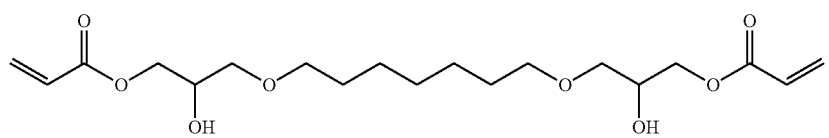

DA-250

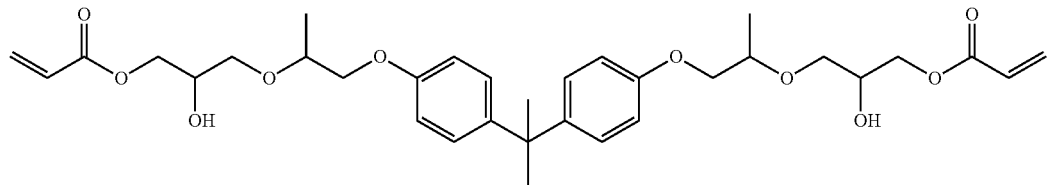

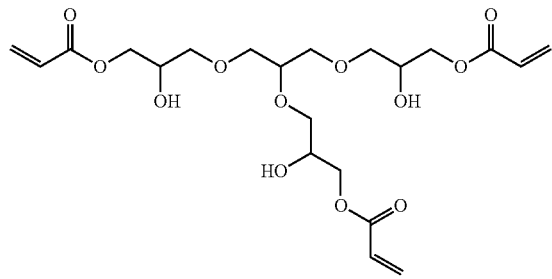

DA-314

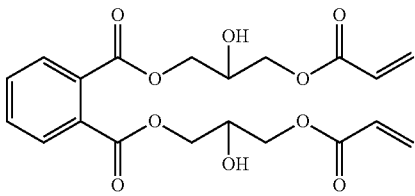

DA-721

(a-9)
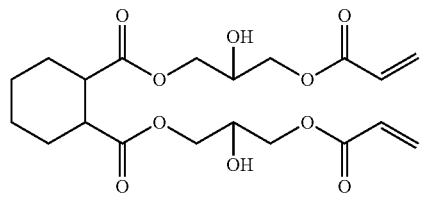
DA-722
(a-10)
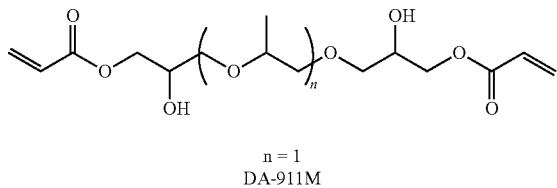
n = 1
DA-911M
(a-11)
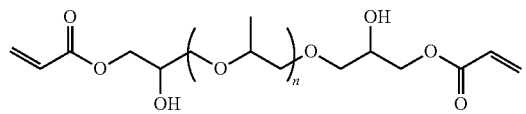
n = 3
DA-920
(a-12)
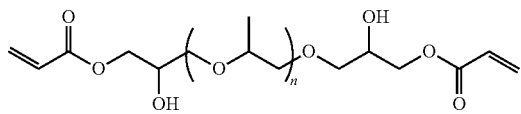
n = 11
DA-931
(a-13)
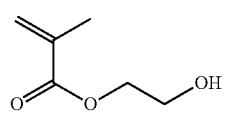
(a-14)
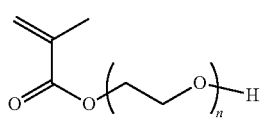
(a-15)
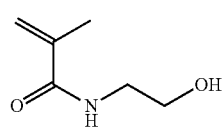
(a-16)
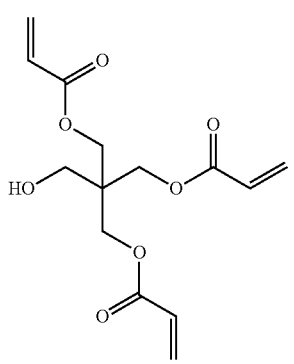
A-TMM-3L
(a-17)
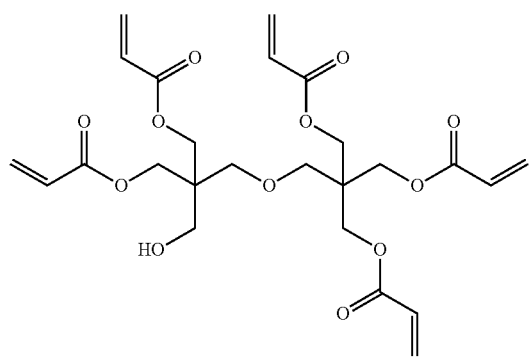
SR399E
(a-18)
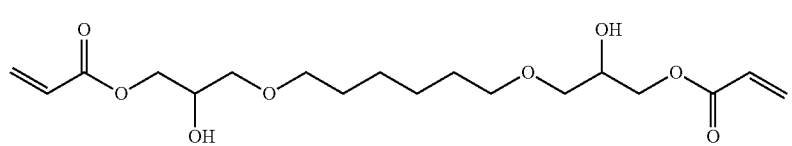

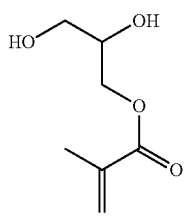

The compounds having at least one active hydrogen group and having an ethylenically unsaturated bond on at least one terminal thereof may be commercially available products on the market. Examples thereof include acrylates such as hydroxyethyl acrylate (available from Osaka Organic Chemical Industry Ltd.), 4-hydroxybutyl acrylate and 1,4-cyclohexanedimethanol monoacrylate (available from Nihon Kasei Co., Ltd.), BLEMMER (registered trademark) AE-90U (n=2), AE-200 (n=4.5), AE-400 (n=10), AP-150 (n=3), AP-400 (n=6), AP-550 (n=9), and AP-800 (n=13) (available from NOF Corporation), and DENACOL (registered trademark) ACRYLATE DA-212, DA-250, DA-314, DA-721, DA-722, DA-911M, DA-920, and DA-931 (available from Nagase ChemteX Corporation); methacrylates such as 2-hydroxyethyl methacrylate (available from Kyoeisha Chemical Co., Ltd.), BLEMMER (registered trademark) PE-90 (n=2), PE-200 (n=4.5), PE-350 (n=8), PP-1000 (N=4 to 6), PP-500 (n=9), and PP-800 (n=13) (available from NOF Corporation), A-TMM-3L (Shin Nakamura Chemical Co., Ltd.), and SR399E (available from SARTOMER); and acrylamides (available from KJ Chemicals Corporation).

Of these compounds having at least one active hydrogen group and having an ethylenically unsaturated bond on at least one terminal thereof, hydroxyethyl acrylate (available from Osaka Organic Chemical Industry Ltd.), AE-400 (n=10) and AP-400 (n=6) (available from NOF Corporation), DENACOL (registered trademark) ACRYLATE DA-212 (available from Nagase ChemteX Corporation), PP-500 (n=9) (available from NOF Corporation), A-TMM-3L (Shin Nakamura Chemical Co., Ltd.), and SR399E (available from SARTOMER) are preferred.

A polymerizable group can be introduced into microcapsules by, for example, as shown in a synthesis scheme 3 below, allowing an isocyanate group of a trifunctional or higher isocyanate compound and an active hydrogen group of a compound having at least one active hydrogen group and having an ethylenically unsaturated bond on at least one terminal thereof to react with each other to prepare an isocyanate compound in which a polymerizable group is introduced, and allowing the prepared isocyanate compound in which a polymerizable group is introduced and the compound having two or more active hydrogen groups to react with each other.

Synthesis Scheme 3

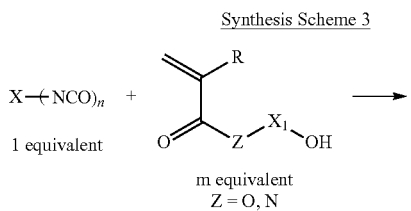

m equivalent
Z = O, N (a-19)

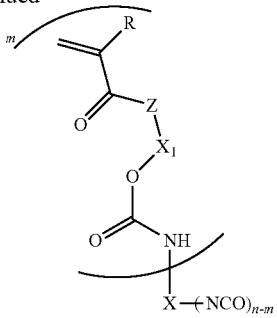

The monomers for introducing a polymerizable group may be used alone or in combination of two or more thereof.

In the production of an isocyanate compound in which a polymerizable group is introduced, a polyisocyanate (that is, a trifunctional or higher isocyanate compound) and a monomer for introducing a polymerizable group are preferably allowed to react with each other in such a ratio that the number of moles of the active hydrogen group of the monomer for introducing a polymerizable group becomes 0.01 to 0.3 times (more preferably 0.02 to 0.25 times and still more preferably 0.03 to 0.2 times) the number of moles of isocyanate groups of the polyisocyanate.

In the isocyanate compound in which a polymerizable group is introduced, the average number of functional groups, that is, the isocyanate groups may be 3 or less in some cases. However, even in such a case, a shell having a three-dimensional crosslinked structure can be formed as long as the raw material for forming the shell includes at least one trifunctional or higher isocyanate compound.

Physical Properties of Microcapsule

A volume-average particle size of the microcapsules is preferably 0.01 to 10.0 μm, more preferably 0.01 to 5 μm, and still more preferably 0.05 to 1 μm from the viewpoint of dispersibility when the microcapsules are used in an ink composition.

The volume-average particle size of the microcapsules can be measured by a light scattering method. In the present specification, values measured by using an LA-960 wet particle size distribution measuring apparatus (available from HORIBA, Ltd.) are used as the volume-average particle sizes.

Formation of Microcapsule

The method for producing microcapsules is not particularly limited.

From the viewpoint of easily obtaining the microcapsules described above, the method for producing microcapsules is preferably any of the production methods according to embodiments described below.

A method for producing microcapsules according to an embodiment preferably includes a preparation step of mixing an oil-phase component including a trifunctional or higher isocyanate compound, a polymerizable compound, and an organic solvent, and an aqueous-phase component including water, and emulsifying and dispersing the resulting mixture to prepare a water dispersion of microcapsules.

In the preparation step, the oil phase preferably further includes a photopolymerization initiator, and at least one of the oil-phase component or the aqueous-phase component preferably includes a compound having a hydrophilic group.

—Preparation Step—

The preparation step is preferably a step of mixing an oil-phase component including a trifunctional or higher isocyanate compound, a polymerizable compound, and an organic solvent, and an aqueous-phase component including water, and emulsifying and dispersing the resulting mixture to prepare a water dispersion of microcapsules.

In the preparation step, the oil-phase component preferably further includes a photopolymerization initiator, and at least one of the oil-phase component or the aqueous-phase component preferably includes a compound having a hydrophilic group.

The microcapsules described above are formed by mixing the oil-phase component and the aqueous-phase component and emulsifying and dispersing the resulting mixture as described above.

Here, a description will be made of an embodiment in which a photopolymerization initiator is further included as the oil-phase component and a compound having a hydrophilic group is included as the aqueous-phase component.

The oil-phase component used in the preparation step includes a trifunctional or higher isocyanate compound, a polymerizable compound, a photopolymerization initiator, and an organic solvent, The aqueous-phase component used in the preparation step includes water and a compound having a hydrophilic group.

The preparation step provides microcapsules including a shell that has a three-dimensional crosslinked structure including a hydrophilic group and at least one bond selected from the group consisting of a urethane bond and a urea bond, and a core that is enclosed in the shell and includes the polymerizable compound and the photopolymerization initiator. The formed microcapsules serve as a dispersoid in the water dispersion to be produced.

On the other hand, the water in the aqueous-phase component serves as a dispersion medium in the water dispersion to be produced.

Regarding the formation of the shell, more specifically, a reaction between the trifunctional or higher isocyanate compound and water forms a shell that has a three-dimensional crosslinked structure including a urea bond. In the case where the trifunctional or higher isocyanate compound includes a urethane bond (for example, in the case of a trifunctional or higher isocyanate compound obtained by using a polyfunctional alcohol as a raw material), the three-dimensional crosslinked structure of the shell includes a urethane bond.

A neutralizing agent may be added to the aqueous phase to neutralize, with the neutralizing agent, a hydrophilic group of the compound having a hydrophilic group. The compound having a hydrophilic group also relates to the reaction for forming the shell. Accordingly, when the hydrophilic group is neutralized, the neutralized hydrophilic group (for example, a salt of an acid group when the hydrophilic group is the acid group) is introduced into the three-dimensional crosslinked structure of the shell. The introduced salt of the hydrophilic group has good effect of dispersing the microcapsules in water. The degree of neutralization of the hydrophilic group can be adjusted by controlling the amount of the neutralizing agent or the like.

Examples of the neutralizing agent include sodium hydroxide, a potassium hydroxide, and triethanolamine.

When the oil-phase component includes an isocyanate compound having a polymerizable group, this isocyanate compound having a polymerizable group also relates to the reaction for forming the shell. Accordingly, a polymerizable group is introduced into the shell (that is, a sell having a polymerizable group is formed).

Examples of the organic solvent included in the oil-phase component include ethyl acetate and methyl ethyl ketone.

At least part of the organic solvent is preferably removed during the process of forming the microcapsules or after the formation of the microcapsules.

The details of the trifunctional or higher isocyanate compound included in the oil-phase component are as described above.

The details of the isocyanate compound having a polymerizable group and the polymerizable compound that are included in the oil-phase component are as described above.

The details of the photopolymerization initiator included in the oil-phase component are as described above.

The oil-phase component may optionally include other components besides the components described above.

Examples of the other components include sensitizers described above. Incorporation of sensitizers in the oil-phase component enables the core of microcapsules to include the sensitizers.

The details of the compound having a hydrophilic group, the compound being included in the aqueous-phase component, are as described above.

The aqueous-phase component may optionally include other components besides the components described above.

Examples of the other components include surfactants described below.

In the method described above, the total amount determined by removing the organic solvent and water from the oil-phase component and the aqueous-phase component corresponds to the total solid content of microcapsules to be produced.

The content of the polymerizable compound in the oil-phase component is preferably 30% to 75% by mass, more preferably 35% to 65% by mass, and still more preferably 35% to 60% by mass relative to the solid content.

The content of the photopolymerization initiator in the oil-phase component is preferably 0.1% to 25% by mass, more preferably 0.5% to 20% by mass, and still more preferably 0.5% to 15% by mass relative to the solid content.

The ratio of the photopolymerization initiator to the polymerizable compound is preferably 0.5% to 25% by mass, more preferably 1% to 20% by mass, and still more preferably 5% to 10% by mass.

The amount of the trifunctional or higher isocyanate compound in the oil-phase component is not particularly limited and is, for example, preferably 5% to 50% by mass, more preferably 10% to 40% by mass, and still more preferably 15% to 30% by mass relative to the total solid content.

In the case where the oil-phase component includes an isocyanate compound having a polymerizable group, the amount of the polymerizable compound in the oil-phase component is not particularly limited and is, for example, preferably 0.1% to 50% by mass relative to the total solid content.

The amount of the organic solvent is not particularly limited and is appropriately determined in accordance with, for example, the types and the amounts of the components included in the oil-phase component.

The amount of the compound having a hydrophilic group in the aqueous-phase component is not particularly limited and is, for example, preferably 0.01% to 1% by mass relative to the total solid content.

The amount of the neutralizing agent in the aqueous-phase component is not particularly limited as long as the degree of neutralization of the hydrophilic group can be adjusted to a desired value and is appropriately determined in accordance with, for example, the type and the amount of the compound having a hydrophilic group, the compound being included in the aqueous-phase component.

The amount of water is not particularly limited is appropriately selected in accordance with, for example, the types and the amounts of the components included in the aqueous-phase component.

The components included in the oil-phase component are merely mixed. All the components may be mixed at one time. Alternatively, the components may be divided into some groups and separately mixed.

The components included in the aqueous-phase component are also merely mixed as in the case of the oil-phase component. All the components may be mixed at one time. Alternatively, the components may be divided into some groups and separately mixed.

Examples of the method for mixing the oil-phase component and the aqueous-phase component include, but are not particularly limited to, a mixing with stirring.

Examples of the method for emulsifying a mixture obtained by the mixing include, but are not particularly limited to, emulsification with an emulsifying device (for example, a disperser) such as a homogenizer.

The number of rotations of the disperser in the emulsification is for example 5,000 to 20,000 rpm and preferably 10,000 to 15,000 rpm.

The rotation time in the emulsification is for example 1 to 120 minutes, preferably 3 to 60 minutes, more preferably 3 to 30 minutes, and still more preferably 5 to 15 minutes.

The emulsification in the preparation step may be performed under heating.

When the emulsification is performed under heating, a reaction for forming microcapsules due to the emulsification can be allowed to proceed more efficiently. Furthermore, when the emulsification is performed under heating, at least part of the organic solvent included as the oil-phase component is easily removed from the mixture.

The heating temperature (that is, reaction temperature) when the emulsification is performed under heating is preferably 35° C. to 70° C. and more preferably 40° C. to 60° C.

The preparation step may include an emulsification stage of emulsifying the mixture (at a temperature of, for example, lower than 35° C.) and a heating stage of heating an emulsified product obtained in the emulsification stage (at a temperature of, for example, 35° C. or higher).

The embodiment in which the preparation step includes the emulsification stage and the heating stage provides a shell having a stronger three-dimensional crosslinked structure, and thus a water dispersion capable of forming a film having better hardness can be produced.

In the embodiment in which the preparation step includes the emulsification stage and the heating stage, preferred ranges of a heating temperature and a heating time in the heating stage are respectively the same as the preferred ranges of the heating temperature and the heating time in the case where the emulsification is performed under heating.

Besides the production method according to the embodiment described above (hereinafter, also referred to as a "production method according to a first embodiment"), for example, the methods (1) to (3) described below can be employed to produce a water dispersion of microcapsules. The methods are:

(1) a production method including a preparation step of mixing an oil-phase component including a trifunctional or higher isocyanate compound, a polymerizable compound, a photopolymerization initiator, a compound having a hydrophilic group, a neutralizing agent, and an organic solvent, and an aqueous-phase component including water, and emulsifying and dispersing the resulting mixture to prepare a water dispersion (hereinafter, also referred to as a "production method according to a second embodiment");

(2) a production method including a preparation step of mixing an oil-phase component including a trifunctional or higher isocyanate compound, a polymerizable compound, a photopolymerization initiator, a compound having a hydrophilic group, and an organic solvent, and an aqueous-phase component including water and a neutralizing agent, and emulsifying and dispersing the resulting mixture to prepare a water dispersion (hereinafter, also referred to as a "production method according to a third embodiment"); and (3) a production method including a preparation step of mixing an oil-phase component including a trifunctional or higher isocyanate compound, a polymerizable compound, a photopolymerization initiator, a neutralizing agent, and an organic solvent, and an aqueous-phase component including water and a compound having a hydrophilic group, and emulsifying and dispersing the resulting mixture to prepare a water dispersion (hereinafter, also referred to as a "production method according to a fourth embodiment").

In any of the production methods according to the second to fourth embodiments, in the preparation step, the oil-phase component and the aqueous-phase component are mixed, and the resulting mixture is emulsified and dispersed to thereby form microcapsules having a shell that has a three-dimensional crosslinked structure including a hydrophilic group and at least one bond selected from the group consisting of a urethane bond and a urea bond, and a core that is enclosed in the shell and includes a polymerizable compound and a photopolymerization initiator, as in the case of the production method according to the first embodiment. The formed microcapsules serve as a dispersoid in the water dispersion to be produced, and the water in the aqueous-phase component serves as a dispersion medium in the water dispersion to be produced.

In the production methods according to the second and third embodiments, the amount of the compound having a hydrophilic group in the oil-phase component is not particularly limited and is preferably, for example, 0.01% to 1% by mass relative to the total solid content.

In the production method according to the fourth embodiment, the amount of the compound having a hydrophilic group in the aqueous-phase component is not particularly limited and is preferably, for example, 0.01% to 1% by mass relative to the total solid content.

In the production methods according to the second and fourth embodiments, the amount of the neutralizing agent in the oil-phase component is not particularly limited as long as the degree of neutralization of the hydrophilic group can be adjusted to a desired value, and is appropriately determined in accordance with, for example, the type and the amount of the compound having a hydrophilic group, the compound being included in the oil-phase component or the aqueous-phase component. In the production method according to the third embodiment, the amount of the neutralizing agent in the aqueous-phase component is also the same as that described above.

—Other Steps—

The methods for producing microcapsules according to the above embodiments may optionally have a step other than the preparation step.

An example of the other step is a step of adding other components.

Examples of the other components added include, as other components that can be included in the ink composition, components described below.

(Water)

The ink composition includes water.

The amount of water is not particularly limited. In particular, the content of water is preferably 30% to 99% by mass, more preferably 40% to 95% by mass, and still more preferably 50% to 90% by mass.

(Photopolymerization Initiator That Can Be Included outside Microcapsule)

The ink composition may include a photopolymerization initiator outside microcapsules.

When the ink composition includes a photopolymerization initiator outside microcapsules, the efficiency of polymerization reaction between the microcapsules can be improved to form a film having a higher film strength. Furthermore, the polymerization reaction proceeds at a high efficiency even with active energy rays (light) having a low exposure illuminance (for example, 40 to 70 mJ/cm$^2$).

Examples of the photopolymerization initiator that can be included outside the microcapsules include the same photopolymerization initiators as the photopolymerization initiators described above (that is, the photopolymerization initiators enclosed in the microcapsules).

The photopolymerization initiator that can be included outside the microcapsules is preferably a water-soluble or water-dispersible photopolymerization initiator. From this viewpoint, examples thereof include DAROCUR (registered trademark) 1173, IRGACURE (registered trademark) 2959, IRGACURE (registered trademark) 754, DAROCUR (registered trademark) MBF, IRGACURE (registered trademark) 819DW, and IRGACURE (registered trademark) 500 (all of which are available from BASF Corporation), the acylphosphine oxide compounds described in WO2014/095724A, and the photopolymerization initiators described in WO86/05778A.

Note that the term "water-soluble" refers to a property that an amount dissolved in 100 g of distilled water at 25° C. exceeds 1 g when drying is performed at 105° C. for two hours.

The term "water-dispersible" refers to a property of being water-insoluble and dispersible in water. Here, the term "water-insoluble" refers to a property that an amount dissolved in 100 g of distilled water at 25° C. is 1 g or less when drying is performed at 105° C. for two hours.

(Sensitizer That Can Be Included outside Microcapsule)

The ink composition may include a sensitizer outside microcapsules.

When the ink composition includes a sensitizer outside microcapsules, decomposition of the photopolymerization initiator by irradiation with active energy rays can be further accelerated.

Examples of the sensitizer that can be included outside the microcapsules include the same sensitizers as the sensitizers described above (that is, the sensitizers that can be enclosed in the microcapsules).

(Other Additives)

Components other than the components described above can be optionally added to the ink composition. The other components will be described below.

—Surfactant—

The ink composition may include a surfactant. Note that surfactants used in the ink composition are distinguished from the surfactants used in the production of microcapsules.

Examples of the surfactants include nonionic surfactants, cationic surfactants, and anionic surfactants, and any of these surfactants may be used. However, the content of an anionic surfactant relative to the total mass of the ink composition is preferably 1% by mass or less.

When the content of an anionic surfactant in the ink composition is 1% by mass or less, aggregation of a coloring agent in the ink composition is suppressed to achieve good ejection performance of the ink composition. From the same viewpoint, the content of an anionic surfactant is preferably 0.5% by mass or less, more preferably 0.1% by mass or less, and still more preferably 0% by mass (that is, no anionic surfactant is included).

Examples of the surfactants include higher fatty acid salts, alkyl sulfates, alkyl ester sulfates, alkyl sulfonates, alkylbenzene sulfonates, sulfosuccinates, naphthalene sulfonates, alkyl phosphates, polyoxyalkylene alkyl ether phosphates, polyoxyalkylene alkyl phenyl ethers, polyoxyethylene polyoxypropylene glycol, glycerine esters, sorbitan esters, polyoxyethylene fatty acid amides, and amine oxides.

From the viewpoint of dispersibility of microcapsules, the surfactant is preferably an alkyl sulfate having an alkyl chain length of 8 to 18, more preferably at least one selected from the group consisting of sodium dodecyl sulfate (SDS, alkyl chain length: 12) and sodium cetyl sulfate (SCS, alkyl chain length: 16), and still more preferably sodium cetyl sulfate (SCS).

Examples of the surfactants other than the surfactants described above include surfactants described in JP1987-173463A (JP-S62-173463A) and JP1987-183457A (JP-S62-183457A). Examples of the other surfactants include nonionic surfactants such as polyoxyethylene alkyl ethers, polyoxyethylene alkyl allyl ethers, acetylene glycols, polyoxyethylene/polyoxypropylene block copolymers, and siloxanes.

Examples of the surfactants further include organofluorine compounds.

The organofluorine compounds are preferably hydrophobic. The term "organofluorine compounds" cover fluorine-based surfactants, oily fluorine-based compounds (e.g., fluorine oil), and solid fluorine compound resins (e.g. a tetrafluoroethylene resin). Examples thereof include the organofluorine compounds described in JP1982-9053B (JP-S57-9053B) (the 8th column to the 17th column) and JP1987-135826A (JP-S62-135826A).

—Polymerization Inhibitor—

From the viewpoint of enhancing storage stability, a polymerization inhibitor may be added. Examples of the polymerization inhibitors include p-methoxyphenol, quinones such as hydroquinone and methoxybenzoquinone, phenothiazine, catechols, alkylphenols, alkyl bisphenols, zinc dimethyldithiocarbamate, copper dimethyldithiocarbamate, copper dibutyldithiocarbamate, copper salicylate, thiodipropionates, mercaptobenzimidazole, and phosphites. Of these, p-methoxyphenol, catechols, and quinones are preferred, and in particular, for example, hydroquinone, benzoquinone, p-methoxyphenol, TEMPO, TEMPOL, cupferron Al, and tris(N-nitroso-N-phenylhydroxylamine)aluminum salt are more preferred.

—Ultraviolet Absorbe—

From the viewpoint of improving weather resistance of the resulting image and preventing color fading thereof, an ultraviolet absorber may be used in the ink composition.

Examples of the ultraviolet absorbers include known ultraviolet absorbers such as benzotriazole-based compounds, benzophenone-based compounds, triazine-based compounds, and benzoxazole-based compounds.

—Organic Solvent—

In order to improve adhesion to a substrate, the following organic solvents may be added to the ink composition.

Alcohols (such as methanol, ethanol, propanol, isopropanol, butanol, isobutanol, secondary butanol, tertiary butanol, pentanol, hexanol, cyclohexanol, and benzyl alcohol).

Polyhydric alcohols (such as ethylene glycol, diethylene glycol, triethylene glycol, polyethylene glycol, propylene glycol, dipropylene glycol, polypropylene glycol, butylene glycol, hexanediol, pentanediol, glycerine, hexanetriol, thiodiglycol, and 2-methyl propane diol).

Polyhydric alcohol ethers (such as ethylene glycol monomethyl ether, ethylene glycol monoethyl ether, ethylene glycol monobutyl ether, diethylene glycol monoethyl ether, diethylene glycol monomethyl ether, diethylene glycol monobutyl ether, propylene glycol monomethyl ether, propylene glycol monobutyl ether, tripropylene glycol monomethyl ether, dipropylene glycol monomethyl ether, dipropylene glycol dimethyl ether, ethylene glycol monomethyl ether acetate, triethylene glycol monomethyl ether, triethylene glycol monoethyl ether, triethylene glycol monobutyl ether, ethylene glycol monophenyl ether, and propylene glycol monophenyl ether).

Amines (such as ethanolamine, diethanolamine, triethanolamine, N-methyldiethanolamine, N-ethyldiethanolamine, morpholine, N-ethylmorpholine, ethylenediamine, diethylenediamine, triethylenetetramine, tetraethylenepentamine, polyethyleneimine, pentamethyldiethylenetriamine, and tetramethylpropylenediamine).

Amides (such as formamide, N,N-dimethylformamide, and N,N-dimethylacetamide).

Heterocycles (such as 2-pyrrolidone, N-methyl-2-pyrrolidone, cyclohexylpyrrolidone, 2-oxazolidone, 1,3-dimethyl-2-imidazolidinone, and γ-butyrolactone).

Sulfoxide (such as dimethyl sulfoxide).

Sulfones (such as sulfolane).

Others (such as urea, acetonitrile, and acetone).

The organic solvent is preferably added in an amount of 0.1% to 5% by mass relative to the total of the ink composition.

Preferred Physical Properties of Ink Composition

The ink composition preferably has a viscosity of 3 to 15 mPa·s and more preferably 3 to 13 mPa·s when the liquid temperature is 25° C. to 50° C. In particular, as an ink composition, the viscosity of the liquid is preferably 50 mPa·s or less at 25° C. When the viscosity of the liquid is within the above range, high ejection stability can be realized when the ink composition is used in ink jet recording.

The viscosity of the ink composition is a value measured by using a viscometer: VISCOMETER TV-22 (available from Toki Sangyo Co., Ltd.).

[Substrate]

The substrate is preferably a non-permeable or less permeable substrate from the viewpoint that the advantages achieved by the ink jet recording method of the present disclosure are more significantly obtained.

Examples of the substrate include metal plates (such as aluminum, zinc, and copper), and plastic films (such as polyvinyl chloride resins, cellulose diacetate, cellulose triacetate, cellulose propionate, cellulose butyrate, cellulose acetate butyrate, cellulose nitrate, polyethylene terephthalate, polyethylene, polystyrene, polypropylene, polycarbonate, and polyvinyl acetal).

Of these, a non-absorbable substrate can be suitably used as the substrate. The non-absorbable substrate is preferably a plastic substrate such as polyvinyl chloride, polyethylene terephthalate, or polyethylene, more preferably a polyvinyl chloride resin substrate, and still more preferably a polyvinyl chloride resin sheet or film.

The ink jet recording method of the present disclosure may be used for recording an image on a substrate other than a plastic substrate.

Examples of the substrates other than plastic substrates include textile substrates.

Examples of the materials of the textile substrates include natural fibers such as cotton, silk, hemp, and wool; chemical fibers such as viscose rayon and lyocell; synthetic fibers such as polyesters, polyamides, and acrylics; and mixtures of at least two selected from the group consisting of natural fibers, chemical fibers, and synthetic fibers.

The textile substrates described in paragraphs 0039 to 0042 of WO2015/158592A may be used as the textile substrates.

Ejection Method

An ink jet recording apparatus used in the ink jet recording method is not particularly limited, and a known ink jet recording apparatus that can achieve a desired resolution can be freely selected and used. Specifically, any known ink jet recording apparatus including a commercially available product can eject the ink composition A and the ink composition B onto a substrate in the image forming method.

An example of the inkjet recording apparatus is an apparatus that includes an ink supply system, a temperature sensor, and heating means.

The ink supply system includes, for example, a source tank including the ink composition A and the ink composition B, a supply line, an ink supply tank arranged on the immediate upstream of an ink jet head, a filter, and a piezoelectric ink jet head. The piezoelectric ink jet head can be driven so that multi-size dots of preferably 1 to 100 pl and more preferably 8 to 30 pl can be ejected at a resolution of preferably 320 dpi (dot per inch)×320 dpi to 4,000 dpi (dot per inch)×4,000 dpi, more preferably 400 dpi×400 dpi to 1,600 dpi×1,600 dpi, and still more preferably 720 dpi×720 dpi. The term "dpi" represents the number of dots per 2.54 cm (1 inch).

In an ejection step, the ink composition A and ink composition B are preferably ejected at a constant temperature, and thus, the ink jet recording apparatus preferably includes means for stabilizing the temperature of the ink composition A and the ink composition B. The sections where the constant temperature is to be maintained are all of the lines and members from the ink tank (if there is an intermediate tank, the intermediate tank) to a nozzle ejection surface. That is, the section from the ink supply tank to the ink jet head portion can be heat-insulated and heated.

The method for controlling the temperature is not particularly limited. For example, a plurality of temperature sensors are preferably provided in the respective lines and heating is preferably controlled according to the flow rate of the ink composition A and the ink composition B and the ambient temperature. The temperature sensors can be provided near the ink supply tank and the nozzles of the ink jet head. A head unit to be heated is preferably thermally blocked or thermally insulated so that the main body of the apparatus is not affected by the temperature of outside air. In order to shorten the time taken to start-up the printer required for heating or in order to decrease the thermal energy loss, heat insulation to other parts is preferably performed and the heat capacity of the whole heating unit is preferably decreased.

<Irradiation Step>

The irradiation step in the ink jet recording method will now be described.

The ink jet recording method has an irradiation step of irradiating, with light (active energy rays), the ink composition A and the ink composition B ejected on the substrate.

The irradiation step is not limited as long as the ink composition A and the ink composition B ejected on the substrate are irradiated with active energy rays.

The irradiation of the ink composition A and the ink composition B with active energy rays causes polymerization reaction of microcapsules in the ink composition A and the ink composition B to proceed, fixes the resulting image, and enables the film strength and the like of the image to improve.

Examples of the active energy rays that can be used in the irradiation step include ultraviolet rays (UV light), visible rays, and electron beams. Of these, ultraviolet rays (UV light) are preferred.

The peak wavelength of the active energy rays (light) is, for example, preferably 200 to 405 nm, more preferably 220 to 390 nm, and still more preferably 220 to 385 nm, though it depends on absorption characteristics of a sensitizer that is optionally used.

In the case where a sensitizer and a photopolymerization initiator are not used in combination, the peak wavelength is, for example, preferably 200 to 310 nm and more preferably 200 to 280 nm.

Regarding an exposure surface illuminance during the irradiation with active energy rays (light), the irradiation is suitably performed, for example, at 10 to 2,000 mW/cm$^2$ and preferably at 20 to 1,000 mW/cm$^2$.

Examples of widely known sources for generating the active energy rays (light) include mercury lamps, metal halide lamps, UV fluorescent lamps, gas lasers, and solid-state lasers.

In addition, replacement of the above light sources mentioned as examples by semiconductor ultraviolet light-emitting devices is very useful from the industrial and environmental standpoints.

Of the semiconductor ultraviolet light-emitting devices, LEDs (light-emitting diodes) (preferably UV-LEDs) and LDs (laser diodes) (preferably UV-LDs) have small sizes, enhanced lives, high efficiencies, and low costs and are expected to be light sources.

The light source is preferably a metal halide lamp, an extra-high-pressure mercury lamp, a high-pressure mercury lamp, a medium-pressure mercury lamp, a low-pressure mercury lamp, an LED, or a blue-violet laser.

Of these, in the case where a sensitizer and a photopolymerization initiator are used in combination, an extra-high-pressure mercury lamp capable of applying light having a wavelength of 365 nm, 405 nm, or 436 nm, a high-pressure mercury lamp capable of applying light having a wavelength of 365 nm, 405 nm, or 436 nm, or an LED capable of applying light having a wavelength of 355 nm, 365 nm, 385 nm, 395 nm, or 405 nm is more preferred, and an LED capable of applying light having a wavelength of 355 nm, 365 nm, 385 nm, 395 nm, or 405 nm is most preferred.

In the irradiation step, the ink composition A and the ink composition B applied to a substrate are suitably irradiated with such UV light for, for example, 0.01 to 120 seconds and preferably 0.1 to 90 seconds.

Regarding irradiation conditions and a basic irradiation method, the irradiation conditions and the irradiation method disclosed in JP1985-132767A (JP-S60-132767A) can be applied in a similar manner. Specifically, it is preferable to employ a method in which a light source is provided on both sides of a head unit including an ink ejection device, and the head unit and the light sources are scanned by a so-called shuttle method; or a method in which irradiation is conducted with a separate light source that is not driven. The irradiation with the active energy rays is performed after a certain period of time (for example 0.01 to 120 seconds and preferably 0.01 to 60 seconds) after landing of the ink, and heating and drying.

In the irradiation step, the ink composition A and the ink composition B are preferably irradiated with light under the same conditions.

The expression "irradiated with light under the same conditions" means that, in the irradiation step, the ink composition A and the ink composition B are continuously irradiated with light without changing the conditions such as the type of light source, the amount of light, and the irradiation speed.

When the ink compositions are irradiated with light under the same conditions, it is not necessary to change the light source depending on the ink compositions, and productivity of ink jet recording further improves.

<Heating Drying Step>

The ink jet recording method may further optionally have a heating drying step after the ejection step and before the irradiation step.

In the heating drying step, preferably, water and an organic solvent, which is optionally used in combination, in the ink composition A and ink composition B ejected on a substrate are evaporated by heating means, and the resulting image is thereby fixed.

A description will be made of the step (heating drying step) of drying the ejected ink composition A and ink composition B by applying heat to fix the ink composition A and the composition B.

The heating means is not limited as long as the heating means can dry water and a water-soluble organic solvent, which is optionally used in combination. For example, a heat drum, hot air, an infrared lamp, a hot oven, or heating with a heating plate can be used.

The heating temperature is preferably 40° C. or higher, more preferably about 40° C. to 150° C., and still more preferably about 40° C. to 80° C. The drying or heating time can be appropriately determined in consideration of the compositions of the ink composition A and the ink composition B used and the printing speed.

The ink composition A and the ink composition B that are fixed by heating are optically fixed by being irradiated with active energy rays in the irradiation step. In the irradiation step, the fixing is preferably conducted by using UV light, as described above.

EXAMPLES

Embodiments of the present invention will now be specifically described by way of Examples. The embodiments of the present invention are not limited to the Examples described below as long as they do not depart from the gist of the invention. The term "part" is on a mass basis unless otherwise noted.

Microcapsules prepared in Examples described below are also referred to as "MC".

[Preparation of MC Dispersion]

—Preparation of Oil-Phase Component—

In 20 g of ethyl acetate, 4.58 g of TAKENATE D-120N (trifunctional or higher isocyanate compound, solid content: 75% by mass, Mitsui Chemicals, Inc.), 6.9 g of TAKENATE D-116N (isocyanate compound having an ethylene oxide group as a hydrophilic group, ethyl acetate 50 mass % solution, Mitsui Chemicals, Inc.), 5.14 g of an isocyanate compound having a carboxy group and described below (isocyanate compound having a carboxy group as a hydrophilic group, solid content: 35% by mass), 3.5 g of SR399E (dipentaerythritol pentaacrylate, pentafunctional polymerizable compound, SARTOMER), 3.5 g of SR833S (tricyclodecane dimethanol diacrylate, bifunctional polymerizable compound, SARTOMER), and 0.48 g of IRGACURE (registered trademark) 819 (photopolymerization initiator, BASF Corporation, bisacylphosphine oxide) were dissolved to prepare an oil-phase component.

—Synthesis of Isocyanate Compound Having Carboxy Group—

To a three-necked flask, 45 g of 2,2-bis(hydroxymethyl) propionic acid (DMPA), 223.72 g of isophorone diisocyanate (IPDI), and 499.05 g of ethyl acetate (AcOEt) were added and heated to 50° C. Subsequently, 0.7677 g of NEOSTANN U-600 was added thereto, and the resulting reaction mixture was allowed to react for three hours to prepare an isocyanate compound having a carboxy group (an isocyanate compound having a hydrophilic group).

—Aqueous-Phase Component—

In 35 g of distilled water, 8.08 g of a 1 mass % aqueous solution of sodium hydroxide was dissolved to prepare an aqueous-phase component.

The oil-phase component and the aqueous-phase component were mixed. The resulting mixture was emulsified and dispersed at 12,000 rpm for 12 minutes by using a homogenizer to prepare an emulsified product.

The resulting emulsified product was stirred at 400 rpm at 45° C. to distill off the distilled water and ethyl acetate. The stirring was further continued for 12 to 30 hours to adjust the solid content to 25% by mass. Thus, an MC dispersion was prepared.

The resulting microcapsules have a shell that has a three-dimensional crosslinked structure including a hydrophilic group and at least one bond selected from the group consisting of a urethane bond and a urea bond, and a core including a bifunctional polymerizable compound, a pentafunctional polymerizable compound, and a photopolymerization initiator.

Here, the content of the photopolymerization initiator enclosed in the microcapsules is 6.9% by mass relative to the content of the polymerizable compounds enclosed in the microcapsules.

<Confirmation of Inclusion of Microcapsule in MC Dispersion>

Inclusion of microcapsules in the MC dispersion prepared above was confirmed by the method described below. The operation described below was conducted at a liquid temperature of 25° C.

A sample was taken from the MC dispersion prepared as described above. Tetrahydrofuran (THF) was added to the prepared sample in an amount 100 times a total solid content (microcapsules in this Example) in the sample on a mass basis, and mixing was conducted to prepare a diluted liquid of the MC dispersion. The resulting diluted liquid was subjected to a centrifugal separation (at 80,000 rpm for 40 minutes). After the centrifugal separation, whether a residue was present or not was confirmed by visual observation. In the case where the presence of a residue was confirmed, water was added to the residue, and the resulting mixture was stirred by using a stirrer for one hour. The residue was thereby dispersed again in the water to prepare a redispersion. The particle size distribution of the resulting redispersion was measured by a light scattering method using a wet particle size distribution measuring apparatus (LA-960 available from HORIBA, Ltd.). In the case where the particle size distribution was confirmed by the operation described above, the MC dispersion was determined to include microcapsules.

<Volume-Average Dispersed Particle Size of Microcapsules>

A volume-average dispersed particle size of the microcapsules prepared above was measured to be 0.15 µm by the light scattering method.

Here, the measurement of the volume-average particle size by the light scattering method was conducted by using an LA-960 wet particle size distribution measuring apparatus (available from HORIBA, Ltd.).

<Confirmation of Inclusion of Photopolymerization Initiator in Core>

With regard to the MC dispersion prepared above, the enclosure ratio (%) of the photopolymerization initiator was measured to thereby confirm whether or not the core of the microcapsules included the photopolymerization initiator. The details are described below. The operation described below was conducted at a liquid temperature of 25° C.

Two samples (hereinafter, referred to as a "sample 1A" and a "sample 2A") having the same mass were taken from the above MC dispersion.

Tetrahydrofuran (THF) was added to the sample 1A in an amount 100 times a total solid content in the sample 1A on a mass basis, and mixing was conducted to prepare a diluted liquid. The resulting diluted liquid was subjected to a centrifugal separation under the conditions of 80,000 rpm for 40 minutes. A supernatant liquid (hereinafter, referred to as a "supernatant liquid 1A") generated by the centrifugal separation was collected. The mass of the photopolymerization initiator included in the collected supernatant liquid 1A was measured by a liquid chromatography apparatus available from Waters Corporation "Waters 2695". The determined mass of the photopolymerization initiator was defined as a "total amount of photopolymerization initiator".

The sample 2A was subjected to a centrifugal separation under the same conditions as those used in the centrifugal separation of the above diluted liquid. A supernatant liquid (hereinafter, referred to as a "supernatant liquid 2A") generated by the centrifugal separation was collected. The mass of the photopolymerization initiator included in the collected supernatant liquid 2A was measured by the liquid chromatography apparatus. The determined mass of the photopolymerization initiator was defined as an "amount of free photopolymerization initiator".

The enclosure ratio (% by mass) of the photopolymerization initiator was determined in accordance with the formula below on the basis of the "total amount of photopolymerization initiator" and the "amount of free photopolymerization initiator".

Enclosure ratio (% by mass) of photopolymerization initiator=((total amount of photopolymerization initiator−amount of free photopolymerization initiator)/total amount of photopolymerization initiator)×100

According to the results, the enclosure ratio was 99% by mass or more in the microcapsules, and it was confirmed that the core included the photopolymerization initiator.

<Confirmation of Inclusion of Polymerizable Compound in Core>

With regard to the MC dispersion prepared above, the enclosure ratio (%) of the polymerizable compound was measured to thereby confirm whether or not the core of the microcapsules included the polymerizable compound.

The presence or absence of the polymerizable compound was confirmed by the same method as that used in the confirmation of enclosure of the photopolymerization initiator.

According to the results, the enclosure ratio was 99% by mass or more in the microcapsules, and it was confirmed that the core included the polymerizable compound. Herein, the enclosure ratio of the polymerizable compound is a value determined by using a total amount of the bifunctional or lower polymerizable compound and the trifunctional or higher polymerizable compound.

[Preparation of Ink Composition]

Components were mixed with the MC dispersion prepared above so as to obtain black inks (K1 to K7) shown in Table 2 below, and magenta inks (M1 to M4), cyan inks (C1 to C3), and yellow inks (Y1 to Y4) shown in Table 3 below. Thus, ink compositions of respective colors were prepared.

The ink composition of each color was prepared by mixing the components, subsequently stirring the resulting mixture with a stirrer for one hour, and filtering the mixture with a filter having a pore size of 1.5 μm (PVDF 5 μm filter, Millex (registered trademark)-SV, diameter: 25 mm, available from Millipore Corporation).

The absorbances ABS (360 to 390 nm) of the ink composition of each color were measured in a state where a diluted liquid prepared by diluting the ink composition to 2,000 times with ultrapure water was placed in a quartz cell (1 cm×1 cm), and ultrapure water was placed in a reference cell. The measurement was conducted by using a V-570 spectrophotometer (available from JASCO Corporation) under the following conditions.

Conditions

Measurement wavelength: 360 to 390 nm
Measurement interval: every 1 nm

Average of ABS

The average of the absorbances in the range of 360 to 390 nm measured above was calculated by using a mathematical formula (A) below.

Tables 2 and 3 below show the averages of the absorbances ABS of the ink compositions of the respective colors.

$$ABS(360\text{-}390) = \frac{\sum_{\lambda=360}^{31} ABS(\lambda)}{31}$$ Formula (A)

TABLE 2

| | Black ink | | | | | | |
|---|---|---|---|---|---|---|---|
| | K1 | K2 | K3 | K4 | K5 | K6 | K7 |
| Black pigment dispersion liquid | 17.9 | 11.4 | 21.4 | 17.9 | 17.9 | 17.9 | 17.9 |
| MC dispersion | 56.8 | 38.0 | 63.2 | 43.2 | 67.2 | 32.0 | 52.0 |
| Propylene glycol | 4.7 | 4.7 | 3.2 | 4.7 | 3.7 | 4.7 | 4.7 |
| Glycerine | 4.7 | 4.7 | 3.2 | 4.7 | 3.7 | 4.7 | 4.7 |
| Capstone FS-31 | 0.3 | 0.3 | 0.3 | 0.3 | 0.3 | 0.3 | 0.3 |
| Water | 15.6 | 40.9 | 8.7 | 29.2 | 7.2 | 40.4 | 20.4 |
| Coloring agent concentration (mass %) | 2.5 | 1.6 | 3.0 | 2.5 | 2.5 | 2.5 | 2.5 |
| MC concentration (mass %) | 14.20 | 9.50 | 15.80 | 10.80 | 16.80 | 8.00 | 13.00 |
| Average of ABS | 0.13 | 0.08 | 0.16 | 0.13 | 0.14 | 0.12 | 0.13 |

TABLE 3

| | Magenta ink | | | | Cyan ink | | | Yellow ink | | | |
|---|---|---|---|---|---|---|---|---|---|---|---|
| | M1 | M2 | M3 | M4 | C1 | C2 | C3 | Y1 | Y2 | Y3 | Y4 |
| Magenta pigment dispersion liquid | 38.6 | 38.6 | 42.9 | 34.3 | — | — | — | — | — | — | — |
| Cyan pigment dispersion liquid | — | — | — | — | 17.1 | 21.4 | 12.9 | — | — | — | — |
| Yellow pigment dispersion liquid | — | — | — | — | — | — | — | 22.5 | 26.3 | 18.8 | 22.5 |
| MC dispersion | 31.6 | 32.0 | 34.0 | 28.0 | 39.6 | 47.2 | 34.0 | 47.2 | 50.0 | 38.0 | 32.0 |
| Propylene glycol | 4.7 | 4.7 | 4.7 | 4.7 | 4.7 | 4.7 | 4.7 | 4.7 | 4.7 | 4.7 | 4.7 |
| Glycerine | 4.7 | 4.7 | 4.7 | 4.7 | 4.7 | 4.7 | 4.7 | 4.7 | 4.7 | 4.7 | 4.7 |
| Capstone FS-31 | 0.3 | 0.3 | 0.3 | 0.3 | 0.3 | 0.3 | 0.3 | 0.3 | 0.3 | 0.3 | 0.3 |
| Water | 20.1 | 19.7 | 13.4 | 28.0 | 33.6 | 21.7 | 43.4 | 20.6 | 14.1 | 33.6 | 35.8 |
| Coloring agent concentration (mass %) | 5.4 | 5.4 | 6.0 | 4.8 | 2.4 | 3.0 | 1.8 | 3.6 | 4.2 | 3.0 | 3.6 |
| MC concentration (mass %) | 7.90 | 8.00 | 8.50 | 7.00 | 9.90 | 11.80 | 8.50 | 11.80 | 12.50 | 9.50 | 8.00 |
| Average of ABS | 0.05 | 0.05 | 0.06 | 0.04 | 0.08 | 0.10 | 0.06 | 0.10 | 0.12 | 0.08 | 0.10 |

The details of the components shown in Tables 2 and 3 are as follows.

Black pigment dispersion liquid . . . Projet Black APD1000 (trade name), available from FUJIFILM Imaging Colorants, Inc., concentration of carbon black: 14% by mass Yellow pigment dispersion liquid . . . Projet Yellow APD1000 (trade name), available from FUJIFILM Imaging Colorants, Inc., concentration of Pigment Yellow 74, monoazo pigment: 16% by mass Magenta pigment dispersion liquid . . . Projet Magenta APD1000 (trade name), available from FUJIFILM Imaging Colorants, Inc., concentration of quinacridone pigment: 14% by mass Cyan pigment dispersion liquid . . . Projet Cyan APD1000 (trade name), available from FUJIFILM Imaging Colorants, Inc., concentration of copper phthalocyanine pigment: 14% by mass MC dispersion . . . concentration of microcapsule: 25% by mass Capstone FS-31 . . . fluorine-based surfactant, available from DuPont, solid content: 25% by mass Examples 1 to 20 and Comparative Examples 1 to 5

Image recording was conducted by an ink jet recording method of Example or Comparative Example using the ink compositions of respective colors prepared as described above, and evaluations were conducted. The details are as described below.

<Image Recording and Evaluation>

Image recording was conducted by using the ink compositions of respective colors as ink sets of an ink composition A (liquid A) and an ink composition B (liquid B) in the combinations described in Tables 4 to 7 below, and evaluations described below were conducted. Tables 4 to 7 below show the results.

(Preparation of Sample for Evaluation)

The ink composition A and the ink composition B were ejected onto a polyvinyl chloride substrate (available from Avery Dennison Corporation, AVERY 400 GLOSS WHITE PERMANENT (trade name)) by using an ink jet printer including two ink jet heads connected to storage tanks filled with the ink composition A and the ink composition B combined as described in Tables 4 to 7 below and a UV-LED light source for light irradiation (available from Nichia Corporation, NC4U134 (trade name), peak wavelength: 385 nm).

The conditions for the ejection were set such that an image after recording had a resolution of 1200 dpi×900 dpi (dot per inch), and the ejection was conducted from the two heads to record an image illustrated in FIG. 1. The image illustrated in FIG. 1 has a thin-line portion 1 (set width: 1 mm, length: 10 cm) for evaluation of color bleeding and a solid-image portion 2 for evaluation of abrasion resistance. In FIG. 1, symbol A denotes a portion recorded with the ink composition A, and symbol B denotes a portion recorded with the ink composition B.

After 0.1 seconds from the image recording, the portion on which the image had been recorded was irradiated with light from the UV-LED light source to prepare samples for evaluation in which the exposure dose in the portion irradiated with the light was 10 mJ/cm$^2$, 20 mJ/cm$^2$, 30 mJ/cm$^2$, or 40 mJ/cm$^2$.

(1. Color Bleeding)

In each of the samples for evaluation, the samples being prepared by conducting light irradiation at the above exposure doses, the width of the thin-line portion of the formed image was measured to evaluate color bleeding in accordance with evaluation criteria described below. In the evaluation of the width of a thin line, among the thin lines formed by using the ink composition A and the thin lines formed by using the ink composition B, thin lines of an ink composition having larger differences from the set value of 1 mm were used for the evaluation. Herein, the width of a thin line is an average of widths measured at arbitrary three points of thin lines.

Evaluation Criteria

A: Among the exposure conditions of 10 to 40 mJ/cm$^2$, under two or more exposure conditions, the width is 0.9 mm or more and 1.1 mm or less, and there is no difference in width of the thin line between the ink composition A and the ink composition B.

B: Among the exposure conditions of 10 to 40 mJ/cm$^2$, under any of the exposure conditions, the width is 0.9 mm or more and 1.1 mm or less.

C: Under all the conditions of an exposure dose of 10 to 40 mJ/cm$^2$, the width is less than 0.9 mm or exceeds 1.1 mm.

(2. Abrasion Resistance)

In each of the samples for evaluation, the samples being prepared by conducting light irradiation at the above exposure doses, the solid-image portion of the formed image was subjected to a Gakushin test under the conditions described below by using cotton moistened with ultrapure water such that the cotton passed over a boundary portion between the portion recorded with the ink composition A and the portion recorded with the ink composition B. Thus, abrasion resistance was evaluated in accordance with evaluation criteria described below. Of the portion recorded with the ink composition A and the portion recorded with the ink composition B, a portion having a poor evaluation result was adopted in the evaluation result. In the evaluation criteria described below, when the results include at least one of 1 or 2 in the exposure conditions, the sample was rated as B, and when the results include any of 3 to 5 in each of the exposure conditions, the sample was rated as A.

Conditions

Apparatus: AB-301 Gakushin-type color fastness rubbing tester, Tester Sangyo Co., Ltd.

Test load: 200 g

The number of times of reciprocating motion: 3, 5, 10, 15, and 20

Evaluation Criteria

5: The image was not separated from the substrate even after the reciprocating motion was performed 20 times.

4: The image was separated from the substrate after the reciprocating motion was performed 15 times.

3: The image was separated from the substrate after the reciprocating motion was performed 10 times.

2: The image was separated from the substrate after the reciprocating motion was performed 5 times.

1: The image was separated from the substrate after the reciprocating motion was performed 3 times.

(3. Ejection Performance)

An image illustrated in FIG. 2 was recorded on a substrate with the ink composition A and the ink composition B combined as described in Tables 4 to 7 below by using the same ink jet printer, the same ejection conditions, and the same substrate as those used in the preparation of the samples for evaluation. The image was recorded by transporting the substrate in the machine direction of FIG. 2 and scanning the heads in the cross direction of FIG. 2. The exposure dose was 40 mJ/cm².

Figure 2:
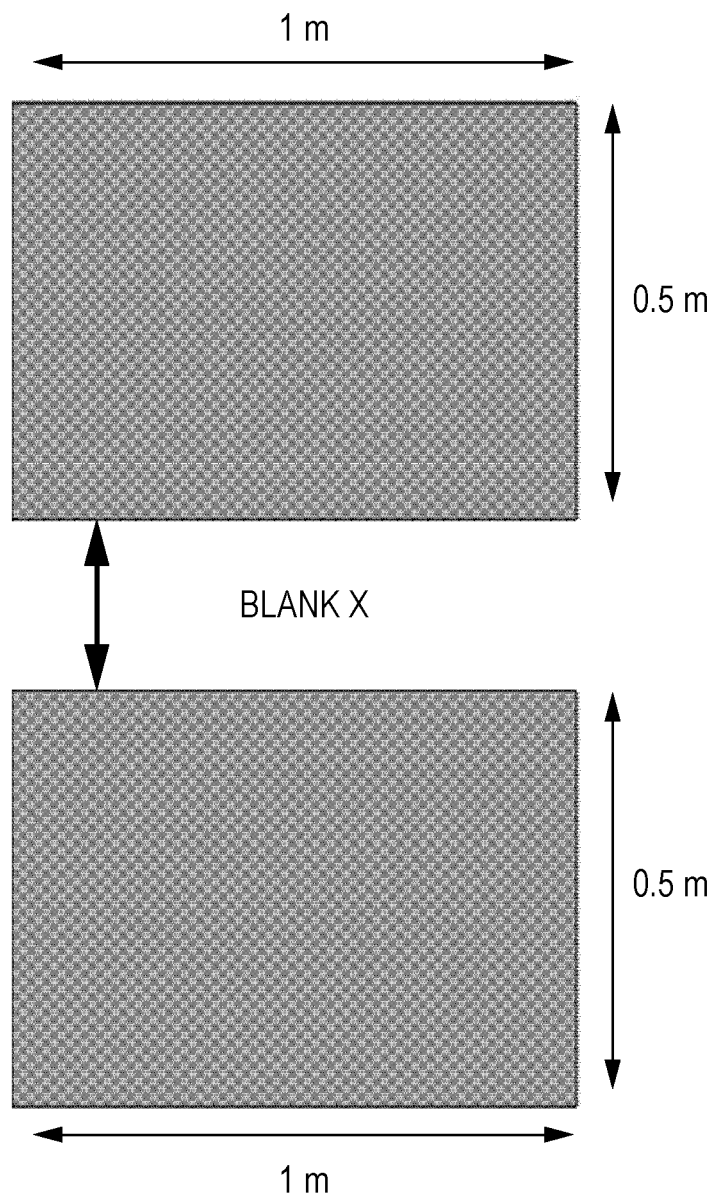
FIG. 2 is a view illustrating an image for color development evaluation in Examples.

The image illustrated in FIG. 2 is an image in which squares (1 cm×1 cm) recorded with the ink composition A and the ink composition B are alternately arranged, and has a blank X.

The length of the blank X was adjusted such that the idling time (the time during which ejection was not performed) became 2, 3, 4, 5 or 6 seconds.

The image after recording was visually observed, and the ejection performance was evaluated in accordance with evaluation criteria described below. In the evaluation criteria described below, 1 and 2 were rated as B, and 3 to 5 were rated as A. Evaluation Criteria 5: The quality of the image was degraded when the blank X corresponded to 6 seconds.

4: The quality of the image was degraded when the blank X corresponded to 5 seconds.

3: The quality of the image was degraded when the blank X corresponded to 4 seconds.

2: The quality of the image was degraded when the blank X corresponded to 3 seconds.

1: The quality of the image was degraded when the blank X corresponded to 2 seconds.

(4. Color Development)

An image having a size of 2 cm×2 cm and formed of each ink composition was recorded on a substrate with the ink composition A and the ink composition B combined as described in Tables 4 to 7 below by using the same ink jet printer, the same ejection conditions, and the same substrate as those used in the preparation of the samples for evaluation. The exposure dose was 40 mJ/cm².

The reflection density (saturation) of the image of each ink composition was measured with a colorimeter (Spectro-Eye, available from X-Rite, Inc.).

The color development was evaluated in accordance with evaluation criteria described below on the basis of the measured reflection density (saturation) of the image of the ink composition A and the measured reflection density (saturation) of the image of the ink composition B. Note that the result of an ink composition having a lower point was adopted as the evaluation result. In the evaluation criteria described below, 1 and 2 were rated as B, and 3 to 5 were rated as A.

Evaluation Criteria

5: The saturation of cyan is 60 or more, the saturation of magenta is 75 or more, the saturation of yellow is 90 or more, or the concentration of black is 2.0 or more.

4: The saturation of cyan is 58 or more and less than 60, the saturation of magenta is 72.5 or more and less than 75, the saturation of yellow is 85 or more and less than 90, or the concentration of black is 1.9 or more and less than 2.0.

3: The saturation of cyan is 56 or more and less than 58, the saturation of magenta is 70 or more and less than 72.5, the saturation of yellow is 80 or more and less than 85, or the concentration of black is 1.8 or more and less than 1.9.

2: The saturation of cyan is 54 or more and less than 56, the saturation of magenta is 67.5 more and less than 70, the saturation of yellow is 75 or more and less than 80, or the concentration of black is 1.7 or more and less than 1.8.

1: The saturation of cyan is less than 54, the saturation of magenta is less than 67.5, the saturation of yellow is less than 75, or the concentration of black is less than 1.7.

TABLE 4

|  |  | Example 1 | | Example 2 | | Example 3 | | Comparative Example 1 | |
| --- | --- | --- | --- | --- | --- | --- | --- | --- | --- |
|  | Ink set | Liquid A C1 | Liquid B K1 | Liquid A C1 | Liquid B K4 | Liquid A C1 | Liquid B K5 | Liquid A C1 | Liquid B K6 |
|  | $ABS_A$ or $ABS_B$ (360 to 390 nm) | 0.08 | 0.13 | 0.08 | 0.13 | 0.08 | 0.14 | 0.08 | 0.12 |
|  | $M_A$ or $M_B$ (mass %) | 9.90 | 14.20 | 9.90 | 10.80 | 9.90 | 16.80 | 9.90 | 8.00 |
|  | $(1 + 0.1 \times (ABS_B/ABS_A)) \times M_A$ | 11.51 | $M_B =$ | 11.51 | $M_B =$ | 11.63 | $M_B =$ | 11.39 | $M_B =$ |
|  | $(1 + 0.15 \times (ABS_B/ABS_A)) \times M_A$ | 12.31 | 14.20 | 12.31 | 10.80 | 12.50 | 16.80 | 12.13 | 8.00 |
|  | $(1 + 0.3 \times (ABS_B/ABS_A)) \times M_A$ | 14.73 |  | 14.73 |  | 15.10 |  | 14.36 |  |
|  | $(1 + 0.4 \times (ABS_B/ABS_A)) \times M_A$ | 16.34 |  | 16.34 |  | 16.83 |  | 15.84 |  |
|  | Relationship of $ABS_A$, $ABS_B$, $M_A$, and $M_B$ | Formula (4) | | Formula (2) | | Formula (3) | | — | |
| Image quality evaluation | Color bleeding 10 mJ/cm² | 1.0 | 1.1 | 1.0 | 1.4 | 1.0 | 1.0 | 1.0 | 1.4 |
|  | Color bleeding 20 mJ/cm² | 1.0 | 1.1 | 1.0 | 1.3 | 1.0 | 1.0 | 1.0 | 1.4 |
|  | Color bleeding 30 mJ/cm² | 1.0 | 1.0 | 1.0 | 1.2 | 1.0 | 1.0 | 1.0 | 1.3 |
|  | Color bleeding 40 mJ/cm² | 1.0 | 1.0 | 1.0 | 1.1 | 1.0 | 1.0 | 1.0 | 1.2 |
|  | Evaluation result | A | | B | | A | | C | |
| Film evaluation | Abrasion resistance 10 mJ/cm² | 5 | | 5 | | 5 | | 3 | |
|  | Abrasion resistance 20 mJ/cm² | 5 | | 5 | | 5 | | 4 | |
|  | Abrasion resistance 30 mJ/cm² | 5 | | 5 | | 5 | | 5 | |
|  | Abrasion resistance 40 mJ/cm² | 5 | | 5 | | 5 | | 5 | |
|  | Evaluation result | A | | A | | A | | A | |
|  | Ejection performance | 5 | | 5 | | 3 | | 5 | |
|  |  | A | | A | | A | | A | |
|  | Color development | 5 | | 5 | | 5 | | 5 | |
|  |  | A | | A | | A | | A | |

TABLE 4-continued

|  |  | Example 4 | | Example 5 | | Example 6 | |
|---|---|---|---|---|---|---|---|
| Ink set | | Liquid A C2 | Liquid B K1 | Liquid A C3 | Liquid B K1 | Liquid A C1 | Liquid B K3 |
| $ABS_A$ or $ABS_B$ (360 to 390 nm) | | 0.10 | 0.13 | 0.06 | 0.13 | 0.08 | 0.16 |
| $M_A$ or $M_B$ (mass %) | | 11.80 | 14.20 | 8.50 | 14.20 | 9.90 | 15.80 |
| $(1 + 0.1 \times (ABS_B/ABS_A)) \times M_A$ | | 13.33 | $M_B =$ | 10.34 | $M_B =$ | 11.88 | $M_B =$ |
| $(1 + 0.15 \times (ABS_B/ABS_A)) \times M_A$ | | 14.10 | 14.20 | 11.26 | 14.20 | 12.87 | 15.80 |
| $(1 + 0.3 \times (ABS_B/ABS_A)) \times M_A$ | | 16.40 | | 14.03 | | 15.84 | |
| $(1 + 0.4 \times (ABS_B/ABS_A)) \times M_A$ | | 17.94 | | 15.87 | | 17.82 | |
| Relationship of $ABS_A$, $ABS_B$, $M_A$, and $M_B$ | | Formula (4) | | Formula (3) | | Formula (4) | |
| Image quality evaluation | Color bleeding 10 mJ/cm² | 1.1 | 1.1 | 1.0 | 1.1 | 1.0 | 1.1 |
| | Color bleeding 20 mJ/cm² | 1.1 | 1.1 | 1.0 | 1.1 | 1.0 | 1.1 |
| | Color bleeding 30 mJ/cm² | 1.0 | 1.0 | 1.0 | 1.0 | 1.0 | 1.0 |
| | Color bleeding 40 mJ/cm² | 1.0 | 1.0 | 1.0 | 1.0 | 1.0 | 1.0 |
| | Evaluation result | A | | A | | A | |
| Film evaluation | Abrasion resistance 10 mJ/cm² | 5 | | 5 | | 3 | |
| | Abrasion resistance 20 mJ/cm² | 5 | | 5 | | 3 | |
| | Abrasion resistance 30 mJ/cm² | 5 | | 5 | | 4 | |
| | Abrasion resistance 40 mJ/cm² | 5 | | 5 | | 5 | |
| | Evaluation result | A | | A | | A | |
| | Ejection performance | 5 | | 5 | | 3 | |
| | | A | | A | | A | |
| | Color development | 5 | | 3 | | 5 | |
| | | A | | A | | A | |

$M_A < M_B$ Formula (2)
$(1 + 0.1 \times (ABS_B/ABS_A)) \times M_A < M_B < (1 + 0.4 \times (ABS_B/ABS_A)) \times M_A$ Formula (3)
$(1 + 0.15 \times (ABS_B/ABS_A)) \times M_A < M_B < (1 + 0.3 \times (ABS_B/ABS_A)) \times M_A$ Formula (4)
Note that when the formula (4) is satisfied, the formulae (3) and (2) are also satisfied. When the formula (3) is satisfied, the formula (2) is also satisfied.
The description of "Formula (2)" in the table means that only the formula (2) is satisfied.
The numerical values of each example in the image quality evaluation each represent the width (unit: mm) of a thin line.

TABLE 5

|  |  | Example 7 | | Example 8 | | Example 9 | |
|---|---|---|---|---|---|---|---|
| Ink set | | Liquid A M1 | Liquid B K1 | Liquid A M1 | Liquid B K4 | Liquid A M1 | Liquid B K5 |
| $ABS_A$ or $ABS_B$ (360 to 390 nm) | | 0.05 | 0.13 | 0.05 | 0.13 | 0.05 | 0.14 |
| $M_A$ or $M_B$ (mass %) | | 7.90 | 14.20 | 7.90 | 10.80 | 7.90 | 16.80 |
| $(1 + 0.1 \times (ABS_B/ABS_A)) \times M_A$ | | 9.95 | $M_B =$ | 9.95 | $M_B =$ | 10.11 | $M_B =$ |
| $(1 + 0.15 \times (ABS_B/ABS_A)) \times M_A$ | | 10.98 | 14.20 | 10.98 | 10.80 | 11.22 | 16.80 |
| $(1 + 0.3 \times (ABS_B/ABS_A)) \times M_A$ | | 14.06 | | 14.06 | | 14.54 | |
| $(1 + 0.4 \times (ABS_B/ABS_A)) \times M_A$ | | 16.12 | | 16.12 | | 16.75 | |
| Relationship of $ABS_A$, $ABS_B$, $M_A$, and $M_B$ | | Formula (3) | | Formula (3) | | Formula (2) | |
| Image quality evaluation | Color bleeding 10 mJ/cm² | 1.0 | 1.1 | 1.0 | 1.4 | 1.0 | 1.0 |
| | Color bleeding 20 mJ/cm² | 1.0 | 1.1 | 1.0 | 1.3 | 1.0 | 1.0 |
| | Color bleeding 30 mJ/cm² | 1.0 | 1.0 | 1.0 | 1.2 | 1.0 | 1.0 |
| | Color bleeding 40 mJ/cm² | 1.0 | 1.0 | 1.0 | 1.1 | 1.0 | 1.0 |
| | Evaluation result | A | | B | | A | |
| Film evaluation | Abrasion resistance 10 mJ/cm² | 5 | | 5 | | 5 | |
| | Abrasion resistance 20 mJ/cm² | 5 | | 5 | | 5 | |
| | Abrasion resistance 30 mJ/cm² | 5 | | 5 | | 5 | |
| | Abrasion resistance 40 mJ/cm² | 5 | | 5 | | 5 | |
| | Evaluation result | A | | A | | A | |
| | Ejection performance | 5 | | 5 | | 3 | |
| | | A | | A | | A | |
| | Color development | 5 | | 5 | | 5 | |
| | | A | | A | | A | |

|  |  | Comparative Example 2 | | Example 10 | | Example 11 | |
|---|---|---|---|---|---|---|---|
| Ink set | | Liquid A M2 | Liquid B K6 | Liquid A M3 | Liquid B K1 | Liquid A M4 | Liquid B K1 |
| $ABS_A$ or $ABS_B$ (360 to 390 nm) | | 0.05 | 0.12 | 0.06 | 0.13 | 0.04 | 0.13 |
| $M_A$ or $M_B$ (mass %) | | 8.00 | 8.00 | 8.50 | 14.20 | 7.00 | 14.20 |
| $(1 + 0.1 \times (ABS_B/ABS_A)) \times M_A$ | | 9.92 | $M_B =$ | 10.34 | $M_B =$ | 9.28 | $M_B =$ |
| $(1 + 0.15 \times (ABS_B/ABS_A)) \times M_A$ | | 10.88 | 8.00 | 11.26 | 14.20 | 10.41 | 14.20 |
| $(1 + 0.3 \times (ABS_B/ABS_A)) \times M_A$ | | 13.76 | | 14.03 | | 13.83 | |
| $(1 + 0.4 \times (ABS_B/ABS_A)) \times M_A$ | | 15.68 | | 15.87 | | 16.10 | |

TABLE 5-continued

|  |  |  |  | Formula (3) |  | Formula (3) |  |
|---|---|---|---|---|---|---|---|
| | Relationship of $ABS_A$, $ABS_B$, $M_A$, and $M_B$ | — | | | | | |
| Image quality evaluation | Color bleeding 10 mJ/cm² | 1.0 | 1.5 | 1.2 | 1.1 | 1.0 | 1.1 |
| | Color bleeding 20 mJ/cm² | 1.0 | 1.4 | 1.1 | 1.1 | 1.0 | 1.1 |
| | Color bleeding 30 mJ/cm² | 1.0 | 1.3 | 1.1 | 1.0 | 1.0 | 1.0 |
| | Color bleeding 40 mJ/cm² | 1.0 | 1.3 | 1.0 | 1.0 | 1.0 | 1.0 |
| | Evaluation result | C | | B | | A | |
| Film evaluation | Abrasion resistance 10 mJ/cm² | 3 | | 5 | | 5 | |
| | Abrasion resistance 20 mJ/cm² | 4 | | 5 | | 5 | |
| | Abrasion resistance 30 mJ/cm² | 5 | | 5 | | 5 | |
| | Abrasion resistance 40 mJ/cm² | 5 | | 5 | | 5 | |
| | Evaluation result | A | | A | | A | |
| | Ejection performance | 5 | | 5 | | 5 | |
| | | A | | A | | A | |
| | Color development | 5 | | 5 | | 3 | |
| | | A | | A | | A | |

$M_A < M_B$ Formula (2)

$(1 + 0.1 \times (ABS_B/ABS_A)) \times M_A < M_B < (1 + 0.4 \times (ABS_B/ABS_A)) \times M_A$ Formula (3)

$(1 + 0.15 \times (ABS_B/ABS_A)) \times M_A < M_B < (1 + 0.3 \times (ABS_B/ABS_A)) \times M_A$ Formula (4)

Note that when the formula (4) is satisfied, the formulae (3) and (2) are also satisfied. When the formula (3) is satisfied, the formula (2) is also satisfied.

The description of "Formula (2)" in the table means that only the formula (2) is satisfied.

The numerical values of each example in the image quality evaluation each represent the width (unit: mm) of a thin line.

TABLE 6

| | Example 12 | | Example 13 | | Example 14 | |
|---|---|---|---|---|---|---|
| Ink set | Liquid A Y1 | Liquid B K1 | Liquid A Y1 | Liquid B K7 | Liquid A Y1 | Liquid B K5 |
| $ABS_A$ or $ABS_B$ (360 to 390 nm) | 0.10 | 0.13 | 0.10 | 0.13 | 0.10 | 0.14 |
| $M_A$ or $M_B$ (mass %) | 11.80 | 14.20 | 11.80 | 13.00 | 11.80 | 16.80 |
| $(1 + 0.1 \times (ABS_B/ABS_A)) \times M_A$ | 13.33 | $M_B =$ | 13.33 | $M_B =$ | 13.45 | $M_B =$ |
| $(1 + 0.15 \times (ABS_B/ABS_A)) \times M_A$ | 14.10 | 14.20 | 14.10 | 13.00 | 14.28 | 16.80 |
| $(1 + 0.3 \times (ABS_B/ABS_A)) \times M_A$ | 16.40 | | 16.40 | | 16.76 | |
| $(1 + 0.4 \times (ABS_B/ABS_A)) \times M_A$ | 17.94 | | 17.94 | | 18.41 | |
| Relationship of $ABS_A$, $ABS_B$, $M_A$, and $M_B$ | Formula (4) | | Formula (2) | | Formula (3) | |
| Image quality evaluation Color bleeding 10 mJ/cm² | 1.1 | 1.1 | 1.0 | 1.2 | 1.1 | 1.0 |
| Color bleeding 20 mJ/cm² | 1.1 | 1.1 | 1.0 | 1.2 | 1.1 | 1.0 |
| Color bleeding 30 mJ/cm² | 1.0 | 1.0 | 1.0 | 1.1 | 1.0 | 1.0 |
| Color bleeding 40 mJ/cm² | 1.0 | 1.0 | 1.0 | 1.0 | 1.0 | 1.0 |
| Evaluation result | A | | B | | A | |
| Film evaluation Abrasion resistance 10 mJ/cm² | 5 | | 5 | | 5 | |
| Abrasion resistance 20 mJ/cm² | 5 | | 5 | | 5 | |
| Abrasion resistance 30 mJ/cm² | 5 | | 5 | | 5 | |
| Abrasion resistance 40 mJ/cm² | 5 | | 5 | | 5 | |
| Evaluation result | A | | A | | A | |
| Ejection performance | 5 | | 5 | | 3 | |
| | A | | A | | A | |
| Color development | 5 | | 5 | | 5 | |
| | A | | A | | A | |

| | Comparative Example 3 | | Example 15 | | Example 16 | |
|---|---|---|---|---|---|---|
| Ink set | Liquid A Y1 | Liquid B K6 | Liquid A Y2 | Liquid B K1 | Liquid A Y3 | Liquid B K1 |
| $ABS_A$ or $ABS_B$ (360 to 390 nm) | 0.10 | 0.12 | 0.12 | 0.13 | 0.08 | 0.13 |
| $M_A$ or $M_B$ (mass %) | 11.80 | 8.00 | 12.50 | 14.20 | 9.50 | 14.20 |
| $(1 + 0.1 \times (ABS_B/ABS_A)) \times M_A$ | 13.22 | $M_B =$ | 13.85 | $M_B =$ | 11.04 | $M_B =$ |
| $(1 + 0.15 \times (ABS_B/ABS_A)) \times M_A$ | 13.92 | 8.00 | 14.53 | 14.20 | 11.82 | 14.20 |
| $(1 + 0.3 \times (ABS_B/ABS_A)) \times M_A$ | 16.05 | | 16.56 | | 14.13 | |
| $(1 + 0.4 \times (ABS_B/ABS_A)) \times M_A$ | 17.46 | | 17.92 | | 15.68 | |
| Relationship of $ABS_A$, $ABS_B$, $M_A$, and $M_B$ | — | | Formula (3) | | Formula (3) | |
| Image quality evaluation Color bleeding 10 mJ/cm² | 1.1 | 1.5 | 1.2 | 1.1 | 1.0 | 1.1 |
| Color bleeding 20 mJ/cm² | 1.1 | 1.4 | 1.1 | 1.1 | 1.0 | 1.1 |
| Color bleeding 30 mJ/cm² | 1.0 | 1.3 | 1.1 | 1.0 | 1.0 | 1.0 |
| Color bleeding 40 mJ/cm² | 1.0 | 1.3 | 1.1 | 1.0 | 1.0 | 1.0 |
| Evaluation result | C | | B | | A | |

TABLE 6-continued

| | | | | |
|---|---|---|---|---|
| Film evaluation | Abrasion resistance 10 mJ/cm² | 3 | 5 | 5 |
| | Abrasion resistance 20 mJ/cm² | 4 | 5 | 5 |
| | Abrasion resistance 30 mJ/cm² | 5 | 5 | 5 |
| | Abrasion resistance 40 mJ/cm² | 5 | 5 | 5 |
| | Evaluation result | A | A | A |
| | Ejection performance | 5 | 5 | 5 |
| | | A | A | A |
| | Color development | 5 | 5 | 3 |
| | | A | A | A |

$M_A < M_B$ Formula (2)

$(1 + 0.1 \times (ABS_B/ABS_A)) \times M_A < M_B < (1 + 0.4 \times (ABS_B/ABS_A)) \times M_A$ Formula (3)

$(1 + 0.15 \times (ABS_B/ABS_A)) \times M_A < M_B < (1 + 0.3 \times (ABS_B/ABS_A)) \times M_A$ Formula (4)

Note that when the formula (4) is satisfied, the formulae (3) and (2) are also satisfied. When the formula (3) is satisfied, the formula (2) is also satisfied.

The description of "Formula (2)" in the table means that only the formula (2) is satisfied.

The numerical values of each example in the image quality evaluation each represent the width (unit: mm) of a thin line.

TABLE 7

| | | Example 17 | | Example 18 | | Example 19 | |
|---|---|---|---|---|---|---|---|
| | Ink set | Liquid A C1 | Liquid B Y1 | Liquid A M1 | Liquid B Y1 | Liquid A M1 | Liquid B C1 |
| $ABS_A$ or $ABS_B$ (360 to 390 nm) | | 0.08 | 0.10 | 0.05 | 0.10 | 0.05 | 0.08 |
| $M_A$ or $M_B$ (mass %) | | 9.90 | 11.80 | 7.90 | 11.80 | 7.90 | 9.90 |
| $(1 + 0.1 \times (ABS_B/ABS_A)) \times M_A$ | | 11.14 | $M_B =$ | 9.48 | $M_B =$ | 9.16 | $M_B =$ |
| $(1 + 0.15 \times (ABS_B/ABS_A)) \times M_A$ | | 11.76 | 11.80 | 10.27 | 11.80 | 9.80 | 9.90 |
| $(1 + 0.3 \times (ABS_B/ABS_A)) \times M_A$ | | 13.61 | | 12.64 | | 11.69 | |
| $(1 + 0.4 \times (ABS_B/ABS_A)) \times M_A$ | | 14.85 | | 14.22 | | 12.96 | |
| Relationship of $ABS_A$, $ABS_B$, $M_A$, and $M_B$ | | Formula (4) | | Formula (4) | | Formula (4) | |
| Image quality evaluation | Color bleeding 10 mJ/cm² | 1.0 | 1.1 | 1.0 | 1.1 | 1.0 | 1.0 |
| | Color bleeding 20 mJ/cm² | 1.0 | 1.1 | 1.0 | 1.1 | 1.0 | 1.0 |
| | Color bleeding 30 mJ/cm² | 1.0 | 1.0 | 1.0 | 1.0 | 1.0 | 1.0 |
| | Color bleeding 40 mJ/cm² | 1.0 | 1.0 | 1.0 | 1.0 | 1.0 | 1.0 |
| | Evaluation result | A | | A | | A | |
| Film evaluation | Abrasion resistance 10 mJ/cm² | 5 | | 5 | | 5 | |
| | Abrasion resistance 20 mJ/cm² | 5 | | 5 | | 5 | |
| | Abrasion resistance 30 mJ/cm² | 5 | | 5 | | 5 | |
| | Abrasion resistance 40 mJ/cm² | 5 | | 5 | | 5 | |
| | Evaluation result | A | | A | | A | |
| | Ejection performance | 5 | | 5 | | 5 | |
| | | A | | A | | A | |
| | Color development | 5 | | 5 | | 5 | |
| | | A | | A | | A | |

| | | Comparative Example 4 | | Comparative Example 5 | |
|---|---|---|---|---|---|
| | Ink set | Liquid A C1 | Liquid B Y4 | Liquid A M2 | Liquid B Y4 |
| $ABS_A$ or $ABS_B$ (360 to 390 nm) | | 0.08 | 0.10 | 0.05 | 0.10 |
| $M_A$ or $M_B$ (mass %) | | 9.90 | 8.00 | 8.00 | 8.00 |
| $(1 + 0.1 \times (ABS_B/ABS_A)) \times M_A$ | | 11.14 | $M_B =$ | 9.60 | $M_B =$ |
| $(1 + 0.15 \times (ABS_B/ABS_A)) \times M_A$ | | 11.76 | 8.00 | 10.40 | 8.00 |
| $(1 + 0.3 \times (ABS_B/ABS_A)) \times M_A$ | | 13.61 | | 12.80 | |
| $(1 + 0.4 \times (ABS_B/ABS_A)) \times M_A$ | | 14.85 | | 14.40 | |
| Relationship of $ABS_A$, $ABS_B$, $M_A$, and $M_B$ | | — | | — | |
| Image quality evaluation | Color bleeding 10 mJ/cm² | 1.0 | 1.6 | 1.0 | 1.6 |
| | Color bleeding 20 mJ/cm² | 1.0 | 1.5 | 1.0 | 1.5 |
| | Color bleeding 30 mJ/cm² | 1.0 | 1.4 | 1.0 | 1.4 |
| | Color bleeding 40 mJ/cm² | 1.0 | 1.4 | 1.0 | 1.4 |
| | Evaluation result | C | | C | |

TABLE 7-continued

| | | | |
|---|---|---|---|
| Film evaluation | Abrasion resistance 10 mJ/cm² | 3 | 3 |
| | Abrasion resistance 20 mJ/cm² | 4 | 4 |
| | Abrasion resistance 30 mJ/cm² | 5 | 5 |
| | Abrasion resistance 40 mJ/cm² | 5 | 5 |
| | Evaluation result | A | A |
| | Ejection performance | 5 | 5 |
| | | A | A |
| | Color development | 5 | 5 |
| | | A | A |

$M_A < M_B$  Formula (2)
$(1 + 0.1 \times (ABS_B/ABS_A)) \times M_A < M_B < (1 + 0.4 \times (ABS_B/ABS_A)) \times M_A$  Formula (3)
$(1 + 0.15 \times (ABS_B/ABS_A)) \times M_A < M_B < (1 + 0.3 \times (ABS_B/ABS_A)) \times M_A$  Formula (4)
Note that when the formula (4) is satisfied, the formulae (3) and (2) are also satisfied. When the formula (3) is satisfied, the formula (2) is also satisfied.
The description of "Formula (2)" in the table means that only the formula (2) is satisfied.
The numerical values of each example in the image quality evaluation each represent the width (unit: mm) of a thin line.

Tables 4 to 7 show that the Examples exhibited good evaluation results of color bleeding, abrasion resistance, ejection performance, and color development. These results show that the Examples are ink jet recording methods in which color bleeding is suppressed.

Image Recording and Evaluation with Four Colors

Ink compositions of respective colors were ejected onto a polyvinyl chloride substrate (available from Avery Dennison Corporation, AVERY 400 GLOSS WHITE PERMANENT (trade name)) by using an ink jet printer including four ink jet heads connected to storage tanks filled with the ink compositions of respective colors combined as described in Table 8 below and a UV-LED light source for light irradiation (available from Nichia Corporation, NC4U134 (trade name), peak wavelength: 385 nm).

Figure 3:
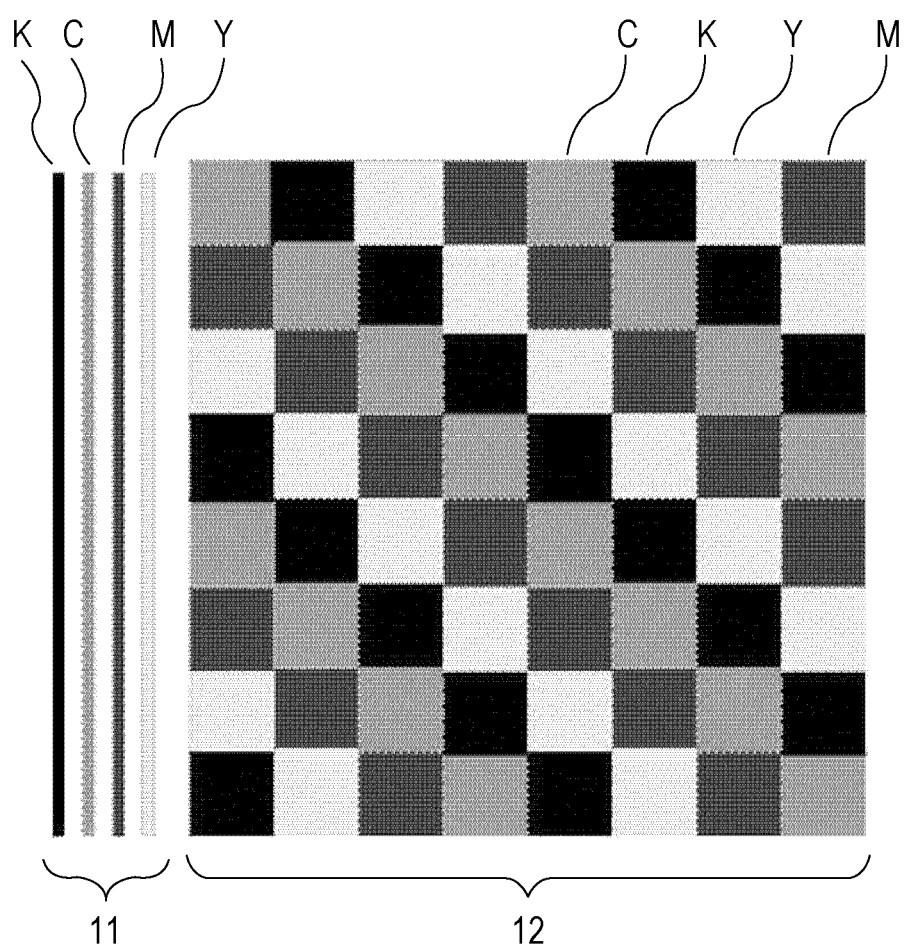
FIG. 3 is a view illustrating an image of a sample for four-color evaluation in Examples.

The conditions for ejection were set such that an image after recording had a resolution of 1200 dpi×900 dpi (dot per inch), and the ejection was conducted from the four heads to record an image illustrated in FIG. 3. The image illustrated in FIG. 3 has a thin-line portion 11 (set width: 1 mm, length: 10 cm) for evaluation of color bleeding and a solid-image portion 12 for evaluation of abrasion resistance.

After 0.1 seconds from the image recording, the portion on which the image had been recorded was irradiated with light from the UV-LED light source to prepare samples for evaluation in which the exposure dose in the portion irradiated with the light was 10 mJ/cm², 20 mJ/cm², 30 mJ/cm², or 40 mJ/cm².

For the samples for four-color evaluation, the above evaluations of 1. Color Bleeding, 2. Abrasion Resistance, 3. Ejection Performance, and 4. Color Development were conducted. Table 8 below shows the evaluation results.

Figure 4:
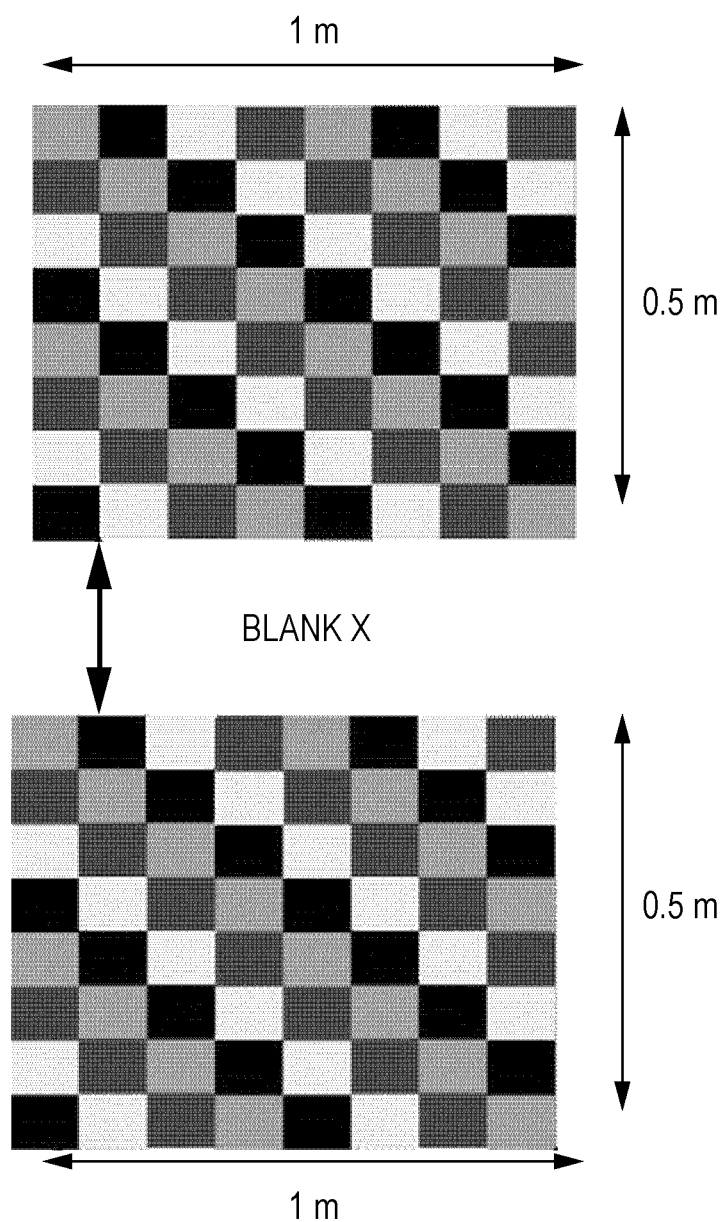
FIG. 4 is a view illustrating an image for four-color color development evaluation in Examples.

The evaluation of 3. Ejection Performance was conducted by recording an image illustrated in FIG. 4 on a substrate. The image illustrated in FIG. 4 is an image in which squares recorded with the ink compositions of cyan (C), magenta (M), yellow (Y), and black (K) are arranged in order, and has a blank X. The blank X is as described above.

TABLE 8

| | | Example 20 | | | |
|---|---|---|---|---|---|
| | Ink set | M1 | C1 | Y1 | K1 |
| | ABS (360 to 390 nm) | 0.05 | 0.08 | 0.10 | 0.13 |
| | M (mass %) | 7.90 | 9.90 | 11.80 | 14.20 |
| Image quality evaluation | Color bleeding 10 mJ/cm² | 1.0 | 1.0 | 1.1 | 1.1 |
| | Color bleeding 20 mJ/cm² | 1.0 | 1.0 | 1.1 | 1.1 |
| | Color bleeding 30 mJ/cm² | 1.0 | 1.0 | 1.0 | 1.0 |
| | Color bleeding 40 mJ/cm² | 1.0 | 1.0 | 1.0 | 1.0 |
| | Evaluation result | A | | | |
| Film evaluation | Abrasion resistance 10 mJ/cm² | 5 | | | |
| | Abrasion resistance 20 mJ/cm² | 5 | | | |
| | Abrasion resistance 30 mJ/cm² | 5 | | | |
| | Abrasion resistance 40 mJ/cm² | 5 | | | |
| | Evaluation result | A | | | |
| | Ejection performance | 5 | | | |
| | | A | | | |
| | Color development | 5 | | | |
| | | A | | | |

The numerical values of the example in the image quality evaluation each represent the width (unit: mm) of a thin line.

Table 8 shows good evaluation results of color bleeding, abrasion resistance, ejection performance, and color development. These results show that there is provided an ink jet recording method in which color bleeding is suppressed.

The entire contents disclosed by JP2016-024174 filed in the Japan Patent Office on Feb. 10, 2016 are incorporated herein by reference.

All documents, patent applications, and technical standards described in the present specification are incorporated herein by reference to the same extent as when the individual documents, patent applications, and technical standards are specifically and individually described as being incorporated herein by reference.

What is claimed is:

1. An ink jet recording method comprising:
   an ejection step of ejecting, onto a substrate, an ink composition A that includes water, a coloring agent, a photopolymerization initiator, and a microcapsule enclosing at least a polymerizable compound therein, and an ink composition B that includes water, a coloring agent, a photopolymerization initiator, and a microcapsule enclosing at least a polymerizable compound therein; and
   an irradiation step of irradiating, with light, the ink composition A and the ink composition B ejected on the substrate,
   wherein an absorbance $ABS_A$ of the ink composition A and an absorbance $ABS_B$ of the ink composition B satisfy a formula (1) below, and
   a concentration $M_A$ of the microcapsule included in the ink composition A and a concentration $M_B$ of the microcapsule included in the ink composition B satisfy a formula (2) below:

$ABS_A < ABS_B$  Formula (1)

$M_A < M_B$  Formula (2)

where $ABS_A$ and $ABS_B$ respectively represent an average of absorbances of the ink composition A in wavelengths of 360 to 390 nm and an average of absorbances of the ink composition B in wavelengths of 360 to 390 nm, and $M_A$ and $M_B$ respectively represent, on a mass basis, a concentration of the microcapsule included in the ink composition A and a concentration of the microcapsule included the ink composition B, and wherein $ABS_A$, $ABS_B$, $M_A$, and $M_B$ satisfy a formula (3) below $$(1+0.1\times(ABS_B/ABS_A))\times M_A < M_B < (1+0.4\times(ABS_B/ABS_A))\times M_A \quad \text{Formula (3)}$$

2. The ink jet recording method according to claim 1, wherein $M_A$ is 7% by mass or more and 14% by mass or less, and $M_B$ is 9% by mass or more and 18% by mass or less.

3. The ink jet recording method according to claim 1, wherein, in the irradiation step, the ink composition A and the ink composition B are irradiated with light under the same conditions.

4. The ink jet recording method according to claim 1, wherein the ink composition A includes a quinacridone pigment in an amount of 4.0% to 6.0% by mass relative to a total mass of the ink composition A, and the ink composition B includes carbon black in an amount of 1.5% to 2.5% by mass relative to a total mass of the ink composition B.

5. The ink jet recording method according to claim 1, wherein the ink composition A includes a copper phthalocyanine pigment in an amount of 1.7% to 3.1% by mass relative to a total mass of the ink composition A, and the ink composition B includes carbon black in an amount of 1.5% to 2.5% by mass relative to a total mass of the ink composition B.

6. The ink jet recording method according to claim 1, wherein the ink composition A includes a monoazo pigment in an amount of 3.0% to 4.4% by mass relative to a total mass of the ink composition A, and the ink composition B includes carbon black in an amount of 1.5% to 2.5% by mass relative to a total mass of the ink composition B.

7. The ink jet recording method according to claim 1, wherein each of the microcapsule included in the ink composition A and the microcapsule included in the ink composition B encloses a photopolymerization initiator therein.

8. The ink jet recording method according to claim 7, wherein, in each of the ink composition A and the ink composition B, a content of the photopolymerization initiator enclosed in the microcapsule is 5% to 10% by mass relative to a content of the polymerizable compound enclosed in the microcapsule.

9. The ink jet recording method according to claim 1, wherein the photopolymerization initiator includes a bisacylphosphine oxide.

10. The ink jet recording method according to claim 1, wherein the same microcapsules are used for the microcapsule included in the ink composition A and the microcapsule included in the ink composition B.

* * * * *